US009032299B2

(12) United States Patent  
Lyons et al.

(10) Patent No.: US 9,032,299 B2  
(45) Date of Patent: May 12, 2015

(54) TOOL FOR GROUPING MEDIA CLIPS FOR A MEDIA EDITING APPLICATION

(75) Inventors: Charles Lyons, San Francisco, CA (US); Wendy Van Wazer, Campbell, CA (US); Douglas DeVore, Campbell, CA (US); Peter Warner, Paris (FR)

(73) Assignee: Apple Inc., Cupertino, CA (US)

( * ) Notice: Subject to any disclaimer, the term of this patent is extended or adjusted under 35 U.S.C. 154(b) by 821 days.

(21) Appl. No.: 12/688,856

(22) Filed: Jan. 15, 2010

(65) Prior Publication Data

US 2010/0278504 A1 Nov. 4, 2010

Related U.S. Application Data

(63) Continuation-in-part of application No. 12/433,872, filed on Apr. 30, 2009, and a continuation-in-part of application No. 12/433,875, filed on Apr. 30, 2009, and a continuation-in-part of application No.

(Continued)

(51) Int. Cl.
  *G06F 3/00* (2006.01)
  *H04N 9/82* (2006.01)
  *G06F 3/0481* (2013.01)
  *G11B 27/34* (2006.01)

(Continued)

(52) U.S. Cl.
  CPC .......... *H04N 9/8227* (2013.01); *G06F 3/0481* (2013.01); *G11B 27/34* (2013.01); *H04N 5/44543* (2013.01); *H04N 21/47205* (2013.01); *H04N 21/854* (2013.01)

(58) Field of Classification Search
  CPC ..... G11B 27/34; G11B 27/034; H04N 9/8827

USPC .................................................. 715/723, 720  
See application file for complete search history.

(56) References Cited

U.S. PATENT DOCUMENTS 5,442,744 A 8/1995 Piech et al.  
5,471,578 A * 11/1995 Moran et al. .................. 715/863

(Continued)

FOREIGN PATENT DOCUMENTS

WO WO 2007/120694 10/2007  
WO WO 2010/106586 9/2010

OTHER PUBLICATIONS

Author Unknown, "Editing Stereoscopic 3D Video in Vegas Pro 9", Workflow Paper, Apr. 2, 2010, pp. 1-6, Sony Creative Software Inc., Madison, WI, USA.

(Continued)

*Primary Examiner* — Kieu Vu  
*Assistant Examiner* — Aaron Lowenberger  
(74) *Attorney, Agent, or Firm* — Adeli LLP

(57) ABSTRACT

For a media-editing application that creates composite presentations, a novel grouping tool for grouping several media clips in the composite presentation by drawing a boundary about the media clips is described. The media editing application includes a composite display area for displaying media clips that are part of the composite presentation. The composite display area includes a timeline and one or more tracks that span the timeline for holding one or more media clips. The grouping tool provides a drawing tool that allows a user to draw a boundary in the composite display area. The drawing tool includes a moveable drawing element that moves about the media clips in the composite display area in order to draw the boundary.

29 Claims, 30 Drawing Sheets

Related U.S. Application Data

12/434,617, filed on May 1, 2009, and a continuation-in-part of application No. 12/551,557, filed on Aug. 31, 2009.

(60) Provisional application No. 61/174,490, filed on Apr. 30, 2009, provisional application No. 61/174,491, filed on Apr. 30, 2009, provisional application No. 61/227,070, filed on Jul. 20, 2009.

(51) Int. Cl.
*H04N 5/445* (2011.01)
*H04N 21/472* (2011.01)
*H04N 21/854* (2011.01)

(56) References Cited

U.S. PATENT DOCUMENTS

| | | | |
|---|---|---|---|
| 5,519,828 A | 5/1996 | Rayner | |
| 5,613,909 A | 3/1997 | Stelovsky | |
| 5,659,539 A | 8/1997 | Porter et al. | |
| 5,664,216 A | 9/1997 | Blumenau | |
| 5,682,326 A | 10/1997 | Klingler et al. | |
| 5,781,188 A | 7/1998 | Amiot et al. | |
| 5,861,886 A | 1/1999 | Moran et al. | |
| 5,889,519 A * | 3/1999 | Boezeman et al. | 715/723 |
| 5,969,708 A | 10/1999 | Walls | |
| 6,154,600 A | 11/2000 | Newman et al. | |
| 6,154,601 A | 11/2000 | Yaegashi et al. | |
| 6,161,115 A | 12/2000 | Ohanian | |
| 6,539,163 B1 | 3/2003 | Sheasby et al. | |
| 6,544,294 B1 | 4/2003 | Greenfield et al. | |
| 6,928,613 B1 | 8/2005 | Ishii et al. | |
| 7,035,435 B2 | 4/2006 | Li et al. | |
| 7,062,713 B2 | 6/2006 | Schriever et al. | |
| 7,313,755 B2 | 12/2007 | Rahman et al. | |
| 7,325,199 B1 | 1/2008 | Reid | |
| 7,437,674 B2 | 10/2008 | Chen | |
| 7,444,593 B1 | 10/2008 | Reid | |
| 7,546,532 B1 * | 6/2009 | Nichols et al. | 715/716 |
| 7,623,755 B2 | 11/2009 | Kuspa | |
| 7,653,550 B2 | 1/2010 | Schulz | |
| 7,668,869 B2 | 2/2010 | Weinberger et al. | |
| 7,710,439 B2 | 5/2010 | Reid et al. | |
| 7,770,125 B1 | 8/2010 | Young et al. | |
| 7,805,678 B1 | 9/2010 | Niles et al. | |
| 7,836,389 B2 | 11/2010 | Howard et al. | |
| 7,889,975 B2 | 2/2011 | Slone | |
| 8,020,100 B2 | 9/2011 | Ubillos et al. | |
| 2001/0020953 A1 * | 9/2001 | Moriwake et al. | 345/723 |
| 2001/0036356 A1 | 11/2001 | Weaver et al. | |
| 2002/0023103 A1 | 2/2002 | Gagne | |
| 2002/0154140 A1 | 10/2002 | Tazaki | |
| 2002/0154156 A1 | 10/2002 | Moriwake et al. | |
| 2002/0156805 A1 | 10/2002 | Schriever et al. | |
| 2003/0001880 A1 | 1/2003 | Holtz et al. | |
| 2003/0002851 A1 | 1/2003 | Hsiao et al. | |
| 2003/0117431 A1 | 6/2003 | Moriwake et al. | |
| 2003/0146915 A1 | 8/2003 | Brook et al. | |
| 2004/0090462 A1 | 5/2004 | Graham | |
| 2004/0125124 A1 | 7/2004 | Kim et al. | |
| 2005/0257152 A1 * | 11/2005 | Shimizu et al. | 715/723 |
| 2006/0008247 A1 * | 1/2006 | Minami et al. | 386/52 |
| 2006/0036971 A1 * | 2/2006 | Mendel et al. | 715/856 |
| 2006/0277454 A1 | 12/2006 | Chen | |
| 2007/0089152 A1 | 4/2007 | Patten et al. | |
| 2007/0154190 A1 | 7/2007 | Gilley et al. | |
| 2008/0044155 A1 * | 2/2008 | Kuspa | 386/52 |
| 2008/0152297 A1 | 6/2008 | Ubillos | |
| 2008/0152298 A1 | 6/2008 | Ubillos | |
| 2008/0155420 A1 | 6/2008 | Ubillos et al. | |
| 2008/0155421 A1 | 6/2008 | Ubillos et al. | |
| 2008/0256466 A1 | 10/2008 | Salvador et al. | |
| 2008/0263433 A1 * | 10/2008 | Eppolito et al. | 715/200 |
| 2009/0172543 A1 * | 7/2009 | Cronin et al. | 715/721 |
| 2010/0042933 A1 * | 2/2010 | Ragusa | 715/760 |
| 2010/0281375 A1 | 11/2010 | Pendergast et al. | |
| 2010/0281376 A1 | 11/2010 | Meaney et al. | |

OTHER PUBLICATIONS

Casares, Juan, et al., "Simplifying Video Editing Using Metadata," Proceedings of Designing Interactive Systems (DIS 2002), Jun. 2002, pp. 157-166, London, United Kingdom.

Chisan, James, et al., "Video Bench—Final Report: SEng 480a/CSc 586a," Apr. 11, 2003, University of Victoria.

Diakopoulos, Nicholas, et al., "Videotater: An Approach for Pen-Based Digital Video Segmentation and Tagging," Proceedings of the 19th Annual ACM Symposium on User Interface Software and Technology (UIST'06), Oct. 15-18, 2006, pp. 221-224, Montreux, Switzerland.

Myers, Brad A., et al., "A Multi-View Intelligent Editor for Digital Video Libraries," The First ACM+IEEE Joint Conference on Digital Libraries (JCDL'01), Jun. 24-28, 2001, pp. 106-115, Roanoke, VA, USA.

Author Unknown, "Apple Announces Final Cut Pro 4," NAB, Apr. 6, 2003, pp. 1-3, Apple Inc., Las Vegas, Nevada, USA.

Author Unknown, "Using Adobe Premiere Elements 8 Editor," Last Updated Aug. 12, 2010, 313 pages, Adobe Systems Incorporated, San Jose, California, USA.

Author Unknown, "Using Adobe Flash CS4 Professional," updated Mar. 5, 2009, 474 pages, Adobe Systems Incorporated, San Jose, California, USA.

Author Unknown, "Adobe Director 11: User Guide," Month Unknown, 2008, 498 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Brenneis, Lisa, "Final Cut Pro 3 for Macintosh: Visual QuickPro Guide," Apr. 2002, 288 pages, Peachpit Press, Berkeley, California, USA.

Author Unknown, "iMovie '08 Getting Started," Month Unknown, 2008, pp. 1-50, Apple Inc., USA.

* cited by examiner

TOOL FOR GROUPING MEDIA CLIPS FOR A MEDIA EDITING APPLICATION

CLAIM OF BENEFIT TO PRIOR APPLICATIONS

This application claims benefit to U.S. Provisional Patent Application No. 61/174,490 entitled "Media Clip Auditioning Used to Evaluate Uncommitted Media Content", filed Apr. 30, 2009. This application also claims benefit to U.S. Provisional Patent Application No. 61/227,070 entitled "Segmented Timeline for a Media-Editing Application", filed Jul. 20, 2009. In addition, this application is a Continuation in Part of U.S. Non-provisional patent application Ser. No. 12/433,872 entitled "Automatically Extending a Boundary for an Image to Fully Divide the Image", filed on Apr. 30, 2009, now issued as U.S. Pat. No. 8,885,977. This application is also a Continuation in Part of U.S. Non-provisional patent application Ser. No. 12/433,875 entitled "Navigation Tool for Video Presentations", filed on Apr. 30, 2009, now published as U.S. publication number 2010/0281371. This application is also a Continuation in Part of U.S. Non-provisional patent application Ser. No. 12/434,617 entitled "Cross-Track Edit Indicators and Edit Selections", filed May 1, 2009, now issued as U.S. Pat. No. 8,418,082. This application is also a Continuation in Part of U.S. Non-provisional patent application Ser. No. 12/551,557 entitled "Graphical User Interface for a Media-Editing Application With a Segmented Timeline", filed on Aug. 31, 2009, now issued as U.S. Pat. No. 8,769,421. U.S. Non-provisional patent application Ser. No. 12/551,557, now issued as U.S. Pat. No. 8,769,421, claims the benefit of U.S. Provisional Patent Application No. 61/174,490 entitled "Media Clip Auditioning Used to Evaluate Uncommitted Media Content", filed Apr. 30, 2009, U.S. Provisional Patent Application No. 61/174,491entitled "Editing Key-Indexed Graphs in Media Editing Applications", filed Apr. 30, 2009, and U.S. Provisional Patent Application No. 61/227,070 entitled "Segmented Timeline for a Media-Editing Application", filed July 20, 2009.

BACKGROUND

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple Inc. These applications give users the ability to edit, combine, transition, overlay, and piece together different media content in a variety of manners to create a resulting media project. The resulting media project specifies a particular sequenced composition of any number of text, audio clips, images, or video content that is used to create a media presentation.

Various media editing applications facilitate such composition through electronic means. Specifically, a computer or other electronic device with a processor and computer readable storage medium executes the media content editing application. In so doing, the computer generates a graphical interface whereby designers digitally manipulate graphical representations of the media content to produce a desired result.

One difficulty in media editing is that a user cannot easily and intuitively create groupings of media clips in the graphical interface. For example, the user may wish to create such a grouping by simply dragging a moveable drawing element across several tracks twice in order to define two borders to encompass several media clips. In addition, the user may wish to move or manipulate the grouped media clips together.

Thus, there is a need for a media editing application that allows a user to easily and intuitively create groupings of media clips in the graphical interface. In addition, there is a need for a tool that allows the user to create such a grouping by drawing borders or boundaries to encompass several media clips in the graphical interface.

BRIEF SUMMARY

For a media-editing application that creates composite presentations, some embodiments of the invention provide a novel grouping tool for grouping several media clips in the composite presentation by drawing a boundary about the media clips. The media editing application of some embodiments includes a composite display area for displaying media clips that are part of the composite presentation. In some embodiments, the composite display area includes a timeline and one or more tracks that span the timeline for holding one or more media clips.

The grouping tool of some embodiments provides a drawing tool that allows a user to draw a boundary in the composite display area. The drawing tool in some embodiments includes a moveable drawing element that moves about the media clips in the composite display area in order to draw the boundary. For instance, in the embodiments that utilize a timeline with multiple tracks, the user draws the boundary by dragging the moveable drawing element across multiple tracks.

Different embodiments use different techniques for drawing boundaries in the composite display area. For instance, some embodiments define the boundary in the composite display area by drawing one or two borders in this display area. The drawing tool of some embodiments draws a border in the composite display area by dragging the moveable drawing element from one location in this display area to another location (e.g., across multiple tracks). In some embodiments, the user can also draw a border by directing the drawing tool at one location of the composite display area to automatically generate the border from that location across several tracks to another location without having to drag the moveable drawing element across the composite display area.

In some embodiments, each border that is drawn defines a new boundary about a group of media clips, and thereby defines a new composite presentation part. In other words, these embodiments use a divisive approach that creates two new composite presentation parts from a previously defined composite presentation part that is bifurcated by a new border. In some such embodiments, the new border defines two new boundaries for defining the two new composite presentation parts, with each new boundary defined in terms of the new border and one of the borders that defined the previous composite presentation part that was bifurcated by the new border. Some such embodiments define the left and right edges of the composite display area as two initial borders in the composite display area.

In order to define a new composite presentation part, other embodiments require two borders to be drawn to define a new boundary about a group of media clips. Specifically, to create the new composite presentation part, these embodiments use an additive approach that requires the user to group a set of media clips by drawing two borders that encompass the set of media clips.

In other embodiments, the user can define one complete boundary about several media clips by dragging the moveable drawing element in one continuous drag operation to completely surround the media clips. Also, in some embodiments, the user can use the drawing element to draw a partial boundary that partially surrounds several media clips, and the drawing tool can automatically complete this boundary to completely surround the media clips. Some embodiments use all the techniques described above for drawing borders or boundaries, while other embodiments use only one or a few of these techniques. Still other embodiments use other techniques for defining a boundary about a group of media clips.

Some embodiments define borders or boundaries in the composite display area by reference to edges in the media clips in the composite display area. For instance, in some embodiments that utilize a timeline with one or more tracks, the borders or boundaries are defined in terms of edges of media clips that are placed on the tracks.

Accordingly, different embodiments draw a boundary about a set of media clips differently (e.g., drawing one or more borders, or drawing one continuous boundary that partially or completely surrounds a set of media clips, etc.). Irrespective of how such a boundary is drawn, some embodiments allow a user to adjust parts of the boundary after they have been initially defined. For instance, in some embodiments that define a boundary by reference to media clip edges, the user can select a boundary segment (e.g., a border segment) that is aligned with one media clip edge and move (e.g., drag) the selected segment to align with another media clip edge. Also, some embodiments allow a user to adjust the boundary as it is being drawn by adjusting the movement of the drawing element. For example, in some embodiments that define a boundary by reference to media clip edges, the user can adjust the movement of the drawing element as he is dragging the element across the tracks in order to move the segment of a boundary (e.g., a border) that is being defined from one media clip edge (that was automatically selected by the drawing tool) to another media clip edge.

As mentioned above, the grouping tool defines a boundary about several media clips in the composite display area in order to group the media clips. In some embodiments, the grouping tool groups the media clips into one composite presentation part that can be specifically selected and operated on in the composite presentation. Examples of operations that can be performed on a composite presentation part include moving the part (i.e., moving all the clips that are within the part together by selecting and moving the part), copying the part (i.e., copying all the clips that are within the part by selecting and copying the part), etc.

In some embodiments, the media editing application not only includes the grouping tool but also includes a navigation tool for navigating the composite display area. For a composite presentation part that is created with the grouping tool, the navigation tool of some embodiments includes a selectable user interface (UI) item (called a navigation marker) (1) that corresponds to the composite presentation part, and (2) that, when selected, causes the navigation tool to navigate to the portion of the composite display area that includes the composite presentation part.

For instance, in some embodiments that utilize a timeline with one or more tracks, the navigation tool includes multiple different selectable navigation markers that are associated with different navigable locations in the timeline. In some embodiments, the navigation markers are images (e.g., thumbnail images) associated with media clips at locations in the timeline that correspond to the navigation markers.

When creating a composite presentation part, the grouping tool in some embodiments generates a selectable navigation marker (e.g., a thumbnail), places this marker next to the other markers of the navigation tool based on the location of the composite presentation part in the overall composite presentation, and associates the marker with the newly created composite presentation part. In some of these embodiments, selection of the composite presentation part's navigation marker (e.g., the thumbnail) in the navigation tool causes the composite display area to present the timeline at the location of the composite presentation part. In some embodiments that associate a composite presentation part with a navigation marker, a user may also move the composite presentation part to a new location in the timeline by moving the navigation marker to a new position in the navigation tool.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
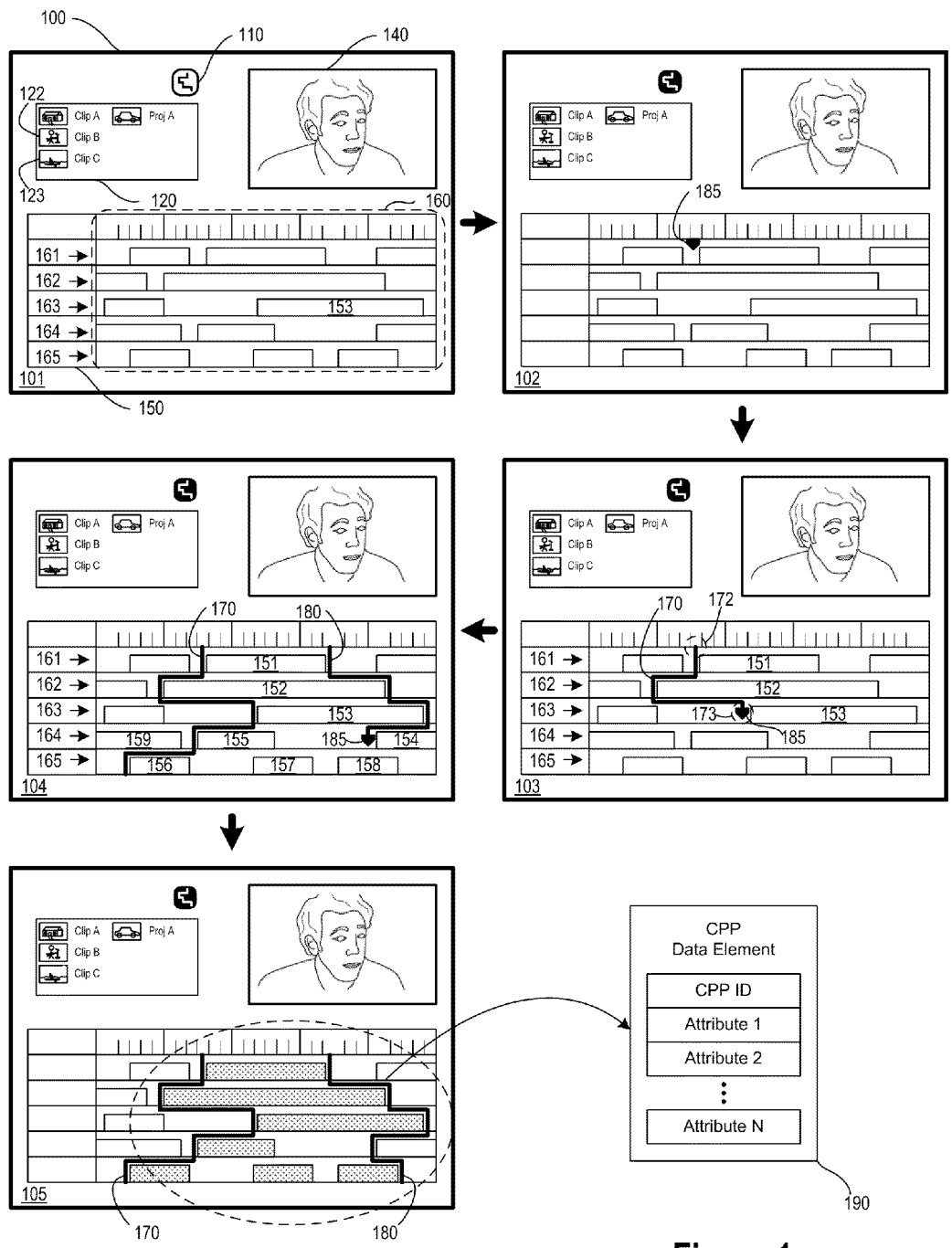
FIG. 1 illustrates an example of a media editing application's grouping tool that groups several media clips in the composite presentation by defining a boundary about the media clips.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a media-editing application that creates composite presentations, some embodiments of the invention provide a novel grouping tool for grouping several media clips in the composite presentation by drawing a boundary about the media clips. A media clip is a graphical representation of a piece of media content that is stored on the computing device on which the media editing application executes, or on a computing device to which the media editing application has access. Examples of such content include audio data, video data, text data, pictures, and/or other media data. Accordingly, media clips are any kind of content clip (e.g., audio clip, video clip, text clip, picture clips, or other media clip) that can be used to create a composite presentation.

The media editing application of some embodiments includes a composite display area (e.g., an area with multiple tracks that span a timeline) for displaying a graphical representation of the composite presentation (also called the composite representation) by displaying media clips that form the composite presentation.

The grouping tool of some embodiments provides a drawing tool that allows a user to draw a boundary in the composite display area. The drawing tool in some embodiments includes a moveable drawing element that moves about the media clips in the composite display area in order to draw the boundary. For instance, in the embodiments that utilize a timeline with multiple tracks, the user draws the boundary by dragging the moveable drawing element across multiple tracks.

Different embodiments use different techniques for drawing boundaries in the composite display area. For instance, some embodiments define the boundary in the composite display area by drawing one or two borders in this display area. The drawing tool of some embodiments draws a border in the composite display area by dragging the moveable drawing element from one location in this display area to another location (e.g., across multiple tracks). In some embodiments, the user can also draw a border by directing the drawing tool at one location of the composite display area to automatically generate the border from that location across several tracks to another location without having to drag the moveable drawing element across the composite display area.

In some embodiments, each border that is drawn defines a new boundary about a group of media clips, and thereby defines a new composite presentation part. In other words, these embodiments use a divisive approach that creates two new composite presentation parts from a previously defined composite presentation part that is bifurcated by a new border. In some such embodiments, the new border defines two new boundaries for defining the two new composite presentation parts, with each new boundary defined in terms of the new border and one of the borders that defined the previous composite presentation part that was bifurcated by the new border. Some such embodiments define the left and right edges of the timeline as two initial borders of an initial composite presentation part.

In order to define a new composite presentation part, other embodiments require two borders to be drawn to define a new boundary about a group of media clips. Specifically, to create the new composite presentation part, these embodiments use an additive approach that requires the user to group a set of media clips by drawing two borders that encompass the set of media clips.

In other embodiments, the user can define one complete boundary about several media clips by dragging the moveable drawing element in one continuous drag operation to completely surround the media clips. Also, in some embodiments, the user can use the drawing element to draw a partial boundary that partially surrounds several media clips, and the drawing tool can automatically complete this boundary to completely surround the media clips. Some embodiments use all the techniques described above for drawing borders or boundaries, while other embodiments use only one or a few of these techniques. Still other embodiments use other techniques for defining a boundary about a group of media clips.

Some embodiments define borders or boundaries in the composite display area by reference to edges in the media clips in the composite display area. For instance, in some embodiments that utilize a timeline with one or more tracks, the borders or boundaries are defined in terms of edges of media clips that are placed on the tracks.

Accordingly, different embodiments draw a boundary about a set of media clips differently (e.g., drawing one or more borders, draw one continuous boundary that partially or completely surrounds a set of media clips, etc.). Irrespective of how such a boundary is drawn, some embodiments allow a user to adjust parts of the boundary after they have been initially defined. For instance, in some embodiments that define a boundary by reference to media clip edges, the user can select a boundary segment (e.g., a border segment) that is aligned with one media clip edge and move (e.g., drag) the selected segment to align with another media clip edge. Also, some embodiments allow a user to adjust the boundary as it is being drawn by adjusting the movement of the drawing element. For example, in some embodiments that define a boundary by reference to media clip edges, the user can adjust the movement of the drawing element as he is dragging the element across the tracks in order to move a segment of a boundary (e.g., a border) that is being defined from one media clip edge (that was automatically selected by the drawing tool) to another media clip edge.

As mentioned above, the grouping tool defines a boundary about several media clips in the composite display area in order to group the media clips. In some embodiments, the grouping tool groups the media clips into one composite presentation part that can be specifically selected and operated on in the composite presentation. Examples of operations that can be performed on a composite presentation part include moving the part (i.e., moving all the clips that are within the part together by selecting and moving the part), copying the part (i.e., copying all the clips that are within the part by selecting and copying the part), etc.

In some embodiments, the media editing application not only includes the grouping tool but also includes a navigation tool for navigating the composite display area. For a composite presentation part that is created with the grouping tool, the navigation tool of some embodiments includes a selectable user interface (UI) item (called a navigation marker) (1) that corresponds to the composite presentation part, and (2) that, when selected, causes the navigation tool to navigate to the portion of the composite display area that includes the composite presentation part.

For instance, in some embodiments that utilize a timeline with one or more tracks, the navigation tool includes multiple different selectable navigation markers that are associated with different navigable locations in the timeline. In some embodiments, the navigation markers are images (e.g., thumbnail images) associated with media clips at locations in the timeline that correspond to the navigation markers.

When creating a composite presentation part, the grouping tool in some embodiments generates a selectable navigation marker (e.g., a thumbnail), places this marker next to the other markers of the navigation tool based on the location of the composite presentation part in the overall composite presentation, and associates the marker with the newly created composite presentation part. In some of these embodiments, selection of the composite presentation part's navigation marker (e.g., the thumbnail) in the navigation tool causes the composite display area to present the timeline at the location of the composite presentation part. In some embodiments that associate a composite presentation part with a navigation marker, a user may also move the composite presentation part to a new location in the timeline by moving the navigation marker to a new position in the navigation tool.

Several more detailed embodiments of the invention are described below. Section I describes a number of examples for defining a boundary in a composite display area of a media editing application. Section II then describes the creation and manipulation of a composite presentation part after such a boundary has been defined in the composite display area. Next, Section III describes how some embodiments represent a composite presentation part in a navigation tool. Section IV describes some examples of editing functions related to a composite presentation part. Section V describes the software architecture of a media-editing application of some embodiments, while Section VI describes a process used to create such a media editing application. Lastly, Section VII describes a computer system which implements some of the embodiments of the invention.

I. Define a Boundary of a Composite Presentation Part

Sub-sections A and B below describe different methods of defining a boundary by drawing two borders in the composite display area. Specifically, sub-section A describes how some embodiments draw a border by dragging a moveable drawing element over multiple tracks in the composite display area. Sub-section B then describes how some embodiments draw a border by directing the drawing tool at one location of the composite display area to automatically generate the border from that location across several tracks to another location without having to drag the moveable drawing element across the composite display area.

The embodiments described in sub-sections A and B draw two borders in order to specify a composite presentation part. Sub-section C describes how some embodiments define a composite presentation part by drawing only one border in the composite display area.

Section D next describes how some embodiments define a composite presentation part by allowing the user to draw one complete or partial boundary that completely or partially surrounds a set of media clips. In some embodiments, the drawing techniques that are described in sub-sections A-D produce user adjustable boundaries. Accordingly, sub-section E describes several methods for adjusting such boundaries after they have been defined.

A. Drawing Two Borders

1. Example

For some embodiments of the invention, FIG. 1 illustrates one example of a media editing application's grouping tool that groups several media clips in the composite presentation by defining a boundary about the media clips. In this example, the grouping tool includes a drawing tool that allows a user to draw two borders that define a boundary in a composite display area. FIG. 1 illustrates the drawing of these two borders in terms of five different stages 101-105 of a drawing operation in a graphical user interface (GUI) 100 of the media editing application.

As shown in this figure, the GUI 100 includes a media library area 120, a composite display area 150, a grouping activation item 110, a moveable drawing element 185, and a preview display area 140. The preview display area displays a preview of a composite presentation that the application creates by compositing several media clips.

The media library 120 is an area in the GUI 100 through which the application's user can select media clips to add to a presentation that the user is compositing with the application. In the example of FIG. 1, the clips in the media library are presented as thumbnails (e.g., 122 and 123) that can be selected and added to the composite display area 150 (e.g., through a drag-and-drop operation or a menu selection operation). The clips in the media library may also be presented as a list, a set of icons, or some other appearance that allows a user to view and select the various clips in the library. In some embodiments, the media library area 120 may include audio clips, video clips, text overlays, pictures, and/or other media.

The composite display area 150 of the GUI 100 provides a visual representation of the composite presentation being created by the user. The composite display area 150 displays a timeline 160 that includes one or more clips (e.g., clip 155) representing one or more pieces of media content in the composite presentation. The media clips are placed on one or more tracks (e.g., tracks 161-165) that span the timeline 160 of the composite display area 150.

The grouping activation item 110 is a conceptual illustration of one or more UI items that allow the media editing application to activate its grouping tool. Different embodiments of the invention implement this UI item differently. Some embodiments implement it as a selectable UI button, others as a command that can be selected in a pull-down or drop-down menu, and still others as a command that can be selected through one or more keystroke operations. Accordingly, the selection of the grouping activation item 110 may be received from a cursor controller (e.g., a mouse, touchpad, trackball, etc.), from a touchscreen (e.g., a user touching a UI item on a touchscreen), or from a keyboard input (e.g., a hotkey or a key sequence), etc. Yet other embodiments allow the user to access the grouping tool feature through two or more of such UI implementations or other UI implementations.

A user may select the grouping activation item 110 for different reasons in some embodiments. A user may select this item in order to create a new composite presentation part (CPP) that includes a set of media clips in the timeline. Alternatively, the user may select this item in order to view and modify a previously defined composite presentation part (e.g., to redefine the borders of an existing composite presentation part, to move a composite presentation part, etc.).

As mentioned above, the media editing application's grouping tool in FIG. 1 includes a drawing tool. The grouping tool activates this drawing tool once the group tool is activated upon the selection of the grouping activation item 110. Once activated, the drawing tool then presents the moveable drawing element 185 in the composite display area 150. The moveable drawing element 185 is a graphical UI element that a user can move in the composite display area 150, in order to direct the drawing tool to draw a border in the composite display area 150.

Different embodiments of the invention implement the moveable drawing element differently. For instance, in some embodiments, a user can interact with the GUI 100 through a cursor that is controlled by a cursor controller. In some embodiments, the cursor controller can be a controller that only captures cursor movement in one direction (e.g., the up and down arrows of the keyboard), only captures cursor movement in two directions (e.g., the arrow keys or other keys of a keyboard), or captures cursor movement in three or more directions. Examples of cursor controllers that capture cursor movement in three or more directions are pointer cursor controllers (e.g., mice, touchpads, trackpads, trackballs, etc.) that allow a cursor to be moved in any direction in a plane. Some embodiments allow the user to control the cursor through only some of these cursor controllers (e.g., through pointer cursor controllers).

In some of these embodiments, the drawing tool upon activation changes the cursor representation in the composite display area to the moveable drawing element 185. Accordingly, in these embodiments, the user can use the cursor controller to activate and move the moveable drawing element in the composite display area in order to draw a border. For instance, in some embodiments, the user uses the cursor controller (1) to move the drawing element 185 to a desired starting location for a border, and (2) to perform a click-and-drag operation that starts at this location and ends at another location in order to draw the border between the two locations.

Other embodiments implement the drawing element 185 differently. For instance, some embodiments do not automatically change the cursor representation in the composite display area to the drawing element upon the activation of the drawing tool, and instead require the user to manually select this element by selecting a representative UI item. Upon selection of the grouping activation item 110, other embodiments present the drawing element 185 in the composite display area as an item that a user (1) can select and move (e.g., through a cursor, keyboard, touchscreen, etc.) to different temporal locations in the composite display area, and (2) can extend and/or adjust to define a border in the composite display area. Still other embodiments allow a user to activate the drawing element 185 by touching the display screen at a location that displays a particular part of the composite display area and then moving the contact with the display screen to define a border in the composite display area. Many other techniques can be used to implement the drawing element 185 in the composite display area.

The operation of the grouping tool will now be described by reference to the operation of the GUI 100 during the five stages 101-105 illustrated in FIG. 1. In the first stage 101, the composite display area 150 displays a composite presentation that includes several clips along the timeline 160. A user might have added these clips to the composite presentation in a current editing session or by opening a composite project that was defined in a previous editing session. In the first stage 101, the grouping tool has not yet been activated.

The second stage 102 displays the composite display area 150 after the grouping tool has been activated upon the selection of the grouping activation item 110 (e.g., through a cursor click operation). FIG. 1 illustrates this activation by changing the appearance of the UI item 110 and by displaying the moveable drawing element 185 in the composite display area 150. As mentioned above, the moveable drawing element 185 is the cursor's representation in the composite display area after the activation of the grouping tool in some embodiments, while in other embodiments this moveable drawing element 185 can be selected, moved, and extended through any number of input mechanisms (e.g., cursor, keyboard, touchscreen, etc.). In yet other embodiments, it is an element that can be activated by touching the display screen at a location that displays a particular part of the composite display area and then moving the contact with the display screen to identify a border in the composite display area.

Other embodiments might indicate the activation of the grouping tool without any changes in appearance in any UI items or by changing the appearance of other UI items. For instance, in some embodiments where the UI item 110 is implemented as a command that is invoked through one or more keystrokes (or a selection from a drop-down menu, etc.), the activation of the grouping tool might be indicated by only the change in the appearance of the cursor in the composite display area or the change of appearance in one or more other items in the composite display area.

In the third stage 103, the user has partially drawn a first border 170 by moving the drawing element 185 across tracks 161, 162 and 163. In some embodiments that change the representation of the cursor in the composite display area to the drawing element 185 upon activation of the grouping tool, the user draws the partial first border 170 by using the cursor controller to activate and move the drawing element (e.g., by performing a click-and-drag operation) that starts at starting location 172 and goes to interim location 173. In other embodiments that display the drawing element 185 as a selectable UI item in the composite display area, the user draws the partial first border by selecting the UI item at location 172 and moving it to the interim location 173 through cursor, keyboard, touchscreen or other input mechanisms. In other embodiments that allow a user to activate the drawing element 185 by touching the display screen, the user draws the partial first border by touching the screen at the screen location that displays the location 172 in the composite display area and then moving the contact with the display screen to a screen location that displays the interim location 173.

As shown in FIG. 1, the drawing tool of some embodiments allows the border 170 to be drawn non-linearly in order to encompass (and thereby group) clips that are on different tracks and that are not aligned temporally (i.e., do not start and/or end at the same point in time). In some embodiments, the border can be non-linear because it includes several segments that overlap or are parallel with the edges of the clips on the tracks. For instance, as illustrated in stage 103 of FIG. 1, the partially drawn border 170 has segments that overlap with edges of clips 151, 152 and 153. One process for drawing a border with segments that align with the clips will be described further below by reference to FIG. 4.

The fourth stage 104 shows the GUI 100 after the drawing tool has finished drawing the first border 170 and is in the process of drawing a second border 180. The user has used the cursor to drag the moveable drawing element 185 from track 161 across to track 164, resulting in a partially drawn second border 180. Like the first border 170, the second border 180 does not sever any clips, because its segments are aligned with the edges of the clips, which, in turn, allows the second border to be non-linear. In the fourth stage 104 of FIG. 1, the partially drawn border 180 has segments that coincide with edges of clips 151, 152, 153 and 154.

The fifth stage 105 illustrates the GUI 100 after the drawing tool has finished drawing the second border 180. At this stage, the grouping tool has defined a boundary about clips 151, 152, 153, 155, 156, 157 and 158 by drawing two borders 170 and 180 that are on the left and right sides of these clips. Upon completion of this boundary, the grouping tool of some embodiments groups the clips that fall within the two borders into a composite presentation part and provides a visual indication of the creation of this grouping. Different embodiments provide this visual indication differently, e.g., by applying a color, cross hatching, or other visual marking to the grouped clips individually or collectively. In the example illustrated in FIG. 1, this visual indication involves changing the color appearance of the clips individually. Other embodiments might provide the visual indication of the grouping in other ways.

In some embodiments, not all media clips that fall within a boundary necessarily have to be associated with a composite presentation part that gets created. In other words, some embodiments allow a grouping that is defined by a newly created boundary to exclude one or more clips that fall within the boundary. For instance, in some of these embodiments, a media clip that has to maintain a location independent of the grouping will be excluded from the grouping. One such situation arises when the user assigns a media clip to a fixed location in the timeline, or to a fixed relationship with other entities not included in the group. In this situation, the clip will be excluded from the grouping, even though it falls within the newly defined boundary.

Also, the border drawing process 400 that is described below by reference to FIG. 4 does not allow a border to be drawn through a clip. In other words, this process snaps the border to one end of the clip. Other border or boundary drawing processes might draw a border through a clip. In some such embodiments, a set of rules are used to determine whether a bifurcated clip should be assigned to a composite presentation part; and if so, which one.

As shown in the fifth stage 105 of FIG. 1, the grouping tool creates a data element 190 to represent the composite presentation part (CPP) that it defines upon the completion of the two borders 170 and 180 (i.e., of the boundary). This data structure has a CPP identification that identifies the composite presentation part. It also includes several attributes that relate to the clips that have been grouped within the composite presentation part. These attributes are defined differently in different embodiments. Section II below further elaborates on the CPP data structure and its attributes for some embodiments of the invention.

The approach illustrated in FIG. 1 for drawing a boundary to group clips has several advantages. For instance, it allows a user an easy and intuitive method of grouping the clips by simply dragging the moveable drawing element across several tracks twice in order to define two borders to encompass several clips to group. Once grouped, the clips can be manipulated and/or moved together, as further described below.

2. Grouping Process

Figure 2:
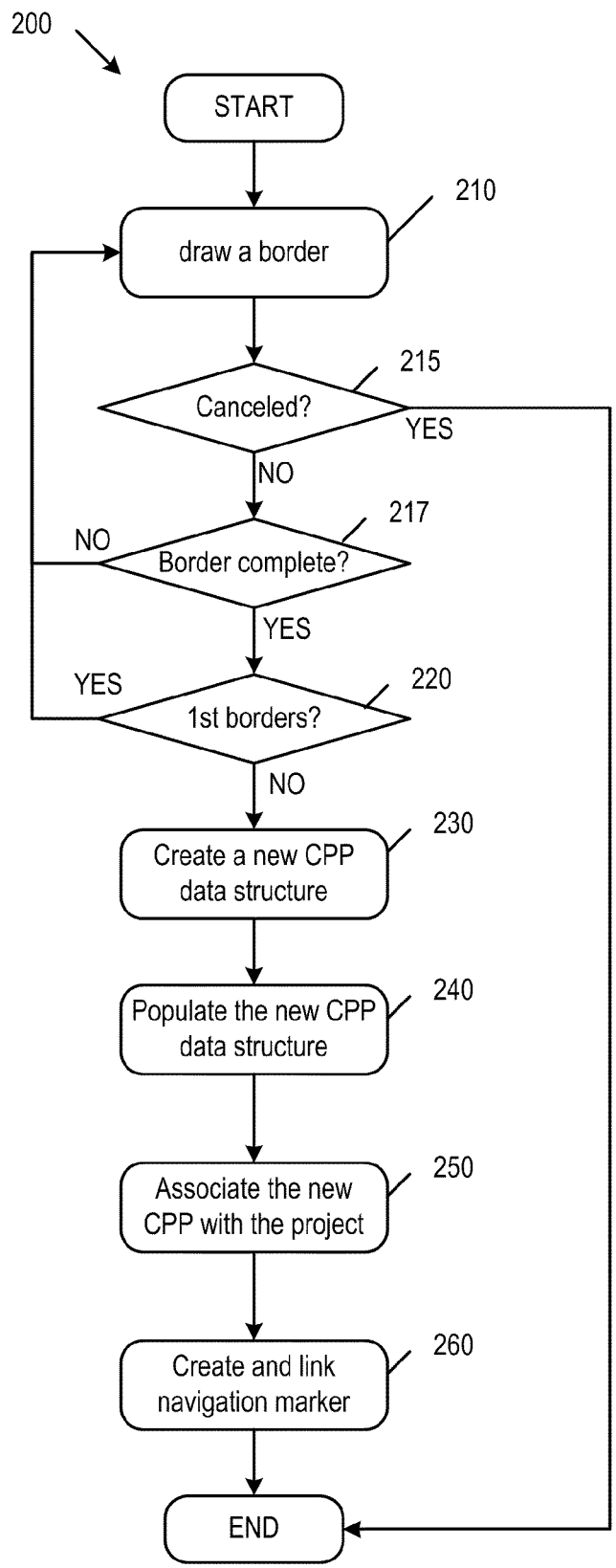
FIG. 2 illustrates an example of a process that is performed by the grouping tool of some embodiments of the invention to create a composite presentation part by drawing two borders.

FIG. 2 conceptually illustrates a process 200 that is performed by the grouping tool of some embodiments of the invention to create a composite presentation part by drawing two borders. This grouping process will be described by reference to the example that was described by reference to FIG. 1.

The process 200 starts when the user activates the grouping tool. In the example illustrated in FIG. 1, the grouping tool is activated through the selection of the grouping activation item 110. As shown in FIG. 2, the grouping process 200 initiates (at 210) a border drawing process that lets a user draw a border by moving the moveable drawing element 185 across multiple tracks of the composite display area. One example of this border drawing process will be further described below by reference to FIG. 4. In some embodiments, a user may also direct the drawing tool to automatically draw a border from one location in the composite display area to another location. One example of this automatic border drawing process will be further described below by reference to FIG. 6.

After 210, the process 200 determines (at 215) whether the grouping tool has been canceled or deactivated. If so, the process ends. If not, the grouping process next determines (at 217) whether the border drawing process initiated at 210 has been completed (i.e., whether a border has been drawn). Some embodiments make this determination by determining whether the border-drawing process has returned a border to the grouping process 200. If so, the operation proceeds to 220. If not, the grouping process returns to 210 to wait until the border has been completed.

At 220, the process determines whether the border drawn by the border-drawing process at 210 is only the first border needed to define a composite presentation part. Some embodiments make this determination by checking the number of borders that have been created but not yet associated with any existing composite presentation part. In the example illustrated in FIG. 1, border 170 at stage 103 is not associated with any existing composite presentation part.

When the process 200 determines (at 220) that the drawn border is only the first border that has been drawn so far, the process 200 returns to 210 to initiate another border drawing operation. The process then performs operations 215-220 until another border has been drawn, or until the grouping process 200 is terminated by the user.

When the process 200 determines (at 220) that two borders have been drawn, the process 200 proceeds to 230 to define a composite presentation part, because at this stage the two borders define a boundary around a set of media clips that can be associated with one composite presentation part. One example of two drawn borders defining a boundary about a group of media clips in the composite display area was described above by reference to the fourth stage 104 of FIG. 1.

As mentioned above, some embodiments define the composite presentation part in terms of the attributes that relate to the clips that have been grouped within the composite presentation part. Typically, all the clips that fall within the two borders (i.e., are between the two borders) are the clips that are grouped together for the composite presentation part. However, as mentioned above, some embodiments do not always associate all the media clips that fall between two borders with a composite presentation part that gets created. In other words, some embodiments allow a grouping that is defined by a newly created boundary to exclude one or more clips that fall within the boundary. For instance, in some of these embodiments, a media clip that has to maintain a location independent of the grouping will be excluded from the grouping. One such situation arises when the user assigns a media clip to a fixed location in the timeline, or to a fixed relationship with other entities not included in the group. In this situation, the clip will be excluded from the grouping, even though it falls within the newly defined boundary.

At 230, the process specifies the composite presentation part by creating a new composite presentation part data structure. This data structure includes several attributes that relate to the clips that have been grouped within the composite presentation part. These attributes are defined differently in different embodiments. One example of such a data structure was described above by reference to the fifth stage 105 of FIG. 1. Section II below further elaborates on the CPP data structure and its attributes for some embodiments of the invention.

After the composite presentation part data structure has been created, the process populates (at 240) the data structure created at 230. The process populates each entry in the composite presentation part data structure with its corresponding actual attribute. For example, some embodiments of the composite presentation part have as attributes references to media clips associated with the composite presentation part. For some of these embodiments, the process fills the composite presentation part data structure with the pointers or references to the media clips surrounded by the two defined borders.

After creating and populating the composite presentation part structure, the process 200 associates (at 250) the new composite presentation part with the composite presentation currently being composited by the media editing application. As mentioned above, some embodiments have a navigation tool that allows a user to select navigation markers to navigate to the location of clips or composite presentation parts in the composite display area. For some of these embodiments, the process 200 creates (at 260) a navigation marker in a navigation tool and links the newly created composite presentation part to the navigation marker. The composite presentation part's navigation marker and the navigation tool will be described further in detail in Section IV below. After creating the navigation marker in the navigation tool, the process 200 ends.

3. Single Border Drawing Process

Figure 3:
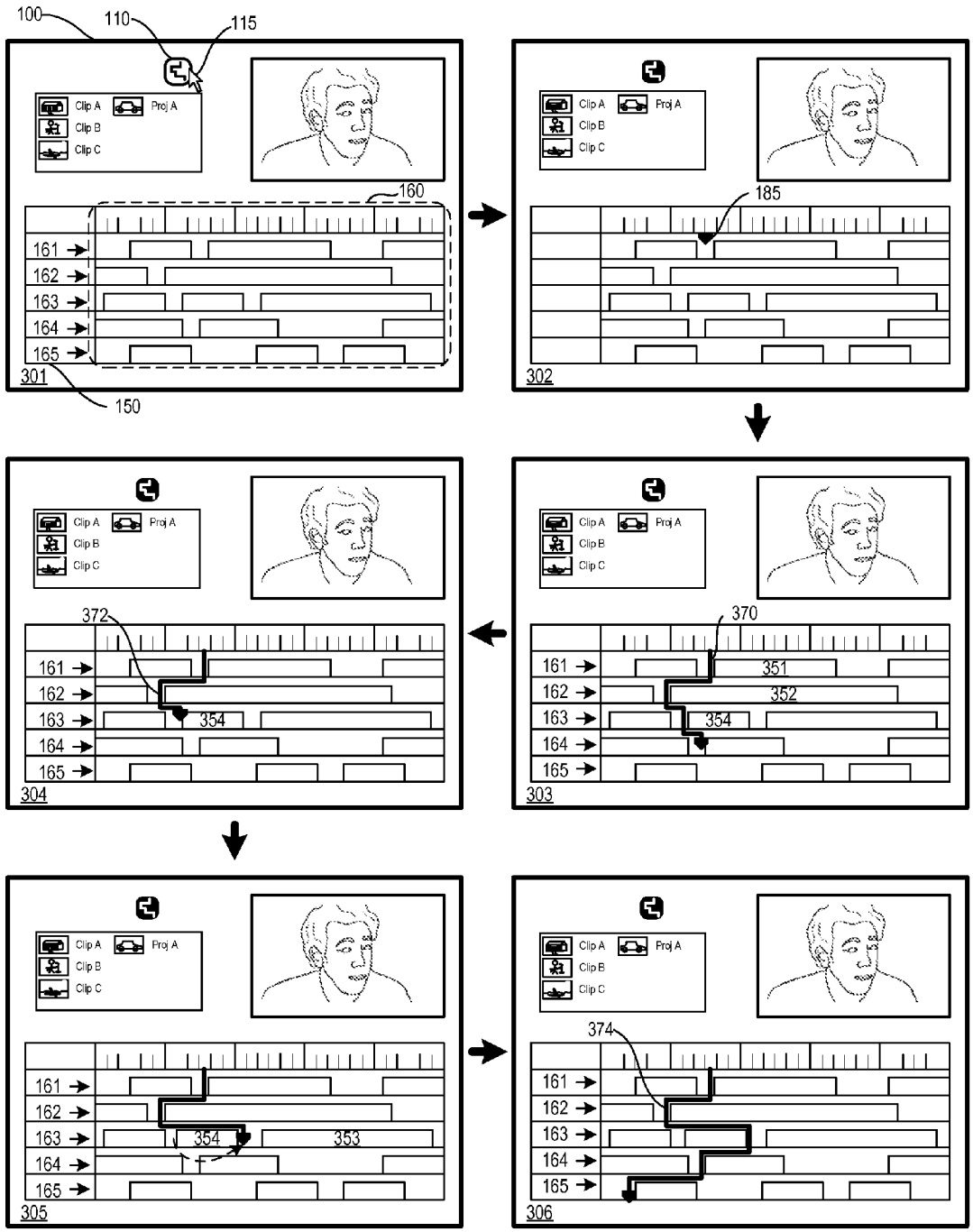
FIG. 3 illustrates an example of drawing of a border in a composite display area.
Figure 4:
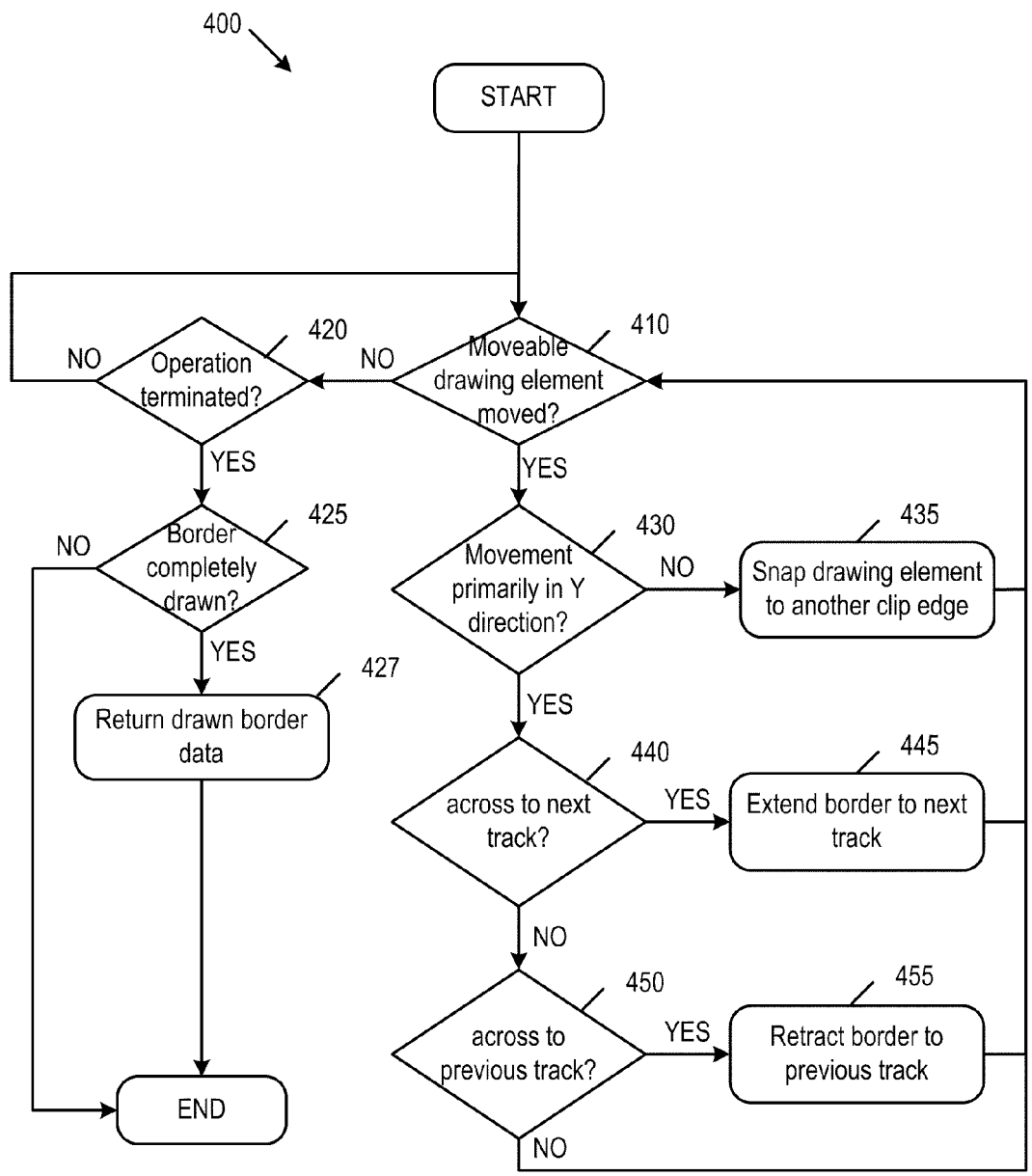
FIG. 4 illustrates an example of a border-drawing process of some embodiments of the invention.

FIG. 4 illustrates a border drawing process 400 of some embodiments of the invention. This process 400 is called by process 200 of FIG. 2 to initiate a border drawing operation at 210. The process 400 will be described by reference to FIG. 3, which illustrates the drawing of a single border in the composite display area 150 of the GUI 100 of FIG. 1 in six different stages 301-306.

The border drawing process 400 of FIG. 4 starts when the grouping process 200 calls it at 210. In the example illustrated in FIG. 3, the process 200 calls the process 400 when the user selects the grouping activation item 110 (e.g., by moving the cursor 115 over the item 110 and performing a click operation) in the first stage 301. In the second stage 302, the selection of the activation item 110 also causes the grouping tool to change the appearance of the activation item 110 and present the moveable drawing element 185 in the composite display area 150. The change in the appearance of the item 110 and the presentation of the movable drawing element 185 were described above by reference to the operation of the second stage 102 of FIG. 1.

As shown in FIG. 4, the process initially determines (at 410) whether the moveable drawing element 185 has moved in the composite display area. As mentioned above, different embodiments implement the moveable drawing element differently. For instance, as mentioned above, some embodiments change the cursor representation in the composite display area to the moveable drawing element 185 upon the activation of the grouping tool, while other embodiments present this element as a selectable element that the user has to manually select through cursor or touchscreen controls.

When the process 400 determines (at 410) that the moveable drawing element 185 has not moved in the composite display area, the process transitions to 420. At 420, the process 400 determines whether the drawing operation has terminated. In some embodiments, the drawing operation terminates when the media editing application receives a user input to terminate the grouping operation (e.g., through a keyboard input or through the re-selection of the activation item 110). The drawing operation also terminates when the process 400 completes the drawing of a single border.

When the process 400 determines (at 410) that the drawing operation has terminated, the process proceeds to 425 to determine whether the process 400 was able to complete a border. If not, the process ends. If so, the process returns (at 427) the border data to the process 200 and then ends.

When the process 400 determines (at 410) that the drawing operation has not terminated, the process returns to 410. At 410, the process again determines whether the moveable drawing element 185 has moved. When the process determines (at 410) that the moveable drawing element has moved, the process transitions to 430.

At 430, the process determines the primary direction of the motion of the moveable drawing element 185. Some embodiments apply a threshold to determine the direction of the move. If the process detects mostly side-to-side motion (i.e., in the x-direction) along a track of the composite display area, the process proceeds to 435. If the process detects mostly up-down motion (i.e., in the y-direction), the process proceeds to 440.

At 440, the process determines whether the moveable drawing element 185 has crossed into the next track. If so, the process extends (at 445) the border to the next track before returning to 410. The third stage 303 of FIG. 3 illustrates an example of drawing a border across multiple tracks. Specifically, this stage illustrates the drawing of a border by dragging the moveable drawing element 185 from track 161 across to track 164, resulting in a border 370 that is partially drawn. In some embodiments, the moveable drawing element 185 snaps the partially drawn border to a closest clip edge when it is dragged from one track to another track, which in the third stage 303 has resulted in a series of segments that corresponds to the edges of clips 351, 352 and 354.

When the process 400 determines (at 440) that the movement in the y-direction has not been across the next track, the process proceeds to 450. At 450, the process determines whether the moveable drawing element 185 has crossed back into a track that it has previous crossed and for which the process has previously defined a border segment. When the moveable drawing element has not crossed into another track at all, the process proceeds back to 410 to again determine the movement of the moveable drawing element 185. However, when the moveable drawing element has crossed into the previous track, the process retracts (at 455) the border from the current track to the previous track before returning to 410.

The fourth stage 304 of FIG. 3 illustrates an example of deleting border segments that were previously defined as the cursor moves upward. Specifically, this stage illustrates the deleting of border segments that were previously defined across the tracks 163 and 164 when the cursor moves back to the second track 162 after initially extending to the fourth track (as previously shown in the third stage 303). The retraction results in the partial border 372, which now only extends from track 161 to track 162.

As mentioned above, the process transitions to 435 when the process detects (at 430) mostly side-to-side motion (i.e., in the x-direction) along a track of the composite display area. At 435, the process snaps the moveable drawing element 185 to another clip edge when the other clip edge is closer to the location of the cursor or touchpoint that is controlling the moveable drawing element 185 than the clip edge that was previously associated with the drawing element 185 on that track. In other words, when a cursor or touchpoint is initially closer to one clip edge and then moves closer to another clip edge, the process automatically moves (at 435) the moveable drawing element 185 from the first clip edge to the second clip edge. By snapping the moveable drawing element from one clip edge to another, the process moves a border segment from one clip edge to another. After 435, the process returns to 410 to detect another movement in the moveable drawing element.

The fifth stage 305 of FIG. 3 illustrates an example of snapping the moveable drawing element 185 from one clip edge to another. In this example, the moveable drawing element 185 initially snapped to the left edge of clip 354 when it crossed back across track 163. However, at this point, the user has dragged the cursor closer to the left edge of clip 353, which has resulted in the drawing element 185 snapping to the right edge of clip 354. This snapping will cause the drawing process 400 to draw a border segment that is aligned with the right edge of the clip 354 once the cursor crosses the third track 163.

As mentioned above, one condition for terminating the process 400 is when this process has completed the drawing of one border. In some embodiments, the process completes the drawing of one border when it has defined a border that extends from one side to another side of the composite display area. When the process completes the drawing of the border, the moveable drawing element no longer moves and the process specifies its operation as terminated at 420. As mentioned above, the process then returns (at 427) the drawn border data and then ends.

The sixth stage 306 of FIG. 3 illustrates an example of a border 374 after it has been completely drawn. The user has completed drawing the border 374 by dragging the moveable drawing element 185 to the bottom most track of the composite display area 150. In some embodiments, once the border 374 has been completely drawn, the user can drag the moveable drawing element 185 elsewhere in the composite display area 150 to perform other operations (e.g., adjusting a border) as long as the grouping tool remains active.

The process 400 of FIG. 4 can adjust a border as the border is being drawn by the drawing tool. An example of the adjustment of the border after it has already been defined will be described below by reference to FIG. 11.

B. Automatic Border Generation

Instead of drawing a border by having the user move a moveable drawing element over multiple tracks in the composite display area, the drawing tool in some embodiments automatically draws such a border after the user directs the drawing tool to automatically draw a border from one location in the composite display area to another location in this area.

Figure 5:
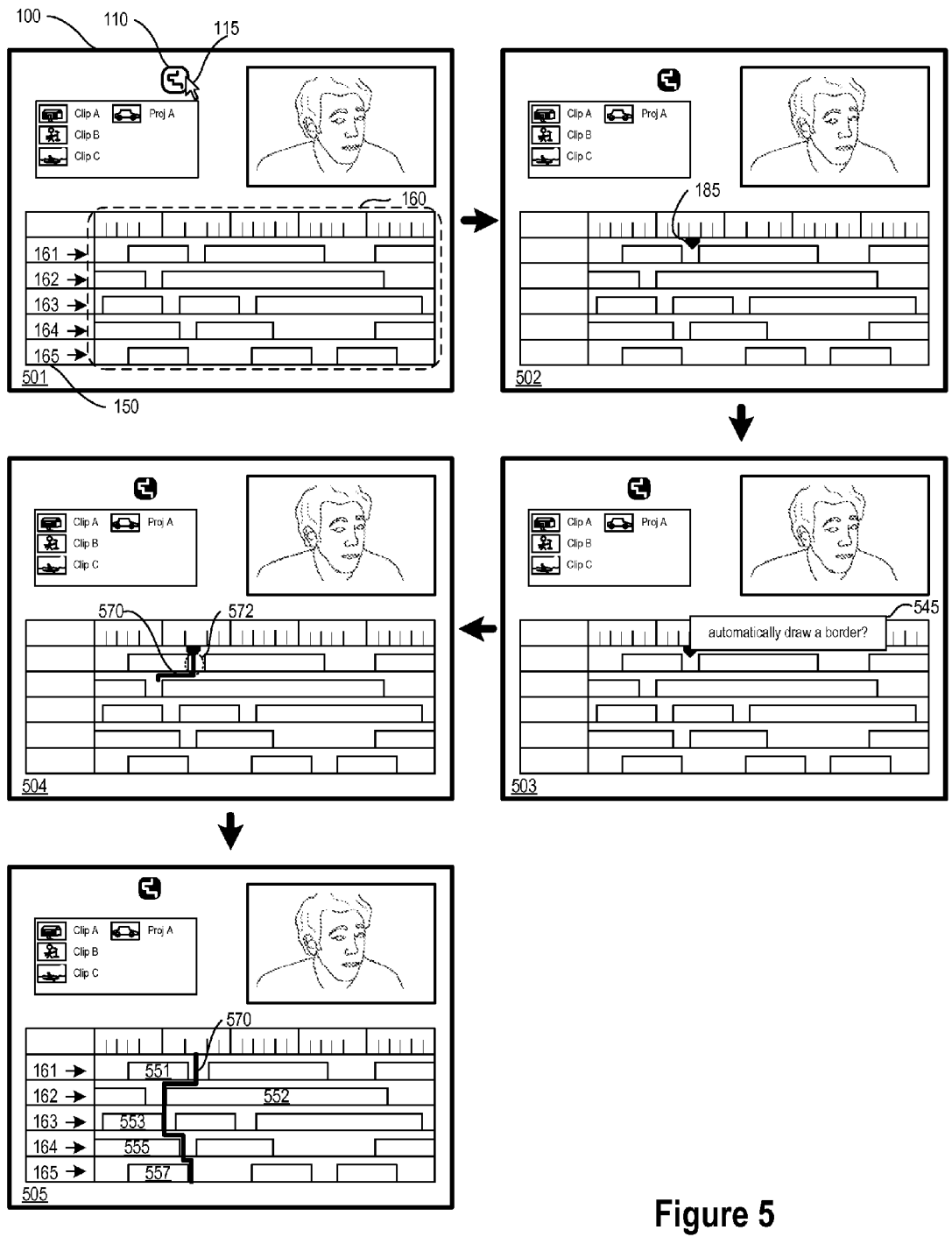
FIG. 5 illustrates an example of drawing a single border automatically in some embodiments.

FIG. 5 illustrates such an operation for the GUI 100 of FIG. 1 in five different stages 501-505. The first stage 501 is at the beginning of the automatic border generation operation, in which the grouping tool has not been activated, and the grouping activation item 110 is not highlighted.

The second stage 502 illustrates the selection of the grouping activation item 110 (e.g., by moving the cursor 115 over the item 110 and performing a click operation). This selection activates the grouping tool. Also, in this example, this selection is indicated in the second stage 502 by the change in the appearance of UI item 110 and by displaying the moveable drawing element 185 in the composite display area 150.

In the third stage 503, the user directs the drawing tool to automatically draw a border. In some embodiments, the user invokes the automatic border drawing operation by (1) performing a particular selection of the moveable drawing element 185 (e.g., by right clicking or double clicking on the element 185), and (2) selecting an auto-drawing command that is displayed in a pop-up display area 545 that is presented in response to the particular selection of the drawing element 185. Some embodiments provide other techniques (such as hot key commands, menu commands) for invoking the auto-draw command in conjunction with, or instead of, invoking the auto-draw command through the pop-up display area 545.

Upon receiving an auto-draw command, the grouping tool initiates an automatic border drawing process that automatically draws a border without further user input. One example of such a process will be described below by reference to FIG. 6. Also, in the example illustrated in FIG. 5, the fourth stage 504 illustrates the drawing tool in the process of automatically drawing a border 570. Since the user does not have to drag the moveable drawing element 185 during the automatic drawing operation, some embodiments shows the moveable drawing element 185 as remaining at the top of the composite display area. Other embodiments, however, keep the moveable drawing element 185 at the head of the border that is being drawn. Also, FIG. 5 illustrates the border 570 while it is partially drawn. Some embodiments do this to provide an animated presentation of the auto-drawing process. Other embodiments, however, do not display a partially drawn border during automatic border generation.

Lastly, the fifth stage 505 shows the completion of the automatic border drawing operation. At this stage, the drawing tool has completed the auto-drawn border 570 in the composite display area 150 from the location of the moveable drawing element 185 to the bottom most track. In some embodiments, the drawing tool snaps the border to the closest clip edge as it traverses each track to automatically draw the border. In the example illustrated in FIG. 5, the drawing tool starts generating the border 570 at the location of the moveable drawing element 185. The border then snaps to the right edge of clip 551 because it is the closest clip edge to the border in track 161. When the drawing tool traverses the next track 162, it snaps the border to the closest clip edge in that track, namely the left edge of clip 552. In this example, the drawing tool snaps to edges of the clips 551, 552, 553, 555 and 557, because they are the clip edges closest to the border at each track.

In the example illustrated in FIG. 5, the auto-draw command is initiated through the selection of the moveable drawing element 185. As mentioned above by reference to FIG. 1, the drawing element 185 can be selected and moved by the user in some embodiments, in order to manually draw a border. Accordingly, the drawing tool that is described in the example illustrated in FIG. 5 can be used to perform both manual and automatic drawing operations.

Other embodiments, however, do not provide both manual and automatic drawing options. Some embodiments provide only manual drawing option, while other embodiments provide only automatic drawing options. Still other embodiments provide both manual and automatic drawing options, like the embodiments described above by reference to FIG. 5. However, some of these embodiments provide one drawing element to perform a manual drawing operation, while providing another drawing element to perform an automatic drawing operation.

Figure 6:
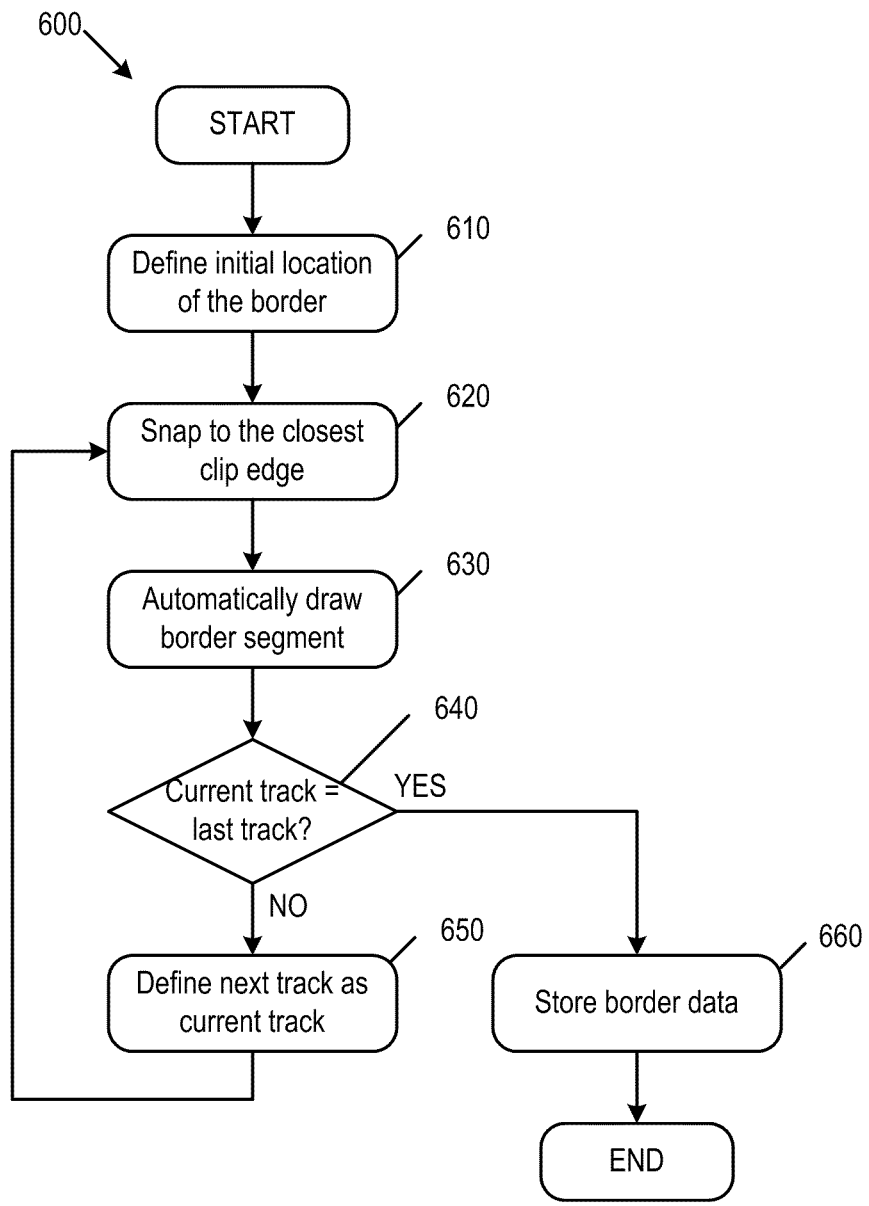
FIG. 6 illustrates an example of an automatic border drawing process that automatically draws a border.

FIG. 6 conceptually illustrates an auto-draw process 600 that is performed by the drawing tool of some embodiments of the invention to automatically draw a single border. This process will be described by reference to the example illustrated in FIG. 5. In some embodiments, this single border defining operation is part of a process that draws two borders in the composite display area in order to create a composite presentation part as mentioned above by reference to FIG. 2.

The process 600 starts when the user has invoked the automatic border drawing operation. In the example illustrated in FIG. 5, the user activates the automatic border drawing operation by first activating the grouping tool and then selecting an auto-draw command through the moveable drawing element 185 (e.g., by moving the cursor 115 over to the moveable drawing element 185, performing a particular selection of the element 185, and selecting the auto-draw command in the pop-up display 545).

Next, the process defines (at 610) the initial location of the tip of the border. In some embodiments, this initial location is the location of the moveable drawing element 185, as shown in the second stage 502 of FIG. 5. Some embodiments allow the user to move the moveable drawing element 185 along the timeline before initiating the auto-drawing process to modify the starting location of the auto-drawn border. At 610, the process also defines the current track as the first track.

At 620, the process 600 then snaps the tip of the border (i.e., aligns the tip of the border with) the clip edge that is closest to the tip on the current track. Next, the process automatically draws (at 630) a border segment by extending the tip vertically downward across the current track (i.e., draws across the current track a border segment that aligns with the clip edge that was identified at 620 as the closest clip edge). In the example illustrated in FIG. 5, the fourth stage 504 illustrates an initial border segment 572 of the border 570 that is drawn across the first track 161. This border segment is aligned with the right edge of clip 551, because this clip edge was closest to the location of the moveable drawing element 185 at the top of the first track 161.

The process next determines (at 640) whether the current track is the last track. Some embodiments make this determination by using the track number of the last border segment drawn. When the process determines (at 640) that the current track is the last track, then the process stores (at 660) the border data and ends.

On the other hand, when the process determines (at 640) that the current track is not the last track, the process defines (at 650) the next track as the current track, and then returns to 620. At 620, the process snaps the tip of the border that is partially drawn so far, to the clip edge that is closest to this tip on the current track. In the example illustrated in FIG. 5, the fourth stage 504 illustrates the snapping of the partially drawn border's tip to the left edge of clip 552 on the second track 162.

From 620, the process transitions to 630 and 640, and then either to 650 or 660 as described above. The process performs the operations 620-650 iteratively until it determines (at 640) that it has defined a completed border, at which point it saves the border data (at 660) and terminates. The fifth stage 505 of FIG. 5 shows the completed border 570 as the result of snapping the tip of the border to edges of the clips 551, 552, 553, 555 and 557, while defining segments of the border 570 across the tracks 161-165.

In some embodiments, a user can use the drawing tool to draw a border in other manners. For example, in some embodiments, a user can use the moveable drawing element 185 to partially draw a border at a track (e.g., 163) in the middle of the composite display area 150, and then invoke the automatic border drawing operation to automatically extend the partially drawn border vertically upward and/or downward to complete the border. Some of these embodiments use a process similar to 600 of FIG. 6 in order to automatically complete the partially drawn border across tracks in the composite display area 150.

C. Bifurcating Composite Presentation Parts

In some embodiments, each border that is drawn defines a new boundary about a group of media clips, and thereby defines a new composite presentation part. In other words, these embodiments use a divisive approach that creates two new composite presentation parts from a previously defined composite presentation part that is bifurcated by a new border. For some embodiments, the previously defined composite presentation part prior to the drawing of any new borders is an initial composite presentation part that encompasses the entire timeline, for which the left and right edges of the timeline are the two initial borders.

In some embodiments, the new border defines two new boundaries for defining the two new composite presentation parts, with each new boundary defined in terms of the new border and one of the borders that defined the previous composite presentation part that was bifurcated by the new border.

Figure 7:
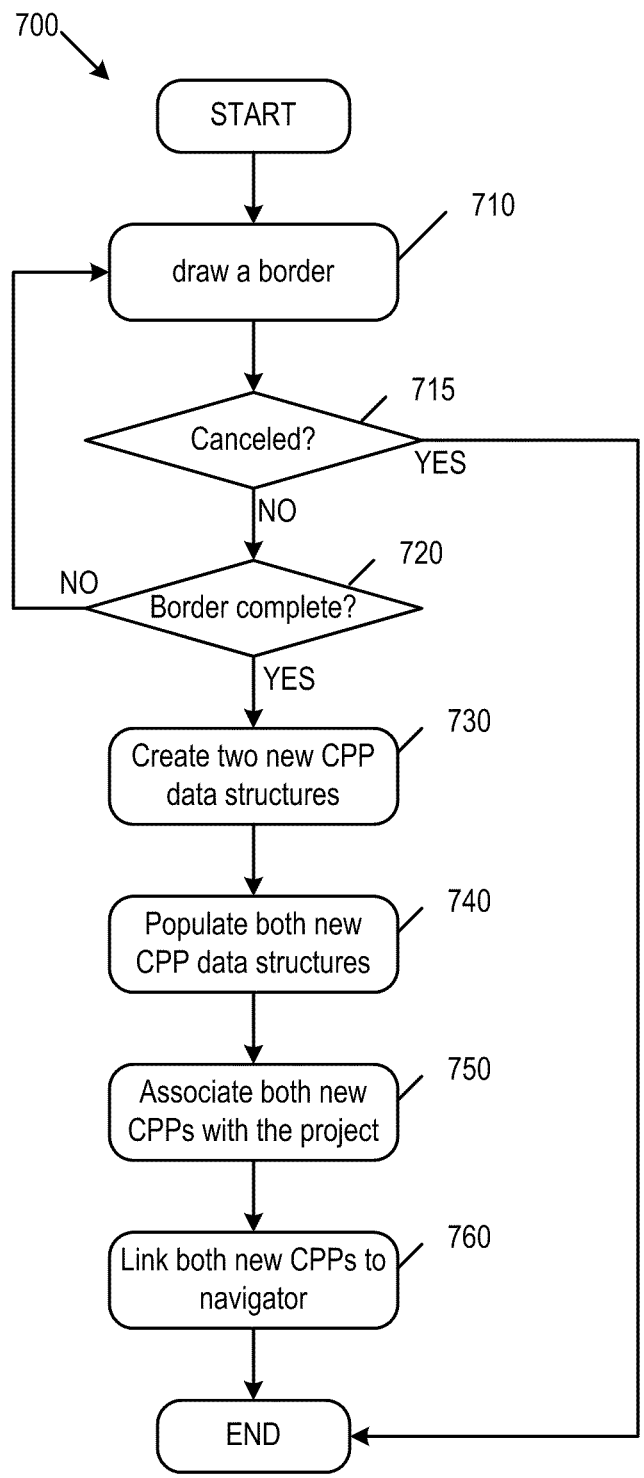
FIG. 7 illustrates an example of a process for drawing a single border to bifurcate a previously defined composite presentation part into two new composite presentation parts.

FIG. 7 conceptually illustrates a process 700 of some embodiments for drawing a single border to bifurcate a previously defined composite presentation part into two new composite presentation parts. Process 700 will be described by reference to FIG. 8, which illustrates the operation of drawing a single border to bifurcate a composite presentation part in the GUI 100 of FIG. 1 at five different stages 801-805.

Figure 8:
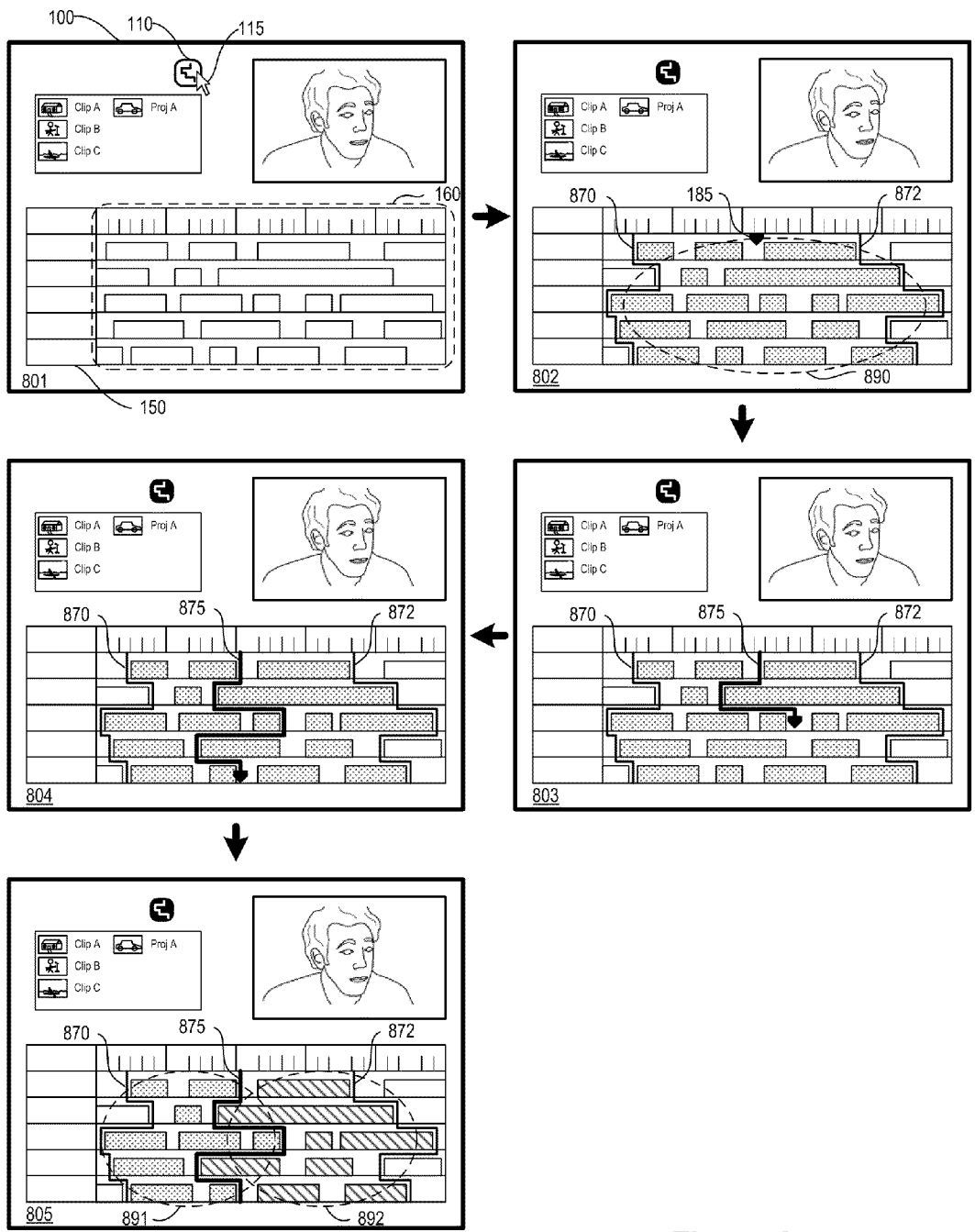
FIG. 8 illustrates an example of the operation of drawing a single border to bifurcate a previously defined composite presentation part into two new composite presentation parts.

As shown in FIG. 7, the process 700 starts when a user activates the grouping tool. The first and second stages 801-802 in FIG. 8 show the grouping tool being activated through the user's selection of the grouping activation item 110 (e.g., by moving the cursor 115 over the item 110 and performing a click operation). The moveable drawing element 185 appears in the composite display area 150, indicating that the grouping tool is active and that the user may use the moveable drawing element to draw a new border. In addition, a composite presentation part 890 and its two borders 870 and 872 become visible in the composite display area 150. Some embodiments also visually distinguish media clips belonging to the composite presentation part 890 (e.g., by cross hatching or highlighting). It is worth noting that if no borders or boundaries have been previously drawn to define a composite presentation part, some embodiments initially define all media clips in the timeline as belonging to one composite presentation part that encompasses the entire timeline.

Next, the process 700 initiates (at 710) a border-draw process that lets a user bifurcate a previously defined composite presentation part by drawing a single border in the composite display area. One example of a process of drawing a border in the composite display area was described above by reference to FIG. 4. In some embodiments, a user may also direct the drawing tool to automatically draw a border from one location in the composite display area to another location as described above by reference to FIG. 6. The third and fourth stages 803-804 in FIG. 8 illustrate the drawing of a single border 875 that bifurcates the composite presentation part 890.

After 710, the process 700 determines (at 715) whether the grouping tool has been canceled or deactivated. If so, the process ends. If not, the process next determines (at 720) whether the drawing process initiated at 710 has been completed (i.e., whether a border has been drawn). Some embodiments make this determination by determining whether the border-drawing process has returned a border to the grouping process 700. If so, the operation proceeds to 720. If not, the grouping process returns to 710 to wait until the border has been completed.

The fifth stage 805 in FIG. 8 illustrates the completion of the drawing of the new border 875. In some embodiments, the new border 875 defines two new boundaries for defining the two new composite presentation parts 891 and 892. The newly drawn border 875 defines the new composite presentation part 891 with the original borders 870. The border 875 also defines the new composite presentation part 892 with the other original border 872. Some embodiments assign media clips associated with the original composite presentation part 890 to one of the two composite presentation parts 891 and 892. As illustrated, media clips originally belonging to the composite presentation part 890 that fall to the left of border 875 are assigned to composite presentation part 891, while those falling to the right of border 875 are assigned to composite presentation part 892.

After determining (at 720) that a border has been drawn, the process 700 performs operations 730 to 750, in order to define two new composite presentation parts that are to replace the composite presentation part that was bifurcated by the newly drawn border. At 730, the process 700 creates two new data structures for the two newly created composite presentation parts to replace the original composite presentation part that has been bifurcated by the newly drawn border. As illustrated in stage 805 of FIG. 8, the original composite presentation part 890 is discarded after being replaced by new composite presentation parts 891 and 892. Other embodiments do not discard the original composite presentation part 890, but instead update it so it becomes either one of the composite presentation part 891 or 892.

The two new data structures created at 730 include several attributes that relate to the media clips that have been assigned to the two composite presentation parts 891 and 892. These attributes are defined differently in different embodiments. One example of such a data structure was described above by reference to the fifth stage 105 of FIG. 1. Section II below further elaborates on the CPP data structure and its attributes for some embodiments of the invention.

After the two composite presentation part data structures have been created, the process 700 populates (at 740) the data structures. The process 700 populates each entry in the composite presentation part data structures with its corresponding actual attribute. In some embodiments, a composite presentation part has attributes that reference media clips associated with the composite presentation part. For some of these embodiments, the process fills the two composite presentation part data structures with the pointers or references to the media clips assigned to these two composite presentation parts after the bifurcation. In some embodiments, some of the entries populated are data of the borders used to define the composite presentation parts (e.g., borders 870 and 875 for composite presentation part 891; borders 872 and 875 for composite presentation part 892).

After creating and populating the two composite presentation part data structures, the process 700 associates (at 750) the two new composite presentation parts with the composite presentation currently being composited by the media editing application. As mentioned above, some embodiments have a navigation tool that allows a user to select a navigation marker in order to navigate to the location of clips or composite presentation parts in the timeline. For some of these embodiments, the process 700 creates (at 760) two navigation markers in the navigation tool and links the two newly created composite presentation parts to the two navigation markers. The navigation markers and the navigation tool will be described further in detail in Section IV below. After creating the navigation markers in the navigation tool, the process 700 ends.

D. Defining a Boundary by One Continuous Dragging Operation

In some embodiments, the user can define one complete boundary about several media clips by dragging the moveable drawing element in one continuous drag operation to completely surround the media clips. Also, in some embodiments, the user can drag the moveable drawing element to draw a partial boundary that partially surrounds several media clips. The drawing tool then automatically completes this partial boundary in order to surround the media clips. An example of drawing a boundary by one continuous dragging operation to completely surround the media clips will be described below by reference to FIG. 9, and an example of having the drawing tool automatically complete a partially drawn boundary will be described below by reference to FIG. 10.

1. Completely Drawn Boundary

Figure 9:
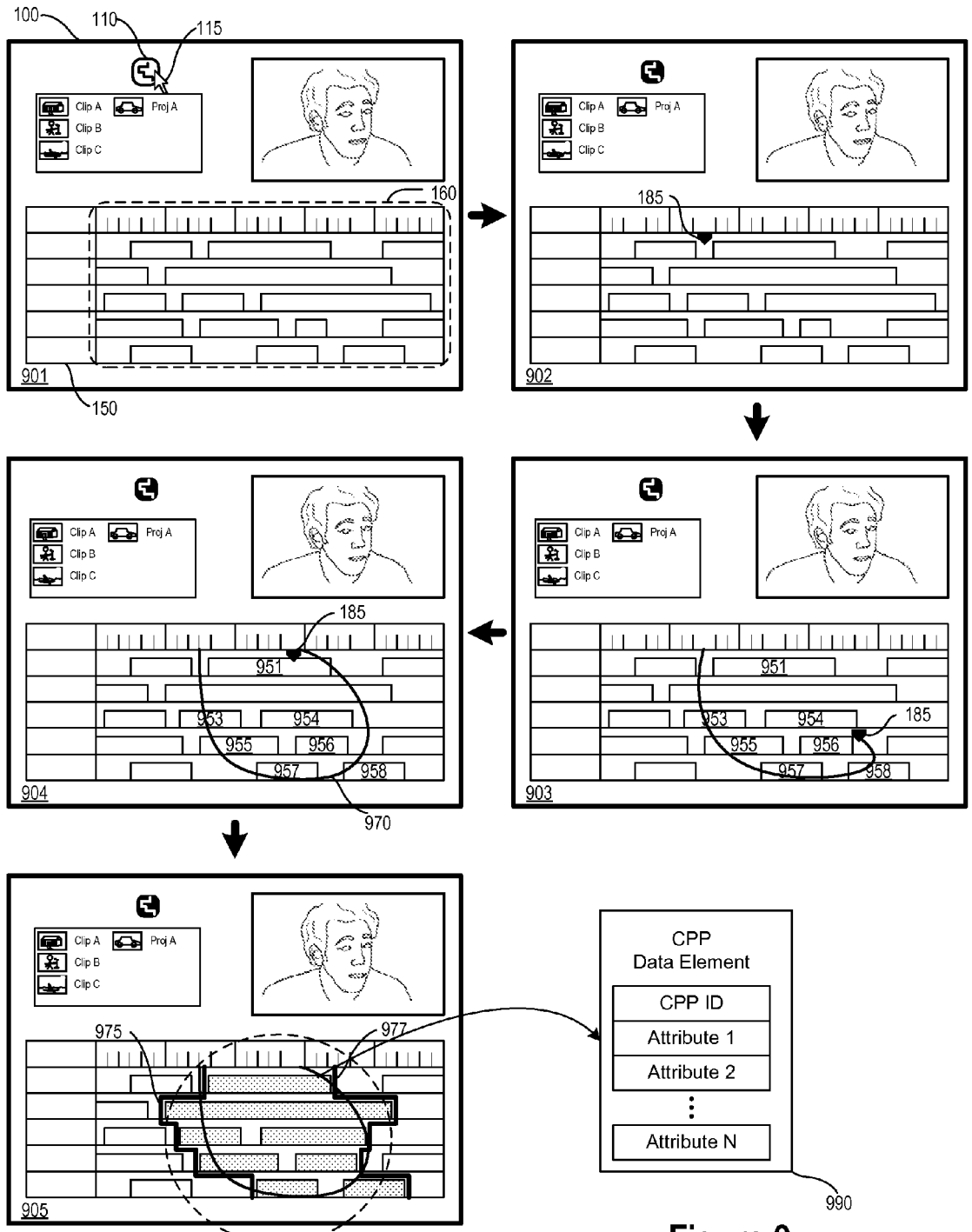
FIG. 9 illustrates an example of drawing a boundary by one continuous dragging operation to completely surround a set of media clips in the composite display area.

FIG. 9 illustrates an example of drawing a boundary by one continuous dragging operation to completely surround a set of media clips in the composite display area 150 of the GUI 100 of FIG. 1. This example is illustrated in FIG. 9 in terms of five operational stages 901-905 of the GUI 100. The first stage 901 is before the start of the drawing operation.

The second stage 902 displays composite display area 150 after the grouping tool has been activated upon the selection of the grouping activation item 910. FIG. 9 illustrates this activation by changing the appearance of UI item 110 and by displaying the moveable drawing element 185 in the composite display area 150. In some embodiments, the location of the moveable drawing element 185 in the composite display area indicates the origin from which the boundary will be drawn. In some of these embodiments, the user may move the moveable drawing element 185 elsewhere in the composite display area (e.g., may move this element along the timeline) before starting to draw the boundary at another location in the composite display area (e.g., at another location along the timeline).

The third stage 903 shows the moveable drawing element 185 being dragged about the composite display area to draw a boundary 970. The moveable drawing element 185 has been dragged from its original location to another location in the composite display area. This dragging has resulted in the curve 970. In some embodiments, the moveable drawing element 185 continues to draw as long as the user moves the drawing element while continuing with the selection of the drawing element (e.g., by not releasing the mouse button or by continuing to touch the touchscreen).

The fourth stage 904 displays the moveable drawing element after it has drawn a complete boundary. In some embodiments, the drawing tool terminates the boundary drawing operation as soon as the user stops selecting the moveable drawing element 185 (e.g., by releasing the mouse button or by not touching the touchscreen). In other embodiments, the drawing tool terminates the boundary drawing operation as soon as the drawn boundary reaches one side of the composite display area 150.

The boundary curve 970 is a complete boundary that completely surrounds a number of clips in the composite display area 150. In some embodiments, a curve forms a complete boundary if it leaves no gap in the composite display area. For example, the curve 970 is a complete boundary because it starts and ends at the edges of the composite display area and has no gap in the composite display area 150. In some embodiments, a complete boundary need not start and end at the edge of the composite display area. In some such embodiments, a continuously drawn graph that intersects itself within the composite display area can define a complete boundary.

The fifth and final stage 905 illustrates the creation of a composite presentation part 990 based on a grouping of clips surrounded by the boundary line/curve 970. In some embodiments, the grouping tool includes only clips that lie entirely within the boundary 970 (i.e., clips 954, 956, and 957) in the newly created composite presentation part 990, while other embodiments also include clips intersected by the boundary 970 (i.e., clips 951, 953, 955, and 958) within this composite presentation part 990.

As in the fifth stage of FIG. 1, some embodiments create a data structure for the newly created composite presentation part 990. In addition to storing information relating to the clips surrounded or intersected by the boundary 970 in the data structure, some embodiments also store the data relating to the boundary 970. For example, some embodiments dissolve the boundary 970 into a number of control points and store those control points in the data structure. Other embodiments trace the edges of the included media clips to create borders 975 and 977 (similar to those described above in sub-sections A-C) and store those borders for the newly created composite presentation part 990.

2. Partially Drawn Boundary

Figure 10:
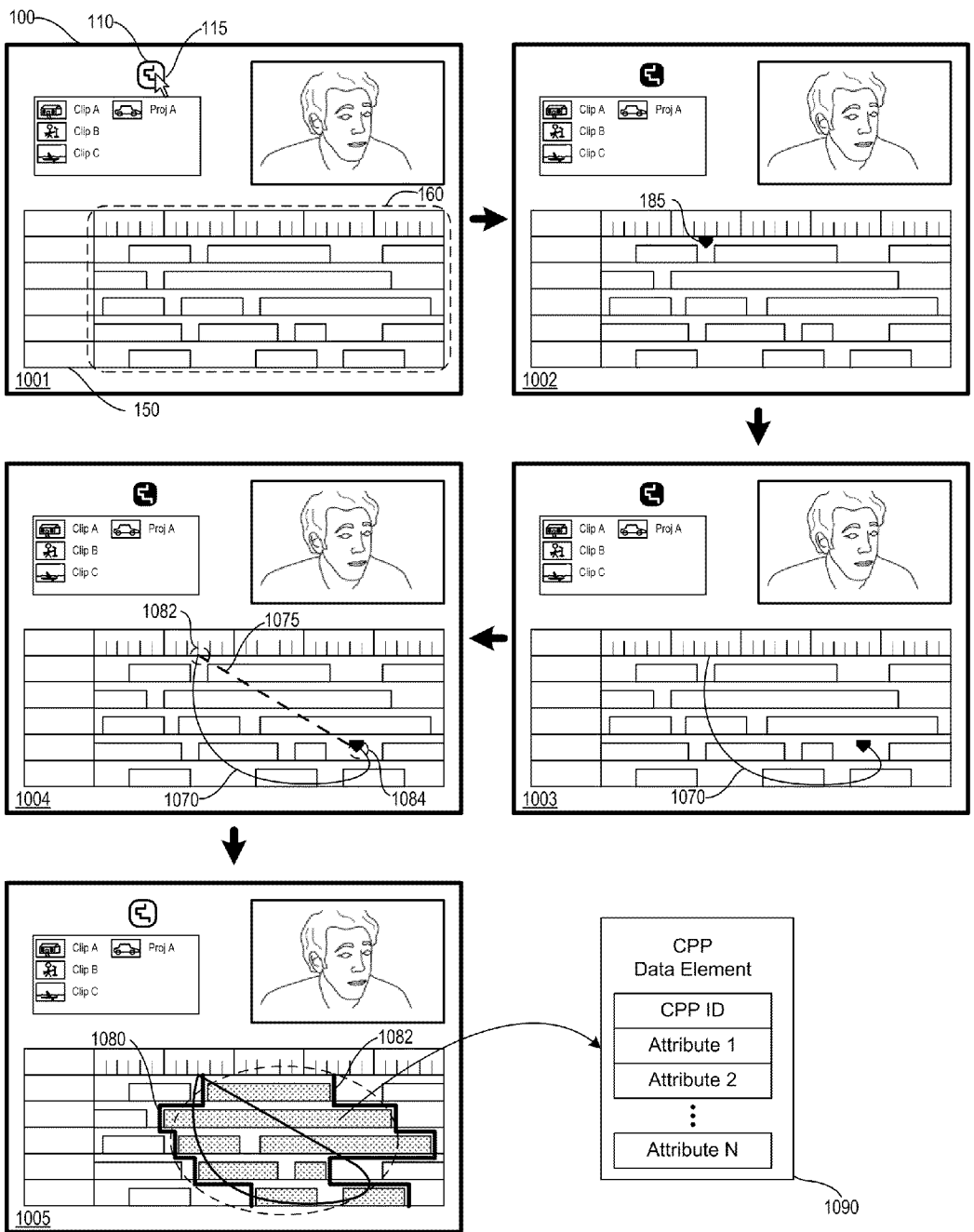
FIG. 10 illustrates an example of drawing a boundary by one continuous dragging operation that only partially surround a set of media clips in the composite display area.

In some embodiments, the user can use the moveable drawing element 185 to define a grouping even if the boundary does not completely surround a set of media clips. In some of these embodiments, the drawing tool automatically extends the boundary to completely surround a set of media clips in the composite display area. FIG. 10 illustrates such an action for the GUI 100 of FIG. 1 in five stages 1001-1005. The first stage 1001 is the stage before the start of the drawing operation.

In the second stage 1002, the user has selected the grouping activation item 110 to activate the grouping tool. In the third stage 1003, the user has dragged the moveable drawing element 185 about the composite display area 150 to draw a boundary 1070. However, unlike in stage 903 of FIG. 9, the user has stopped selecting the moveable drawing element 185 before completing the boundary. In some embodiments, once the user stops selecting the moveable drawing element 185 (e.g., by releasing the mouse button or by not touching the touchscreen), the moveable drawing element 185 stops the manual boundary drawing operation in response to the user input.

In the fourth stage 1004, the drawing tool automatically completes the boundary 1070 that was partially drawn. In some embodiments, the drawing tool automatically completes the boundary 1070 by supplying a segment 1075 to connect the starting point 1082 and the end point 1084 of the boundary 1070. The segment may be a straight line, a curve, or any other geometric entity capable of connecting the starting point 1082 and the end point 1084. In other embodiments, the drawing tool completes the partially drawn boundary by other techniques, such as supplying two segments by extrapolating both ends of the partially drawn boundary. One manner for automatically completing a partially drawn boundary in a display area is described in U.S. patent application Ser. No. 12/433,872, now issued as U.S. Pat. No. 8,885,977, which is incorporated herein by reference.

Lastly, the fifth stage 1005 illustrates the creation of a new composite presentation part 1090 to group the set of media clips that are surrounded by the boundary defined in the fourth stage 1004. Similar to the fifth stage 905 of FIG. 9, some embodiments create a data structure for the newly created composite presentation part 1090 in order to store information relating to the grouped clips. Some embodiments also store data relating to the boundary of the newly created composite presentation part (e.g., curve 1070, segment 1075). Some embodiments trace the edges of the included media clips to create borders 1080 and 1082 (similar to those described above in sub-sections A-C) and store those borders for the newly created composite presentation part 1090.

E. Adjust the Boundary of a Composite Presentation Part

The methods described above in sub-sections A, B, C and D produce in some embodiments user adjustable boundaries. An example of adjusting a boundary by moving a segment of a border that forms the boundary will be described by reference to FIG. 11. After this description, another example of adjusting a boundary by moving one of the control points through which a boundary is defined will be described below by reference to FIG. 12.

1. Adjusting a Border with Segments

Figure 11:
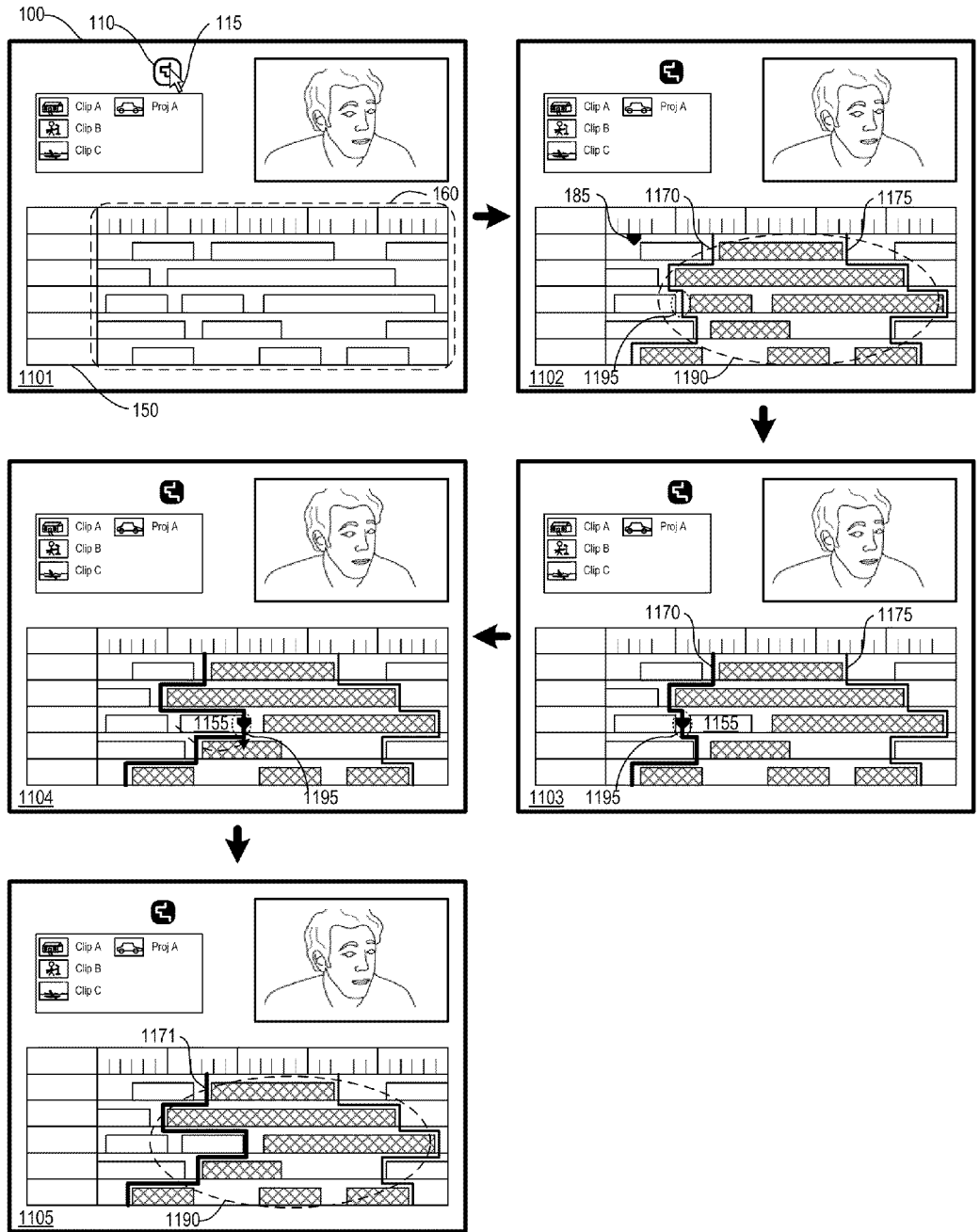
FIG. 11 illustrates an example of adjusting a boundary by moving a segment of a border that forms the boundary.

In addition to allowing adjustment of a border while it is being drawn, some embodiments also allow a user to adjust a border after it has been defined. In some of these embodiments, the user selects and moves a border segment that is aligned with one media clip edge to another media clip edge. FIG. 11 illustrates an example of such a move in terms of five stages 1101-1105 of operation of the GUI 100 of FIG. 1.

The first stage 1101 shows the GUI 100 at the beginning of a boundary adjustment operation. The composite display area 150 displays several media clips, but no border is visible in the composite display area at this stage. The second stage 1102 illustrates the activation of the grouping tool through the selection of the activation item 110 (e.g., through a click operation after the positioning of the cursor 115 over the item 110). Upon the activation of the grouping tool, the composite display area 150 displays the moveable drawing element 185, indicating that the grouping tool is active and the user may use the moveable drawing element to define new borders or to adjust existing borders. In addition, two previously defined borders 1170 and 1175 become visible in the composite display area upon the activation of the grouping tool. In some embodiments, these borders were defined by the drawing tool in a single border drawing process as described earlier by reference to FIG. 3, or in an automatic border generation process as described earlier by reference to FIG. 5. In this example, borders 1170 and 1175 also define a composite presentation part 1190.

The third stage 1103 illustrates the selection of one of the segments of the border 1170 for adjustment. Some embodiments visually distinguish (e.g., by highlighting or thickening) the border 1170 as it is selected. As mentioned above, a border in some embodiments include multiple segments that are defined by reference to edges of the clips. In some of these embodiments, a user can select one border segment and move it from its alignment with one clip edge to align with another clip edge.

In some embodiments, the user selects a border segment by using a cursor pointer or touching the screen at the position of the border segment. In the example illustrated in FIG. 11, the grouping tool changes the appearance of the cursor pointer or touchscreen contact point in the composite display area 150 to the moveable drawing element 185. In the example illustrated in FIG. 11, the user selects the segment 1195 of the border 1170 that corresponds to the left edge of clip 1155.

In the fourth stage 1104, the user moves the selected segment 1195 from the left edge of the clip 1155 to the right edge of this clip 1155. Some embodiments snap the moved segment from one clip edge to the next clip edge that is closest to the cursor or contact point location as the user moves the cursor or contact point. As illustrated in FIG. 11, adjusting the border 1170 has moved clip 1155 outside of the boundary of the composite presentation part 1190, which results in the exclusion of the clip 1155 from the composite presentation part 1190.

Lastly, the fifth stage 1105 displays an adjusted border 1171 and the composite presentation part 1190 after it has been altered. As the adjusted border 1171 has changed the definition of the composite presentation part 1190 to exclude clip 1155, some embodiments disassociate the composite presentation part 1190 and the clip 1155 by updating the affected data structures. Some embodiments also update the boundary data of the composite presentation part 1190 according to the adjusted border.

2. Adjusting a Continuous Boundary

Like a border defined by reference to clip edges, a user can also adjust a boundary that was defined by one continuous dragging operation described above in sub-section D. In some embodiments, the boundary that results from such a continuous dragging operation dissolves into borders with segments that align with the edges of the media clips. Accordingly, in some such embodiments, a user could adjust such a boundary by moving the border segments in the manner described above by reference to FIG. 11.

Figure 12:
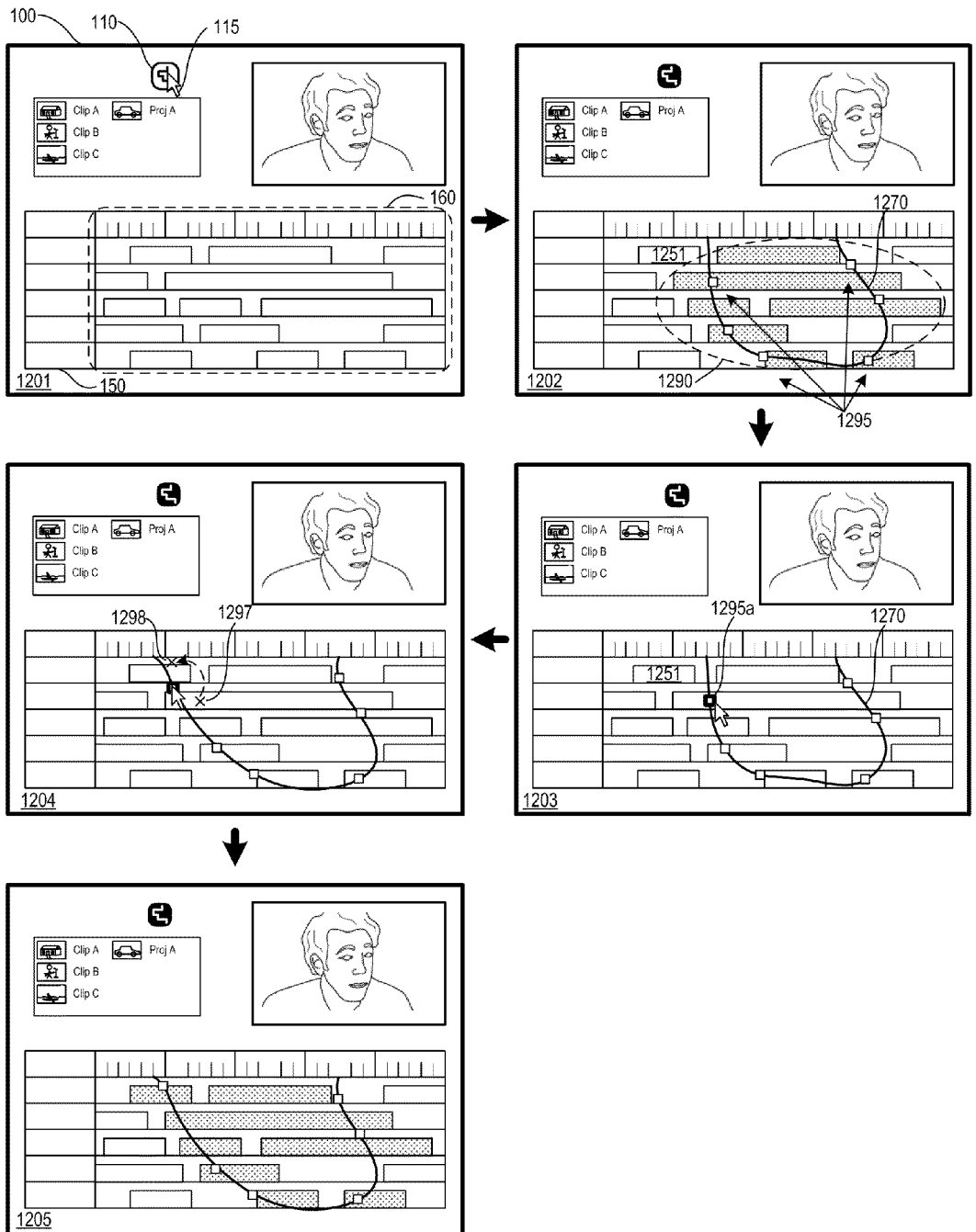
FIG. 12 illustrates an example of adjusting a boundary by moving one of the control points through which a boundary is defined.

FIG. 12 illustrates another manner for adjusting the boundary that was created by one continuous dragging operation in some embodiments. This alternative approach requires movement of control points that are used to define the boundary in some embodiments. FIG. 12 illustrates the adjustment through five operational stages 1201-1205 of the GUI 100 of FIG. 1.

Like the stage 1101 of FIG. 11, the first stage 1201 shows the GUI 100 at the beginning of a boundary adjustment operation. The composite display area 150 displays several media clips, but no boundary is visible in the composite display area at this stage. The second stage 1202 illustrates the activation of the grouping tool through the selection of the activation item 110 (e.g., through a click operation after the positioning of the cursor 115 over the item 110). Upon the activation of the grouping tool, the composite display area 150 displays a boundary 1270 that defines a composite presentation part in terms of a set of clips that now appear as shaded in the composite display area 150. In this example, the clips that are intersected or encompassed by the boundary 1270 form a composite presentation part 1290.

Also, the boundary 1270 is defined in this example in terms of several moveable control points 1295. When the grouping tool is activated and the location of the composite presentation that contains the boundary is being displayed in the composite display area, the boundary appears with these control points in some embodiments in order to indicate that the grouping tool is active and the user may adjust the boundary 1270. After activation of the grouping tool, some embodiments do not automatically show these control points on the boundary, but instead wait for the user to select the boundary for adjustment to present these points. Also, some embodiments present these control points as the boundary is being drawn. In some embodiments, the control points allow the boundary 1270 to be stored as a parameterized curve according to a particular equation or a set of equations.

The third stage 1203 illustrates a user's selection of a control point 1295*a*. Some embodiments visually distinguish (e.g., by highlighting or thickening) a selected control point. In some embodiments, a user can redefine the boundary 1270 by dragging one of its control points (e.g., 1295*a*) elsewhere in the composite display area 150. In some embodiments, the user selects a control point by using a cursor pointer or touching the screen at the position of the point.

The fourth stage 1204 illustrates the adjustment of the boundary 1270 by moving the control point 1295*a* from a position 1297 to a position 1298 in the composite display area 150. The user has moved the control point 1295*a* in order to redefine the parameterized curve (i.e. boundary 1270) so the adjusted boundary intersects the clip 1251. This intersection causes the clip 1251 to be included in the composite presentation part 1290, given that in the example illustrated in FIG. 12 an intersection of a clip with a boundary causes the clip to be included in the group defined by the boundary, The fifth and last stage 1205 displays the boundary 1270 after the completion of the boundary adjustment operation. The composite presentation part 1290 has been updated to include the clip 1251 and the adjusted boundary 1270.

The parameterized curve approach illustrated in FIG. 12 for the case of a continuously drawn border is also used in some embodiments to define borders that are drawn through the operation of the border drawing processes that were described above by reference to FIGS. 3 and 5. In other words, some embodiments specify control points for defining borders, such as those described in FIGS. 3 and 5. These control points can then be used to adjust such borders in some embodiments.

II. Creation and Manipulation of Composite Presentation Part

As mentioned above, the grouping tool defines a boundary about several media clips in the composite display area in order to group the media clips. In some embodiments, the grouping tool groups the media clips into one composite presentation part that can be specifically selected and operated on in the composite presentation. Examples of operations that can be performed on a composite presentation part include moving the part (i.e., moving all the clips that are within the part together by selecting and moving the part), copying the part (i.e., copying all the clips that are within the part by selecting and copying the part), etc.

Before describing some examples of common manipulations of composite presentation parts in sub-section B, the creation of a composite presentation part data structure will first be introduced in sub-section A.

A. Creation of a Composite Presentation Part

As mention above by reference to FIGS. 1 and 2, the grouping tool creates a data element to represent the composite presentation part (CPP) that it populates upon the completion of a boundary drawing operation (e.g., by drawing two borders). In some embodiments, this data structure includes (1) a CPP identification that identifies the composite presentation part, and (2) several attributes that relate to the clips that have been grouped within the composite presentation part.

Figure 13:
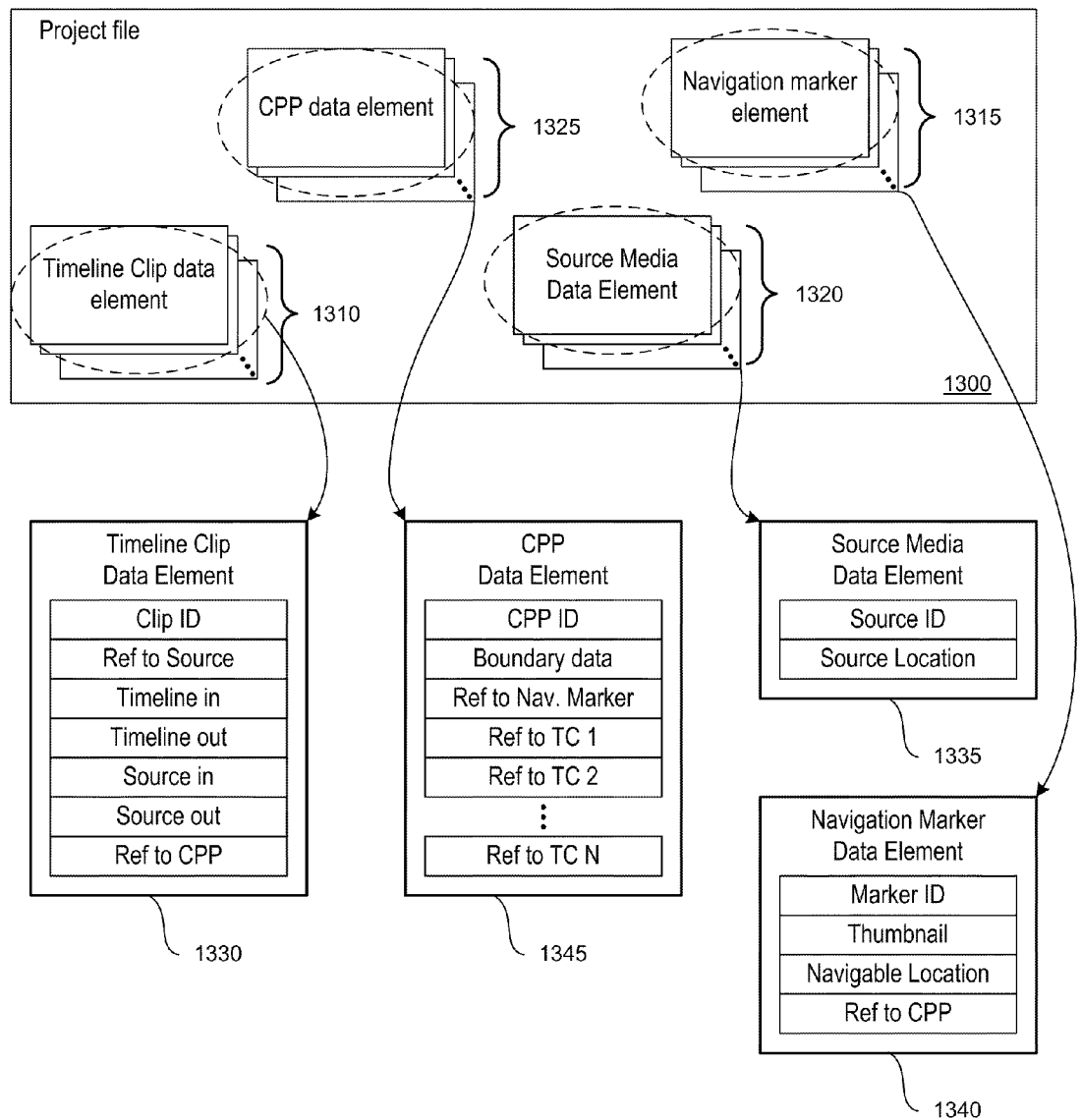
FIG. 13 illustrates a project file of some embodiments.

For some embodiments of the invention, FIG. 13 illustrates an example project file 1300 that includes timeline clip data elements 1310, CPP data elements 1325, navigation marker elements 1315, and source media data elements 1320. This figure also illustrates an example timeline clip data element 1330, an example source media data element 1335, an example navigation marker data element 1340, and an example composite presentation part data element 1345. As shown in FIG. 13, the timeline clip data element 1330 of some embodiments include a clip identifier, a reference to a source media, in and out points in the source media, and start and end times in the timeline. The clip data element 1330 also includes a reference (e.g., a pointer) to a CPP data element from the set 1325 with which the clip is associated. In some embodiments, this association is one of the attributes populating the CPP data structure during the operation 240 of FIG. 2.

The source media data element 1335 of some embodiments includes data that defines a piece of unassociated source media. In some embodiments, the source media data includes a source identifier and a source media location (that is, a location on a hard disk or other storage where the source media is found). The source inentifier is referenced in some embodiments by a particular timeline clip data element from the set 1310 to identify the source media as the source for the particular timeline clip.

The CPP data element 1345 of some embodiments includes data defining the particular composite presentation part. The data includes a CPP identifier, boundary data, a reference to a navigation marker, and references to each of the timeline clips grouped into the composite presentation part. The boundary data is the data stored by the drawing tool upon completion of a boundary or border drawing operation that can be used by the media editing application to display the boundary in the composite display area. In some embodiments, the boundary data stores the location of the boundary in the timeline. In some embodiments, the boundary data also stores the geometric parameters of the boundary. The boundary data in some embodiments is required for analyzing whether a composite presentation part fits into a particular location in the timeline during certain operations (e.g., move or copy) as described further below by reference to FIGS. 15-19.

The navigation marker element 1340 of some embodiments includes data defining a navigation marker. The data includes a navigation marker identifier, a thumbnail image, a navigable location in the timeline, and a reference to a CPP data element.

Figure 14:
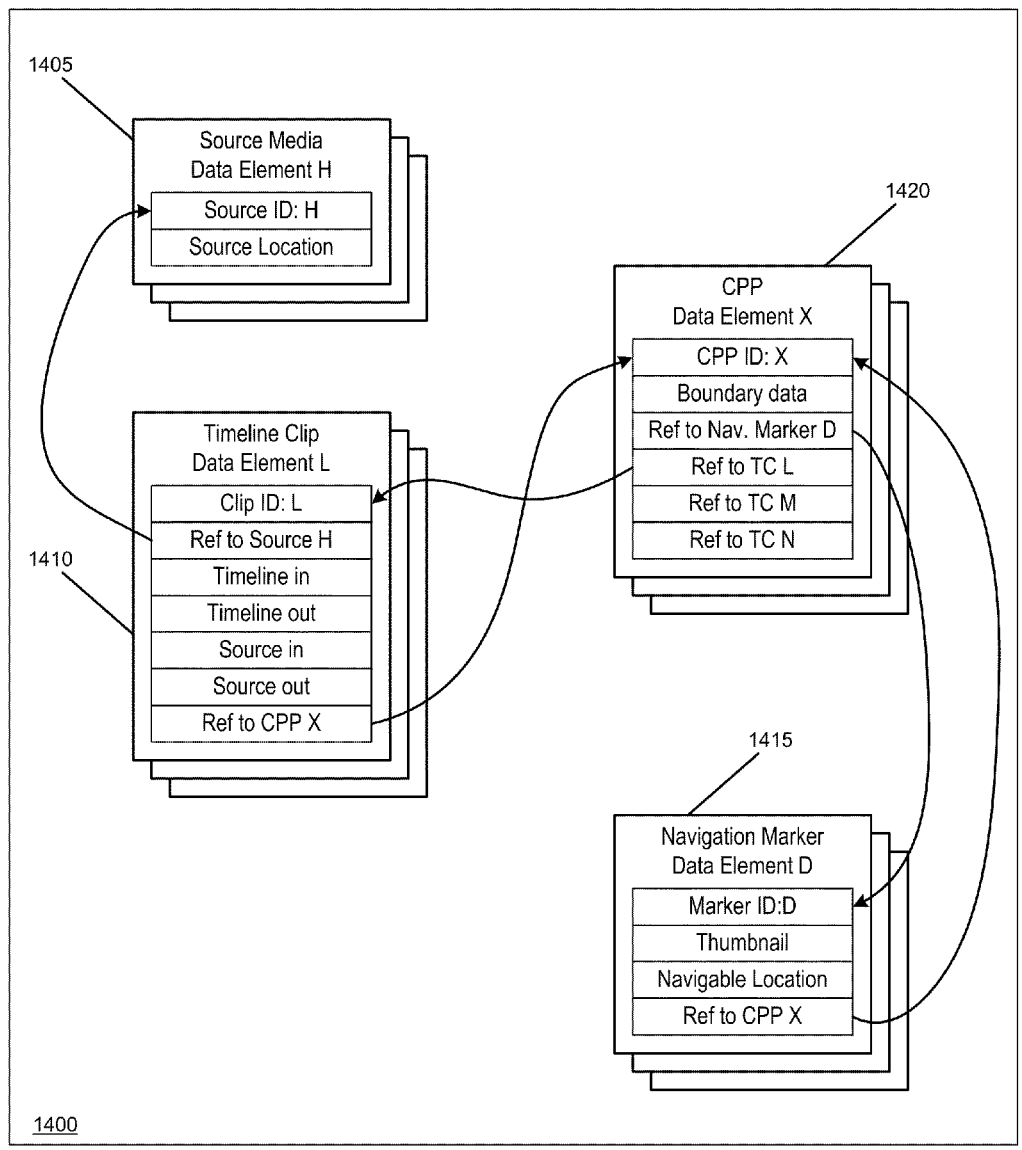
FIG. 14 illustrates example data elements of some embodiments.

FIG. 14 illustrates an example of a project file 1400 that includes source media data elements 1405, timeline clip data elements 1410, navigation markers 1415, CPP data elements 1420, and the relationships between these elements. For each of these data elements, FIG. 14 shows one example. Specifically, it shows Source Media H, Timeline Clip L, CPP Data Element X, and Navigation Marker Data Element D.

Timeline Clip L (1410) includes a reference to Source Media H (1405) as well as in and out points within Source Media H. Timeline Clip L also include timeline start and end points and a reference to CPP data element X. As Timeline Clip L is only associated with one CPP in some embodiments, the timeline start and end points must be within the boundary specified by the boundary data for CPP data element X in these embodiments.

CPP data element X (1420) includes references to three timeline clips and one navigation marker. CPP X includes a reference to Timeline Clip L. CPP X also includes a reference to Navigation Marker D. In some embodiments, pointers are used for these references. CPP X also includes boundary data.

Navigation marker data element D (1415) includes a thumbnail image, as well as a reference to CPP data element X, the composite presentation part with which the source media is associated. In some embodiments, Navigation marker D's navigable location corresponds to the location of CPP X in the timeline.

A timeline clip data element such as the element 1410 is created by the media-editing application of some embodiments when a user edits a clip into the timeline. Similarly, a CPP data element such as element 1420 is created by the media editing application of some embodiments when a user uses the grouping tool to create a composite presentation part. The link between timeline clip elements such as element 1410 and CPP element such as 1420 are first established when the CPP element is created by the grouping tool, and can be changed subsequently when the CPP element is redefined by operations such as border adjustment. The above examples illustrate one particular method for defining associations of clips and source media to composite presentation parts. One of ordinary skill in the art will recognize that many different methods for defining such associations exist.

B. Manipulation of a Composite Presentation Part

In some embodiments, the media clips grouped by the grouping tool can be manipulated together as one integral unit. For example, special visual or audio effects can be applied to all clips within a composite presentation part in one user operation without affecting clips outside the composite presentation part. In some embodiments, a user can move or copy a composite presentation part from one location in the timeline to another location in the time line. In some embodiments, the user can also replace one composite presentation part with another. An example of an operation to move or copy a composite presentation part will be described by reference to FIGS. 15-20. An example of an operation to replace a composite presentation part will be described by reference to FIG. 21.

1. Moving and Copying a Composite Presentation Part

In some embodiments, a user can select and move a set of grouped clips together in the timeline from one location to another. For some embodiments in which the grouping tool creates a composite presentation part based on the grouped clips, a user can move the grouped clips together in the timeline as one composite presentation part.

Figure 15:
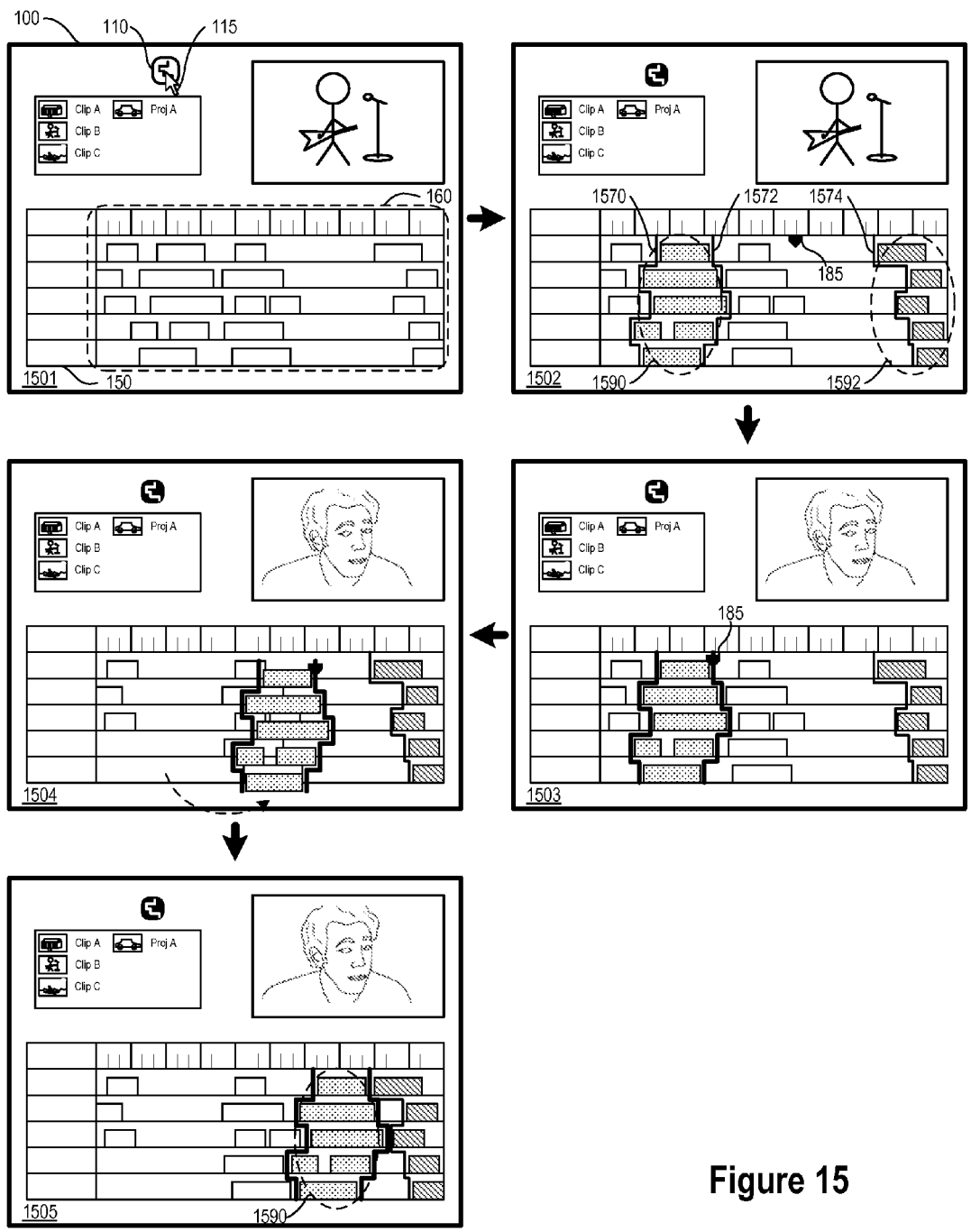
FIG. 15 illustrates an example of an operation to move a composite presentation part.

Moving a composite presentation part will now be described by reference to FIG. 15. This figure illustrates a move operation in terms of five operational stages 1501-1505 of the GUI 100 of FIG. 1. The first stage 1501 illustrates the GUI 100 before the move operation has started. The composite display area 150 displays several media clips, but no border is visible in the composite display area at this stage.

The second stage 1502 illustrates the activation of the grouping tool for selection of composite presentation parts. Some embodiments activate the grouping tool when the user selects the grouping activation item 110 (e.g., by moving the cursor 115 over the item 110 and performing a click operation). Upon the selection of the activation item 110, the composite display area 150 displays the moveable drawing element 185, indicating that the grouping tool is active and the user may use the moveable drawing element to draw a border or boundary as described above in Section I, or to select a composite presentation part for an edit operation such as move, copy, boundary adjustment, etc.

In some embodiments, visual indications of grouping of media clips (i.e., visual indications of composite presentation parts) appear in the composite display area 150 upon activation of the grouping tool. In this example, borders 1570, 1572 and 1574 appear in the composite display area, visually marking the composite presentation parts 1590 and 1592. To further highlight the composite presentation parts, some embodiments visually distinguish (e.g., cross-hatched or colored) the media clips encompassed by two borders from other media clips in the composite display area. In the example illustrated, clips falling between borders 1570 and 1572 are dotted to indicate that they belong to the composite presentation part 1590. In some embodiments, the composite display area 150 also includes scrolling and zooming functions, so other media clips and composite presentation parts may be brought into view in the composite display area 150.

The third stage 1503 illustrates the selection of one of the composite presentation parts in the composite display area 150. In some embodiments, a user can select a composite presentation part by using the cursor (e.g., by performing a click-and-hold operation over the composite presentation part) or touchscreen (e.g., touching the screen at the location of the composite presentation). For instance, in the third stage 1503, the user has moved the moveable drawing element 185 over the border 1570 and performed a click operation to select the composite presentation part 1590. In some embodiments, a user may also select a composite presentation part by selecting one of the grouped clips associated with the composite presentation part.

The fourth stage 1504 illustrates the movement of the composite presentation part 1590 from its original location in the timeline to a new location. In some embodiments, a user can graphically select and drag a composite presentation part by using the cursor (e.g., by performing a click-and-drag operation) or touchscreen (e.g., moving the touchscreen contact point). In some embodiments, the user may also accomplish the movement of a composite presentation part by other input mechanisms, such as invoking a pop-up menu or by typing a sequence of keystrokes.

Lastly, the fifth stage 1505 illustrates the composite presentation part 1505 at its new location following the moving operation. In this example, the composite presentation part 1590 is able to fit into its new location without any of its grouped clips overlapping any other media clips. However, in some embodiments, the composite presentation part being moved may not always fit into the intended destination without overlapping media clips at or near the intended destination.

Different scenarios may arise when fitting a composite presentation part being moved into its new location in the timeline, and different embodiments handle these scenarios differently. For instance, some embodiments slide away other clips or composite presentation parts in the timeline to avoid collision with the composite presentation part being moved, while other embodiments abort the moving operation and maintain the composite presentation part being moved at its original location. The composite presentation part being moved may abut another composite presentation part at a logical boundary, which a user may define in some embodiments as a guide for juxtaposing composite presentation parts. A clip belonging to one composite presentation part may in some embodiments extend beyond the logical boundary. When the clip extending beyond the logical boundary overlaps another clip on the same track, some embodiments create subtracks to handle the overlapping clips.

Figure 16:
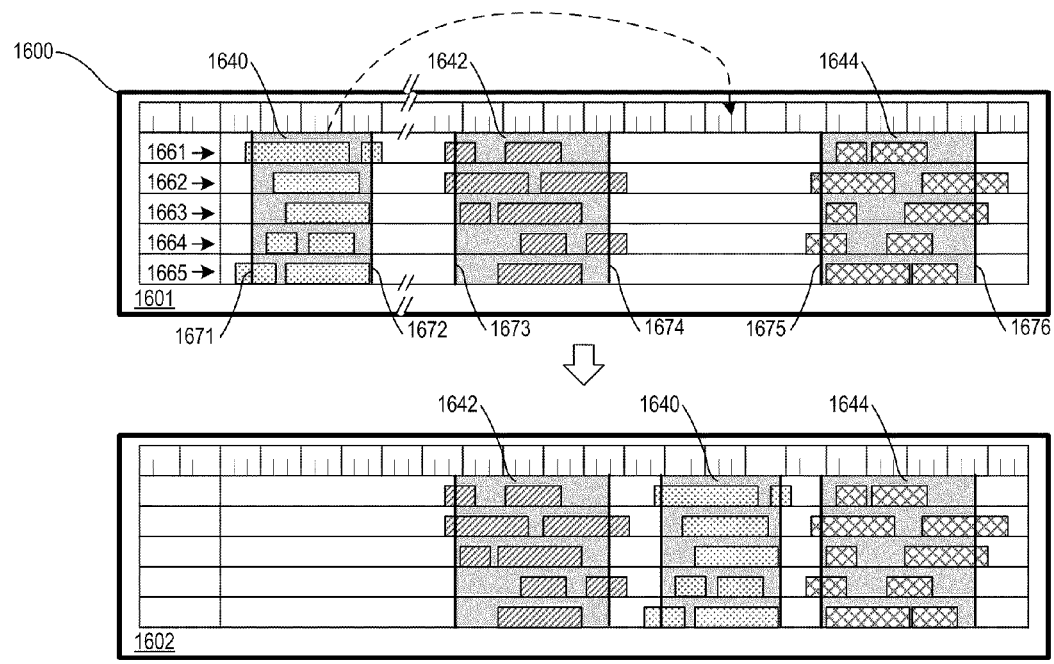
FIGS. 16-19 illustrate examples of different scenarios that may arise when moving a composite presentation part into a new location in the timeline.
Figure 17:
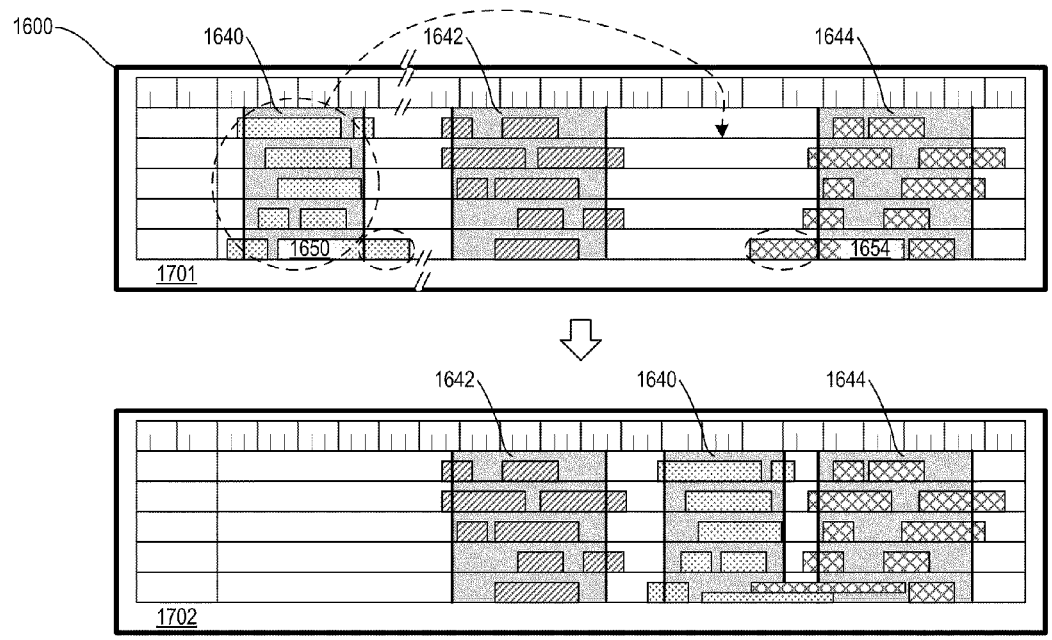
Figure 18:
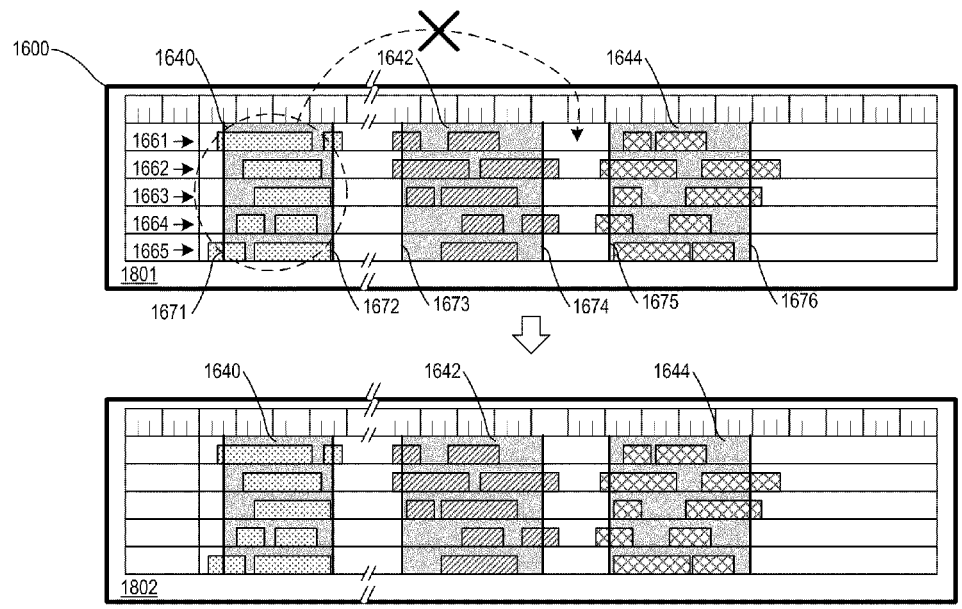
Figure 19:
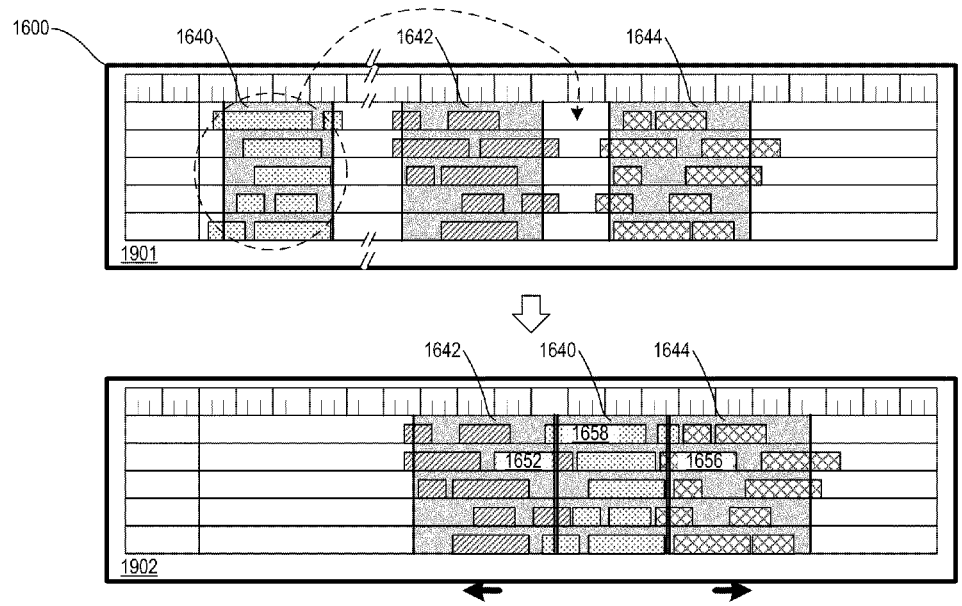

FIGS. 16-19 illustrate four of such possibilities and how some embodiments handle them. FIG. 16 illustrates an example of when the composite presentation part being moved fits its new location without any collision or conflict with other media clips or composite presentation parts in the timeline. FIG. 17 illustrates an example of when such conflict can be resolved by creating a subtrack. FIG. 18 illustrates an example of when the composite presentation part being moved cannot fit into its destination location because of other composite presentation part or clips at or near the destination location. FIG. 19 illustrates an example of when other clips or composite presentation parts occupying the destination of the move operation can slide along the timeline in order to fit the composite presentation part being moved.

FIGS. 16-19 illustrate a timeline 1600 that includes multiple tracks 1661-1665. Within the timeline 1600 are three composite presentation parts, 1640, 1642 and 1644. Each composite presentation part includes several media clips. The composite presentation parts are also illustrated with their logical boundaries. Specifically, composite presentation part 1640 is illustrated with its logical boundaries 1671 and 1672, composite presentation part 1642 is illustrate with its logical boundaries 1673 and 1674, and composite presentation part 1644 is illustrated with its logical boundaries 1675 and 1676.

For some embodiments, the logical boundaries 1671-1676 specify how closely composite presentation parts can be placed next to each other. Specifically, composite presentation parts can abut each other at the logical boundaries, but cannot overlap beyond the logical boundaries. In some embodiments, media clips belong to one composite presentation part may extend beyond the logical boundaries.

In some embodiments, logical boundaries are defined in addition to the boundaries or borders used to group media clips and define composite presentation parts described earlier in Section I. In some embodiments, the boundaries or borders defining composite presentation parts can also serve as logical boundaries.

In some embodiments, a user can define a logical boundary for a composite presentation part by using the drawing tool. In some of these embodiments, a user can drag the moveable drawing element across tracks of the composite display area to define a logical boundary, or invoke the automatic drawing operation of the drawing tool to draw the logical boundary. In some embodiments, the logical boundaries can be straight lines that do not have several segments referencing edges of clips. In some of these embodiments, a user can define a logical boundary by selecting a position in the timeline (e.g., by using a cursor controller or a keyboard.)

FIG. 16 illustrates the example of moving a composite presentation part without any conflicts or collisions for the timeline 1600 at stages 1601-1602. In the first stage 1601, the user has selected the composite presentation part 1640 in the timeline 1600, intending to move it to a location between composite presentation parts 1642 and 1644. As illustrated, there is sufficient room to fit the composite presentation part 1640 at the intended new location.

The second stage 1602 illustrates the timeline 1600 after the composite presentation part 1640 has been moved. No further action is necessary with regard to composite presentation parts 1642 and 1644 as there are no overlapping media clips after the move.

Sometimes the composite presentation part being moved can fit into its new location in timeline 1600 by creating subtracks. FIG. 17 illustrates such an example for the timeline 1600 in two different stages 1701-1702. The first stage 1701 displays the timeline 1600 before moving the composite presentation part 1640. As illustrated, clip 1650 of the composite presentation part 1640 shares the same track 1665 as clip 1654 of composite presentation part 1644, and the two clips will overlap if the composite presentation part 1640 were to be moved into its new location between composite presentation parts 1642 and 1644.

The second stage 1702 displays the timeline 1600 after the composite presentation part 1600 has been moved into its new location. Track 1665 has been divided into two subtracks, with clip 1650 and clip 1654 each occupying a subtrack without overlapping each other. In some embodiments, subtracks will be created as long as clip 1650 is moved into a location that overlaps clip 1654, regardless of whether clip 1654 belongs to a composite presentation part or not. In some embodiments, creation of a subtrack depends on the type of the track or clip being overlapped. For example, in some embodiments, video tracks do not divide into subtracks when clips overlap each other. Some embodiments do not create subtracks. In some of these embodiments, the media editing application creates a new track for clips in an overlapping or conflicting track. Some embodiments create neither track or subtrack for overlapping clips. In some of these embodiments, the media editing application allows clips to overlap each other in some or all tracks of the timeline.

In some embodiments, the composite presentation part being moved cannot fit into its destination location because of other composite presentation parts or clips at or near the destination location. FIG. 18 illustrates such an example for the timeline 1600 in two different stages 1801-1802. The first stage 1801 displays the timeline 1600 before moving the composite presentation part 1640, in which the composite presentation part 1640 is moving into a location in timeline 1600 between the composite presentation parts 1642 and 1644. As illustrated, unless composite presentation part 1642 and 1644 move aside, composite presentation part 1640 cannot move into its destination location without overlapping 1642 and 1644 beyond the composite presentation parts' logical boundaries. In some embodiments, composite presentation parts 1642 and 1644 can move in order to make room for composite presentation part 1640 to move into its new location. However, in some embodiments, the media editing application has to abort the moving operation if it cannot move composite presentation parts 1642 and 1644. For example, in some embodiments, if one or both of the composite presentation parts 1642 and 1644 are fixed or locked to their current locations at the timeline 1600, the move operation of 1640 cannot proceed and will have to be aborted. In some embodiments that allow the user to lock unaffiliated media clips (i.e., not part of any composite presentation parts) to fixed locations in the timeline, the move operation will have to abort if it causes these locked unaffiliated media clips to be overlapped.

The second stage 1802 displays the timeline 1600 after the moving operation has been aborted. In some embodiments, the composite presentation part 1640 remains at its location following the aborted move operation, and all other media clips and composite presentation parts remain at their original location in the timeline 1600.

In some embodiments, clips or composite presentation parts occupying the destination location of the move operation can slide along the timeline in order to fit the composite presentation part being moved. FIG. 19 illustrates such an example for the timeline 1600 in two different stages, 1901 and 1902. The first stage 1901 is at the same stage as 1801 of FIG. 18, in which the composite presentation part 1640 is moving into a location in the timeline between the composite presentation parts 1642 and 1644. And like FIG. 18, the composite presentation part 1640 does not fit into this new location. However, unlike FIG. 18, the move operation will not be aborted.

In the second stage 1902, composite presentation parts 1642 and 1644 have slid along the timeline in order to make room for the composite presentation part 1640. The composite presentation part 1640 in turn has moved into its new location. In some embodiments, the composite presentation part 1640 abuts its new neighbors at the new location at the logical boundaries. When one composite presentation parts abuts another, some embodiments allow media clips belonging to one composite presentation part to extend past logical boundaries of another composite presentation part (e.g., clips 1652, 1656, and 1658). Some of these embodiments create subtracks when clips extending beyond logical boundaries overlap other clips sharing the same track.

When sliding other media clips in order to make room to complete the move operation, different embodiments adopt different techniques. For example, some embodiments only make enough room in the destination location so the composite presentation part being moved abuts both of its new neighbors, while other embodiments may leave more room. Some embodiments slide as few clips and composite presentation parts as possible in order to leave as many media clips at their original positions as possible. Alternatively, some embodiments slide all clips and composite presentation parts between the original location and the new location of the composite presentation part being moved in order to preserve as many temporal relationships between media clips as possible.

Figure 20:
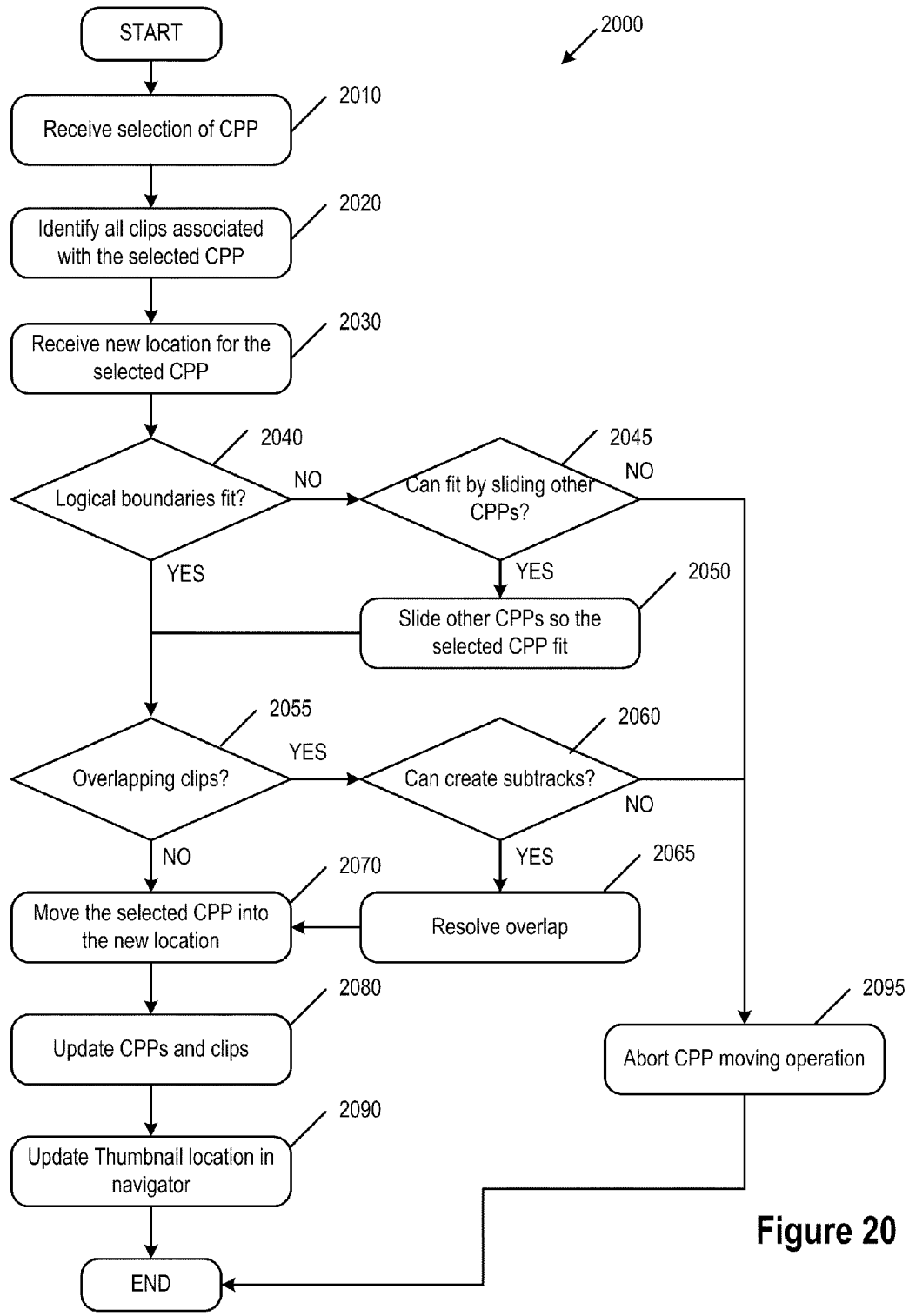
FIG. 20 illustrates an example of a process that some embodiments perform to move a composite presentation part from one location to another in the timeline.

FIG. 20 conceptually illustrates a process 2000 that some embodiments perform to move a composite presentation part from one location to another in the timeline. This process will be described by reference to the examples illustrated in FIGS. 15-19.

The process 2000 starts when the user activates the grouping tool for selection of composite presentation parts. In the example illustrated in FIG. 15, the user activates the grouping tool by selecting the grouping activation item 110. The process next receives (at 2010) a selection of a composite presentation part (CPP). In the example illustrated in FIG. 15, the process receives the selection of a composite presentation part when the user uses the moveable drawing element 185 to select one of the composite presentation parts that became visible after the activation of the grouping tool.

Next, the process 2000 identifies (at 2020) all clips associated with the selected CPP. In some embodiments, the process identifies the associated clips by following the reference pointer stored in the CPP data element. The process next receives (at 2030) a new location for the selected CPP. In the example illustrated in FIG. 15, the process receives this location from the GUI 100 when the user uses the moveable drawing element 185 to drag the selected composite presentation part to a new location in the timeline.

At 2040, the process 2000 determines whether the CPP being selected and moved can fit into its new location in the timeline without overlapping logical boundaries. A composite presentation part may fit into its new location as illustrated in FIGS. 16 and 17, or it may not fit as illustrated in FIGS. 18 and 19. If the CPP fits into its new location at its logical boundaries, the process proceeds to 2055 to determine whether the move would result in overlapping of media clips. If the CPP does not fit into the new location at its logical boundaries, the process proceeds to 2045.

At 2045, the process 2000 in some embodiments examines whether other composite presentation parts or clips can slide way in the timeline so the CPP being moved would not overlap other composite presentation parts beyond the logical boundaries. In some embodiments, a user can assign a media clip or a composite presentation part to a fixed location in the timeline. In some of these embodiments, these fixed media clips can make it impossible for the process to slide away other composite presentation parts. If the process cannot slide away other composite presentation parts in order to make room for the CPP being moved, the process proceeds to 2095 to abort the move operation and ends. If the process is able to slide away other composite presentation parts to make room for the CPP being moved, the process slides (at 2050) other composite presentation parts before proceeding to 2055.

At 2055, the process 2000 determines whether the moving operation results in overlapping media clips. As illustrated in FIG. 17, a CPP may fit into its new location according to its logical boundaries, but the clips belonging to CPPs may extend beyond the logical boundaries of CPPs and overlap each other. If there are overlapping clips after the moving operation, the process determines (at 2060) whether it can create subtracks to resolve the overlap as in FIG. 17. Some embodiments do not allow creation of subtracks for certain types of media (e.g., video). If it is impossible to resolve the overlap by creating subtracks, the process 2000 aborts (at 2095) the move operation and ends. If the process is able resolve the overlap by creating subtracks, the process resolves (at 2065) the overlap by creating subtracks before proceeding to 2070.

At 2070, the process 2000 moves the CPP into its new location in the timeline. Next, the process updates (at 2080) all data structures affected by the move, such as that of the CPP being moved, the other CPPs slide away in the timeline, and all clips associated with these CPPs. In some embodiments, the boundary data of CPPs also has to be updated to reflect the new location of these CPPs. Finally at 2090, in some embodiments that include a navigation tool, the process updates the navigation tool and navigation markers according to the new location of the CPP and ends. The operation of moving a composite presentation part (CPP) in embodiments that include a navigation tool will be further described below in Section III.

In addition to moving a composite presentation part, a user can also copy a composite presentation part from one location to another in the timeline. In some embodiments, a process similar to the process 2000 is used to perform the copy operation. In some embodiments, such a process would still perform all operations of the process 2000, except a copy of the composite presentation part would remain at the original location in the timeline.

In some of these embodiments, the composite presentation part is linked to a navigation marker in a navigation tool, and the user can move the composite presentation part to a new location in the timeline by moving the navigation marker to a new position in the navigation tool. The operation of moving a composite presentation part by moving a navigation marker in the navigation tool will be described below in Section III by reference to FIGS. 23-25.

2. Replacing a Composite Presentation Part

Figure 21:
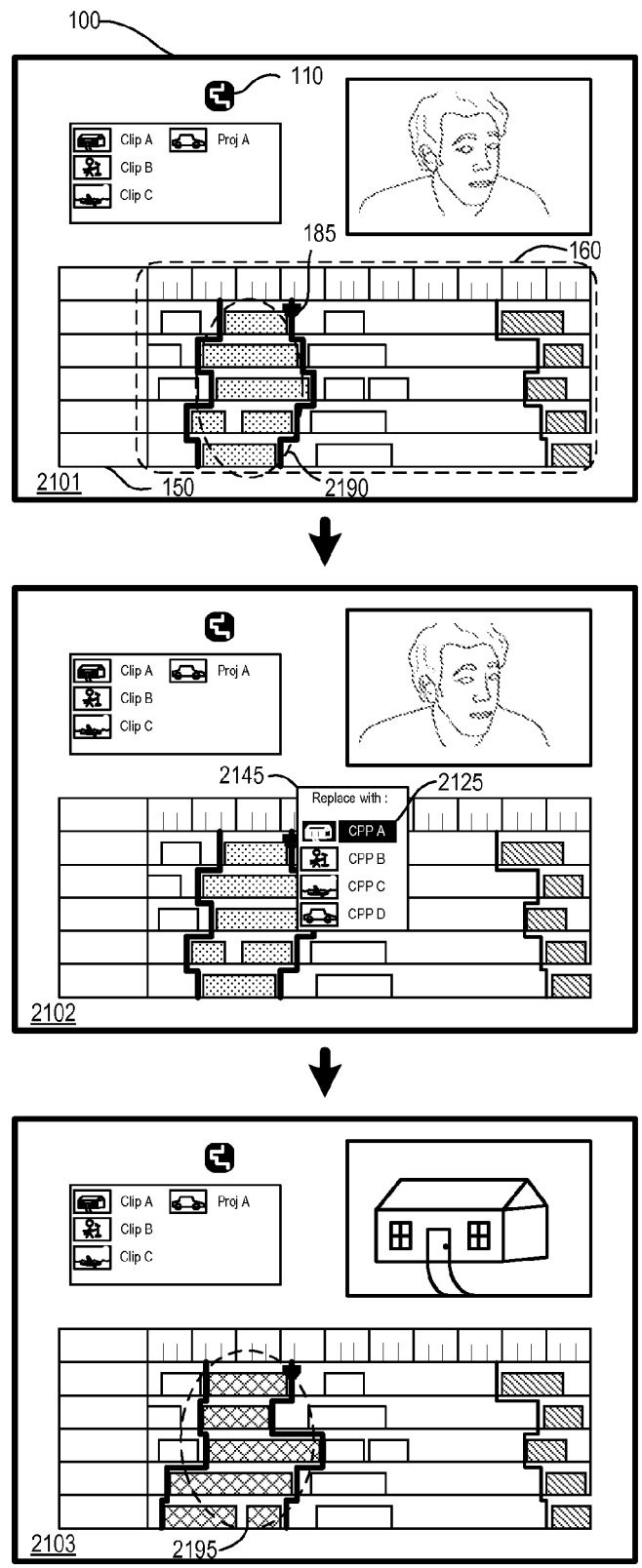
FIG. 21 illustrates an example of replacing one composite presentation part with another composite presentation part.

Some embodiments allow the user to replace one composite presentation part with another composite presentation part. FIG. 21 illustrates such an example for the GUI 100 of FIG. 1 in three different stages 2101-2103. The GUI 100 at the first stage 2101 is at the same stage as 1503 of FIG. 15, in which the grouping tool has been activated though the grouping activation item 110 (e.g., by moving the cursor 115 over the grouping activation item 110 and performing a click operation), and the user has used the moveable drawing element 185 to select a composite presentation part 2190.

The second stage 2102 illustrates the invocation of the replacement operation. In some embodiments, the user invokes the replacement operation by performing a particular selection of the moveable drawing element 185 (e.g., by right click or double click). In some embodiments, the particular selection of the moveable drawing element results in the grouping tool prompting the user (e.g., by a pop-up window 2145) for confirmation of the replacement operation and for selection of a replacement composite presentation part. Some embodiments provide other techniques (such as hot key commands, menu commands) for invoking the replacement operation in conjunction with, or instead of, invoking the replacement operation through the pop-up display area 2145.

In some embodiments, a candidate for replacing the composite presentation part can be another composite presentation part in the composite presentation project currently being edited by the user. In some of these embodiments, the user can select a composite presentation part currently placed in the timeline as the candidate. Some embodiments allow the user to select a previous version of any composite presentation part as the replacement candidate. Still some embodiments allow the user to select a composite presentation part that is currently associated with the composite presentation project but not placed in the timeline. Still some embodiments allow the selection of a composite presentation part previously defined by another composite presentation project.

In the example illustrated in FIG. 21, the pop-up display area 2145 displays a list of candidates as possible replacement composite presentation parts, and the user has selected a replacement composite presentation part graphically represented by the icon labeled "CPP A" (2125). In some embodiments, a user can also directly select a replacement composite presentation part without selecting from a list of candidates (e.g., by directly copying to and pasting from a clip board).

Finally, the third stage 2103 illustrates the completion of the replacement operation. The original composite presentation part 2190 has disappeared; in its place is a new composite presentation part 2195. This is the composite presentation part earlier represented in the pop-up window 2145 by the icon labeled "CPP A" (2125).

III. Composite Presentation Part in a Navigation Tool

In some embodiments, a composite presentation part is associated with a navigation marker in a navigation tool, which includes multiple selectable navigation markers associated with navigable locations in the timeline. When creating a composite presentation part, the grouping tool in some embodiments generates a selectable navigation marker and associates it with the newly created composite presentation part. In some of these embodiments, selection of the generated navigation marker in the navigation tool causes the composite display area to present the timeline at the location of the newly created composite presentation part. Before describing the creation of a navigation marker associated with a composite presentation part, the navigation tool will first be introduced.

A. Navigation Tool

Figure 22:
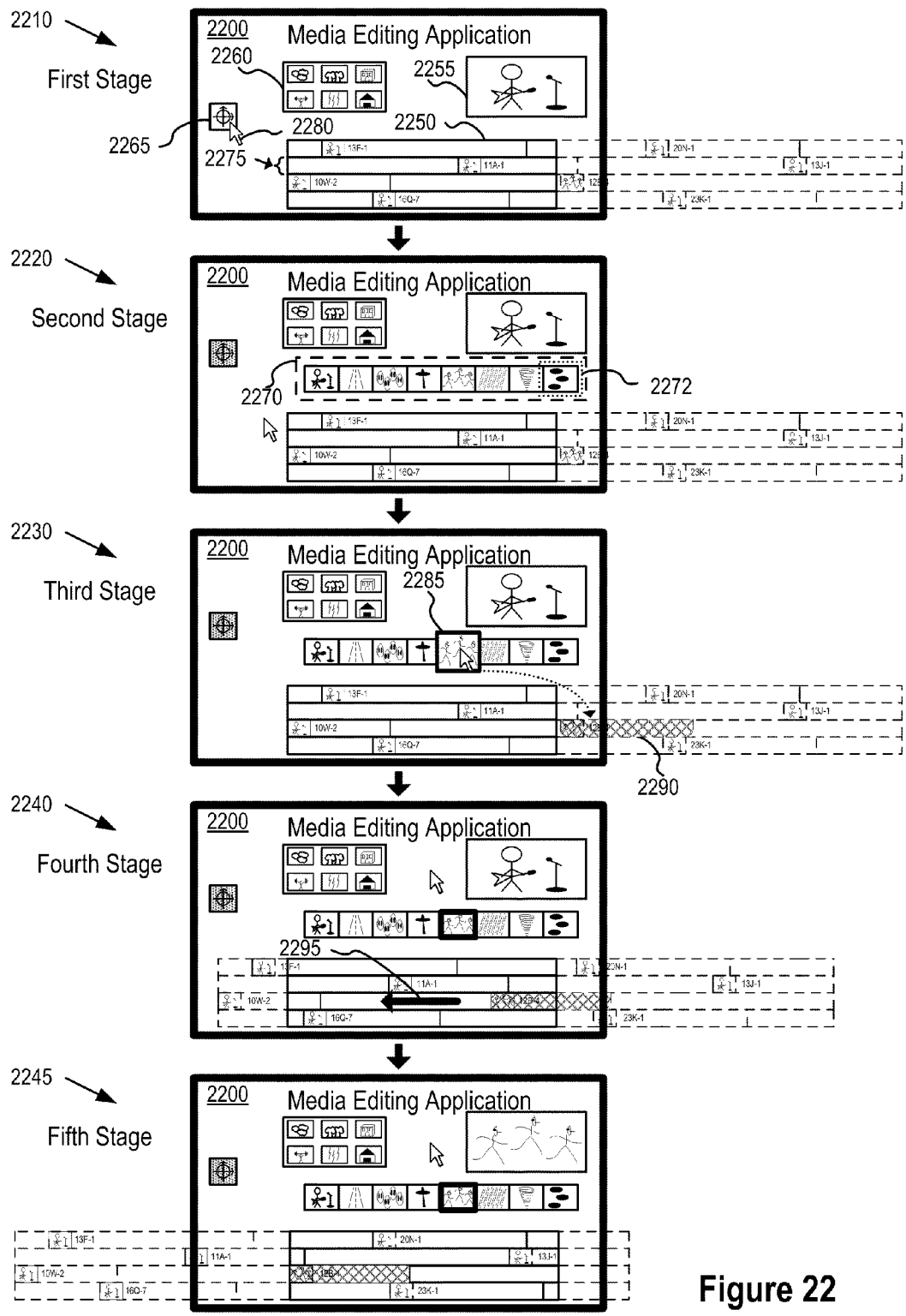
FIG. 22 illustrates a navigation tool that allows a user to navigate the representation of the composite presentation in order to view and edit the compositing of several media clips.

For a media editing application that creates composite presentations, some embodiments of the invention provide a novel navigation tool that allows a user to navigate the representation of the composite presentation in order to view and edit the compositing of several media clips. For some embodiments of the invention, FIG. 22 illustrates a graphical user interface ("GUI") 2200 of a media editing application with such a navigation tool. Specifically, this figure illustrates the GUI 2200 at five different stages 2210, 2220, 2230, 2240 and 2245 that show how the navigation tool can be used to navigate a composite presentation in some embodiments. Each of these stages will be described in more detail below after an introduction of the elements of the GUI 2200.

As shown in FIG. 22, the GUI 2200 includes a composite display area 2250, a preview display area 2255, a media library 2260, a navigation tool activation GUI item 2265, a navigation tool 2270, and one or more tracks (e.g., track 2275) in the composite display area. The composite display area 2250 includes multiple tracks that span a timeline and displays a graphical representation of the composite presentation (also called a "composite representation") by displaying media clips that form the composite presentation. The preview display area 2255 displays a preview of a composite presentation that the application creates by compositing several media clips. The media library 2260 is an area in the GUI 2200 through which the application's user can select media clips to add to a presentation that the user is compositing with the application. As shown, media clips may be displayed with different appearances in different areas of the GUI 2200. For instance, the media clips in the media library 2260 in this example are represented using thumbnail view (i.e., represented using a set of equally-sized images), while the media clips in the composite display area are represented using a clip view (i.e., represented using a set of rectangular representations where the length of the rectangle provides a visual indicator of the length of the associated clip).

The navigation tool activation item 2265 is a conceptual illustration of one or more user interface ("UI") items that allows the navigation tool 2270 to be invoked. Different embodiments of the invention implement this UI item differently. Some embodiments implement it as a UI button, others as an option that can be selected in a pull-down or drop-down menu, and still others as a command that can be invoked through one or more keystroke operations. Yet other embodiments allow the user to invoke the navigation tool through two or more of such UI implementations or other UI implementations. The media editing application displays the navigation tool 2270 once it is invoked through the activation item 2265.

In the example of FIG. 22, the application's navigation tool 2270 includes several selectable navigation markers 2272 that are associated with several navigable locations in the composite representation that is displayed in the composite display area. When a navigation marker is selected, the composite display area presents the navigable location that is associated with the selected navigation marker. In this manner, the navigation tool allows a user to navigate through a large number of media clips that cannot be viewed in the composite display area even though they are part of the composite representation, because they have scrolled off the finite display space provided by the composite display area.

In some embodiments, each navigable location corresponds to a fixed location in the composite representation, or to a location of a media clip or a set of associated media clips in the composite display area. For instance, in the example of FIG. 22, the composite representation in the composite display area spans a timeline. In some such embodiments, the navigable locations are instances along the timeline, where these instances are fixed locations along the timeline or temporal locations of media clips along the timeline. In some embodiments, the navigation markers are associated with the media clips in the composite display area, and in turn through this association, are associated with the locations in the composite representation as the media clips have specified locations in the composite representation. In other embodiments, the navigable locations are associated with sections along the timeline that may be of uniform or variable duration.

Different embodiments use different types of navigation markers. For instance, in some embodiments, the navigation markers are textual, graphical, or some other type of marker (e.g., prominent colors in a clip when the marker is small and compressed) from which a user can infer a corresponding location in the composite representation. In the example of FIG. 22, the navigation markers are thumbnail images of the media clips in the composite presentation. In some of the embodiments that have fixed locations in the composite representation as navigable locations, the thumbnail images are images of the media clips (e.g., thumbnail images of frames of video clips, cover art of audio clips, etc.) that are at or near the fixed locations. Alternatively, for some of the embodiments that define each navigable location as the location of a media clip or a set of associated media clips, the thumbnail images are images of the media clips associated with the navigable locations.

Different embodiments use different techniques to generate thumbnail images for the media clips that are part of a composite presentation. For instance, when generating a thumbnail image for a particular video clip or set of video clips, some embodiments initially identify a representative video frame for the clip or set of clips, and then generate a thumbnail image from the identified frame. Different embodiments identify the representative video frame for a clip or set of clips differently. For example, some embodiments identify the frame based on location within the clip, based on an analysis of the clip, etc.

In the example illustrated in FIG. 22, the navigation tool 2270 and its associated navigation markers 2272 are placed in one row that is adjacent to the composite display area and spans the composite display area in a direction along which media clips are arranged in the composite display area. Other embodiments arrange the navigation tool and its markers differently. For instance, some embodiments place this tool and its markers in one row in the composite display area, or in more than one row adjacent to or within the composite display area.

Also, in the example illustrated in FIG. 22, the media editing application presents all the navigation markers in one display area simultaneously. Other embodiments allow the navigation markers to scroll through the navigation tool's display area. Some embodiments also provide zoom controls to adjust the size of the navigation markers that are displayed in the tool's display area. The navigation tool 2270 also includes a highlighting feature that highlights and/or enlarges each navigation marker 2272 as the marker becomes a candidate for selection by a user (e.g., as a cursor pans across the marker while the user is moving the cursor to a marker to select).

The navigation markers 2272 are arranged in the same order as their associated locations within the composite display area. In this manner, each navigation marker 2272 of the navigation tool 2270 represents a relative location within the composite representation in the composite display area. For instance, a first marker that is to the left of a second marker in the navigation tool corresponds to a location in the composite display area that is earlier than a location corresponding to the second marker.

The operation of the GUI 2200 will now be described by reference to the state of this GUI during the five stages 2210, 2220, 2230, 2240 and 2245 that are illustrated in FIG. 22. In the first stage 2210, the composite display area 2250 displays a composite representation that includes several clips that span a timeline (not shown). A user might have added these clips to the composite representation in a current editing session or by opening a composite project (alternatively referred to as a "project") that was defined in a previous editing session. In the first stage 2210, the navigation tool has not yet been activated.

The second stage 2220 displays composite display area 2250 after the navigation tool 2270 has been activated upon the selection of the navigation activation item 2265 (e.g., through a cursor click operation). This stage 2220 illustrates this activation by changing the appearance of the UI item 2265 and by displaying the navigation tool 2270 above the composite display area 2250. Other embodiments might indicate the activation of the navigation tool without any change in appearance in any UI items or by changing the appearance of other UI items. For instance, in some embodiments where the UI item 2265 is implemented as a command that is invoked through one or more keystrokes (or a selection from a drop-down menu, etc.), the activation of the navigation tool is only indicated by the appearance of the navigation tool above the composite display area. As mentioned above, the navigation tool may have a different look or may be placed in a different location with respect to the composite display area in other embodiments.

When the navigation tool is invoked in the second stage 2220, the composite display area 2250 displays the composite representation at a particular zoom level that allows only a portion of the composite representation to appear within the display area 2250. The remainder of the composite representation is outside of the display area 2250. FIG. 22 uses dashed lines to illustrate portions of the composite representation that fall outside of the display area 2250.

In the third stage 2230, a user moves a cursor 2280 to a location over the navigation tool. As shown, this action has caused a selectable navigation marker 2285 to be enlarged and highlighted, in order to highlight this marker and to indicate that it is a candidate for selection by the user. In this example, the navigation marker corresponds to a particular clip 2290 in the composite representation. The particular clip 2290 is highlighted with a cross-hatch pattern. This highlighting is not performed by the media editing application but rather is presented in FIG. 22 in order to identify this clip 2290 in this figure. The clip 2290 is completely outside of the composite display area in the third stage 2230.

The fourth stage 2240 illustrates the GUI 2200 after the user has selected the navigation marker 2285 (e.g., by clicking on this marker). This selection causes the composite representation to scroll through the composite display area 2250 in order to cause the particular clip 2290 to appear in the display area 2250. The fourth stage 2240 illustrates an arrow 2295 to indicate that the scrolling is in midstream, i.e., it is before the clip 2290 has reached its final location in response to the selection 2290 of the marker 2285.

The fifth stage 2245 shows the GUI 2200 after the clip 2290 has reached its final destination after the selection of the marker 2285. The selected clip is now visible in the composite display area. In this example, the clip has been positioned at the far left of the composite display area. However, different embodiments may position the selected location at different places within the composite display area (e.g., at an offset from the far left, at a location selected by a user, etc.).

In the fifth stage 2245, the clip 2290 is fully visible in the composite display area along with other clips that neighbor it. Some embodiments automatically perform zoom adjustments (adjustments without direct user input) to adjust the zoom level in the composite display area so that a desired number of neighboring clips (or desired neighboring ranges along the timeline) are presented along with the clip that is brought up in response to a navigation selection through the tool 2270. In some embodiments, the desired number of neighboring clips and the location of the retrieved clip in the composite display area can be specified by a user through preference settings of the media editing application.

In some embodiments, the navigation tool includes selectable controls for navigating backward and forward through a stored navigation history of previously selected navigation markers or navigable locations. In some embodiments, each selectable control may cause a list of previously selected navigation markers or navigable locations to be displayed, from which a selection of a particular navigation marker or navigable location may be made.

B. Creation of Navigation Marker

As mentioned above, for embodiments of the media editing application that includes a navigation tool, the creation of a composite presentation part by the grouping tool also creates a navigation marker in the navigation tool. As mentioned above by reference to FIG. 2, after the creation of a composite presentation part at operations 230-240, the grouping process 200 in some embodiments creates and links the newly created composite presentation part with a navigation marker (e.g., thumbnail) in the navigation tool. In embodiments that associate navigation markers with navigable locations in the timeline, the creation of a new composite presentation part also associates the location of the new composite presentation part in the timeline as the navigation marker's navigable location.

Figure 23:
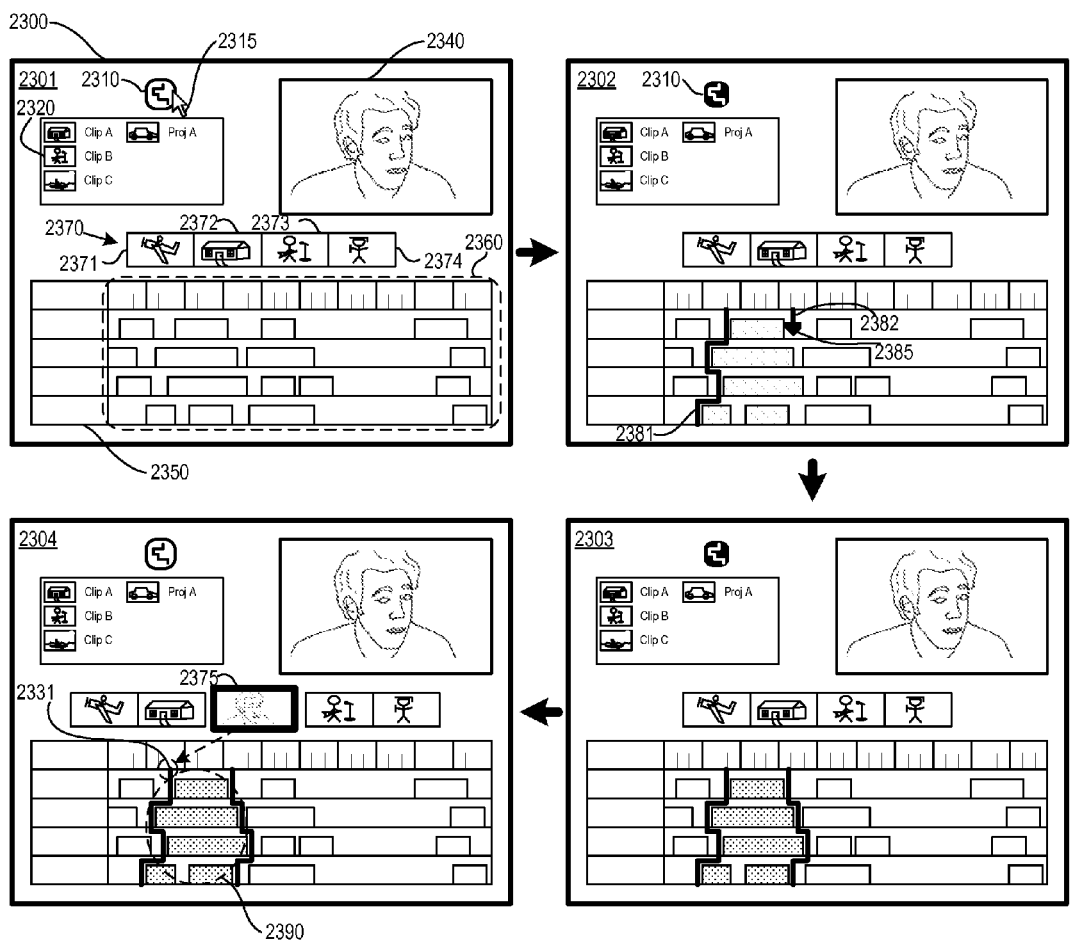
FIG. 23 illustrates an example of the creation of a navigation marker in the navigation tool.

FIG. 23 illustrates an example of the creation of a navigation marker in the navigation tool. Similar to the GUI 100 of FIG. 1, FIG. 23 illustrates a GUI 2300 that also includes a media library area 2320, a composite display area 2350, a grouping activation item 2310, a moveable drawing element 2385, and a preview display area 2340. In addition, like the GUI 2200 of FIG. 22, the GUI 2300 includes a navigation tool 2370. The navigation tool 2370 includes navigation markers 2371, 2372, 2373 and 2374. The creation of a navigation marker in the navigation tool will be described by reference to the GUI 2300 in four different stages 2301-2304.

The first stage 2301 is at the beginning of a process of creating a new composite presentation part. The composite display area 2350 displays a composite presentation comprising several clips along the timeline 2360. The grouping activation item 2310 is not highlighted, indicating that the grouping tool is not currently active. No new composite presentation part has been defined or created, and no navigation marker has been added to the navigation tool 2370 in addition to markers 2371, 2372, 2373 and 2374.

The second stage 2302 shows the GUI 2300 during the creation of a new composite presentation part. In this example, the grouping activation item 2310 is highlighted to indicate that the grouping tool is currently active and is in the middle of defining a boundary by drawing two borders. The user has finished drawing the first border 2381, and is in the process of drawing a second border 2382 by dragging the moveable drawing element 2385 across the tracks in the composite display area.

At the third stage 2303, the grouping tool has completed defining a boundary by drawing two borders (i.e., the borders 2381 and 2382). The two borders surround a group of clips. The grouping tool has completed the grouping process and has created a composite presentation part 2390 based on the grouped media clips. However, the grouping tool has yet to associate the newly created composite presentation part 2390 with a navigation marker in the navigation tool.

Lastly at the fourth stage 2304, the grouping tool has created a new navigation marker 2375 and inserted it into the navigation tool 2370. In some embodiments, the grouping tool selects a thumbnail image from one of the grouped clips in the newly created composite presentation part 2390 as the navigation marker. The grouping tool links the new navigation marker 2375 with the newly created composite presentation part 2390. In embodiments that associate navigation markers with navigable locations in the timeline, the creation of the new composite presentation part 2390 also associates the timeline location 2331 occupied by the new composite presentation part with the navigation marker 2375.

C. Manipulation of a Composite Presentation Part in the Navigation Tool

In some embodiments that associate a composite presentation part with a navigation marker, a user may move the composite presentation part to a new location in the timeline by moving the navigation marker to a new position in the navigation tool. Conversely, in some embodiments, moving the composite presentation part in the composite display area causes the navigation marker associated with the composite presentation part to change its position relative to other navigation markers in the navigation tool.

Figure 24:
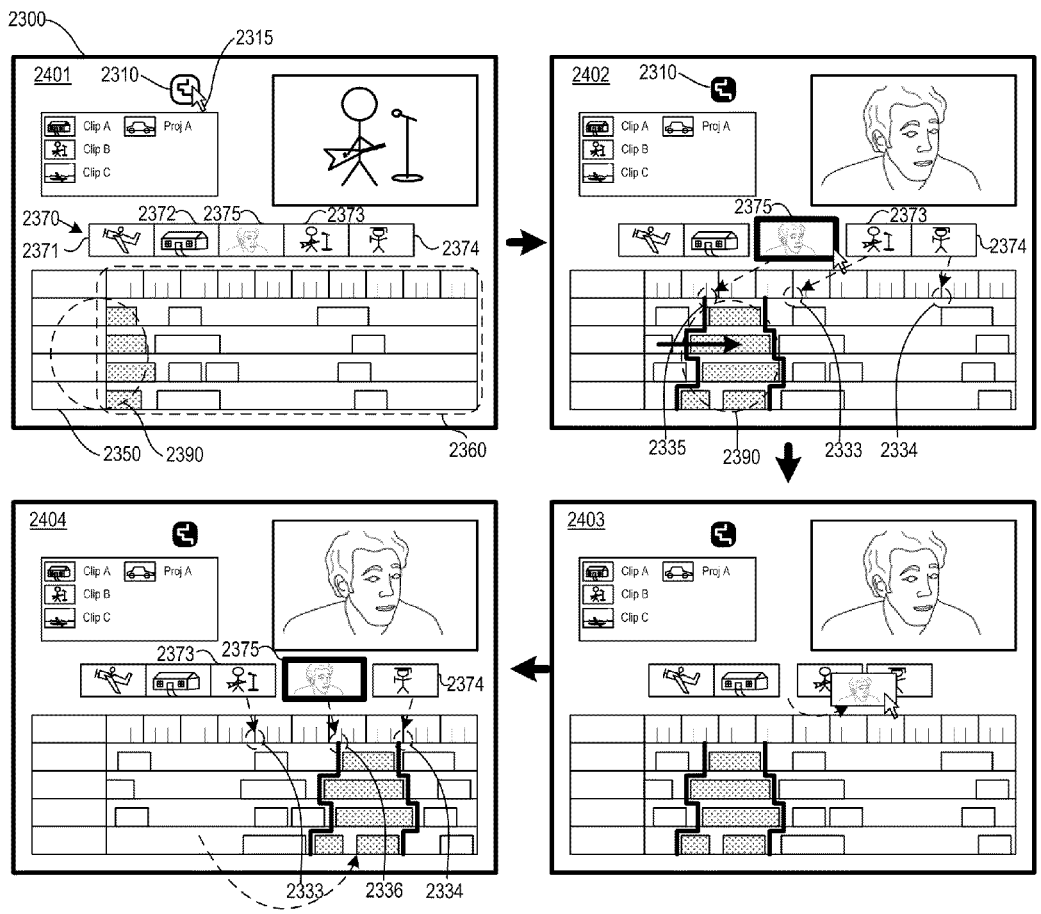
FIG. 24 illustrates an example of moving a composite presentation part by moving the associated navigation marker in the navigation tool.

FIG. 24 illustrates an example of moving the composite presentation part by moving the associated navigation marker in the navigation tool. This example will be illustrated with the GUI 2300 of FIG. 23 in four different stages 2401-2404.

The first stage 2401 displays the GUI 2300 at the beginning of an operation to move a composite presentation part by moving a navigation marker. The composite display area 2350 is not currently presenting the timeline 2360 at the location of the composite presentation part 2390. The navigation tool 2370 includes navigation markers 2371-2375 as in stage 2304 of FIG. 23, in which navigation marker 2375 is positioned between markers 2372 and 2373.

The second stage 2402 displays the user's selection of the navigation marker 2373. In some embodiments, the user selects a navigation marker by using the cursor 2315. In some embodiments, a user can also make the selection without using a cursor (e.g., by using a touchscreen or a keyboard.) Some embodiments visually distinguish the selected navigation marker 2375 from other markers in the navigation tool 2370 (e.g., by enlarging or highlighting).

Each of the five navigation markers 2371-2374 corresponds to a navigable location in the timeline, and each navigation marker is positioned in the navigation tool 2370 based on its corresponding navigable location in the timeline. Specifically, navigation marker 2375 is associated with navigable location 2335, navigation marker 2373 with navigable location 2333, and navigation marker 2374 with navigable location 2334. Additionally, the navigation marker 2375 corresponds to the composite presentation part 2390 in the timeline. In some embodiments, the composite presentation part 2390 is not visible in the composite display area 2350 until the grouping tool has been activated (e.g., by the user selecting the grouping activation item 2310.) In other embodiments, the selection of the navigation marker 2375 automatically makes the composite presentation part 2390 visible in the composite display area.

In some embodiments, the selection of navigation marker 2375 causes the composite display area 2350 to present the timeline at the navigable location 2335. Consequently, the composite presentation part, which occupies location 2335 in the timeline, also appears in the composite display area 2350. In some embodiments, the selection of the navigation marker 2375 also selects its corresponding composite presentation part 2390, making the composite presentation part available for move, copy, border adjustment, or any other operations pertaining to the composite presentation part. In other embodiments, the selection of a navigation marker only causes the composite display area to present the timeline at the navigable location 2335, but does not select any composite presentation part. In some of these embodiments, the user can activate the grouping tool (e.g., by selecting grouping activation item 2310) in order to select a composite presentation part.

At the third stage 2403, the GUI 2300 displays the operation of the user moving the navigation marker in the navigation tool. As illustrated, the user is dragging the navigation marker 2375 from a position between navigation markers 2372 and 2373 to another position in the navigation tool 2370.

Lastly at the fourth stage 2404, the navigation marker 2375 has moved into a new location in the navigation tool, and the composite presentation part 2390 has moved into a new location 2336 in the timeline. The new position of the navigation marker 2375 is between navigation markers 2373 and 2374. The new location 2336 of the composite presentation part is between locations 2333 and 2334, which corresponds to navigation markers 2373 and 2374. Although not illustrated in FIG. 24, some embodiments animate the movement of the composite presentation part 2390 in the composite display area 2350 due to movement of the navigation marker 2375. In some of these embodiments, animation of the movement of the composite presentation part 2390 takes place while the navigation marker 2375 is still being moved. In other embodiments, the animation of the movement of the composite presentation part 2390 takes place after the navigation marker 2375 has moved into its new position in the navigation tool 2370.

Figure 25:
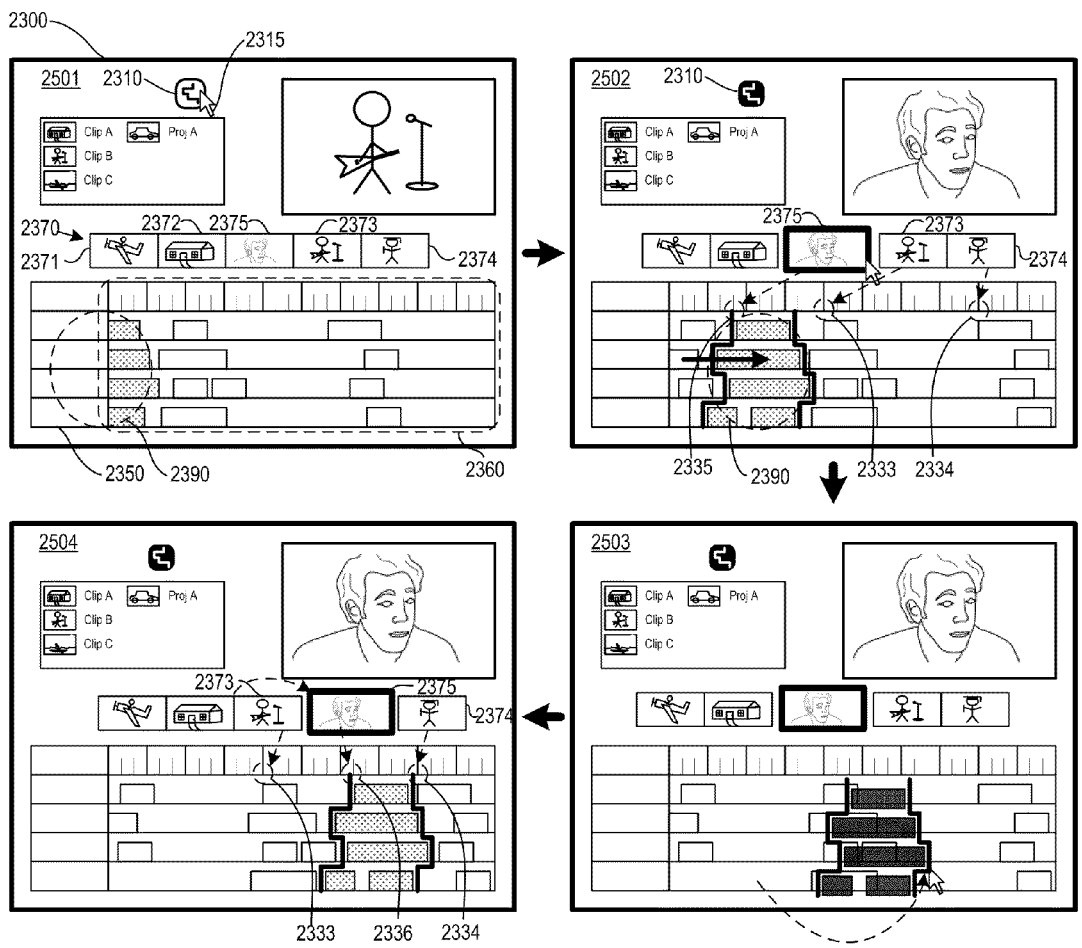
FIG. 25 illustrates an example of moving a composite presentation part that causes the associated navigation marker to change its position in the navigation tool.

As mentioned above, in some embodiments, moving the composite presentation part in the composite display area causes the navigation marker associated with the composite presentation part to change its position relative to other navigation markers in the navigation tool. FIG. 25 illustrates such an example for the GUI 2300 of FIG. 23 in four stages, 2501-2504.

As illustrated in FIG. 25, the GUI 2300 at stages 2501-2502 is at the same stage as stages 2401-2402 of FIG. 24. Like 2401, the first stage 2501 displays the GUI 2300 at the beginning of an operation to move the composite presentation part 2390. The navigation tool 2370 includes navigation markers 2371-2375. The navigation marker 2375 is positioned between the navigation markers 2372 and 2373.

And like stage 2402, the GUI 2300 at the second stage 2502 displays the selection of the navigation marker 2375. The selection of marker 2375 causes the composite display area 2350 to present the timeline 2360 at the navigable location 2335, which is occupied by the composite presentation part 2390 associated with the navigation marker 2375. In some embodiments, the selection of the navigation marker 2375 also selects the composite presentation part 2390. In some other embodiments, the selection of the navigation marker 2375 does not select the composite presentation part 2390, but a user can select the composite presentation part by activating the grouping tool first (e.g., by using the cursor selecting grouping activation item 2310) in order to make composite presentation parts visible in the composite display area 2350.

At the third stage 2303, the grouping tool has completed defining a boundary by drawing two borders (i.e., the borders 2381 and 2382). The two borders surround a group of clips. The grouping tool has completed the grouping process and has created a composite presentation part 2390 based on the grouped media clips. However, the grouping tool has yet to associate the newly created composite presentation part 2390 with a navigation marker in the navigation tool.

Lastly, at the fourth stage 2504, the navigation marker 2375 has moved into a new position in the navigation tool 2370. In embodiments that associate navigation markers with composite presentation parts, moving the composite presentation part 2390 from location 2335 to location 2336 also updates the navigable location associated with navigation marker 2375 from location 2335 to location 2336. In some of these embodiments, the navigation tool then reorders navigation markers according to each navigation marker's associated navigable location. As the new navigable location of navigation marker 2375 is now between that of navigation markers 2373 and 2374 (the new location 2336 is between locations 2333 and 2334), the navigation tool accordingly moves the navigation marker 2375 to the new position between navigation markers 2373 and 2374.

IV. Editing Composite Presentation Part

In some embodiments, the user may edit a grouping of clips or composite presentation parts. For instance, in some embodiments, the user can add a clip to or delete a clip from the composite presentation part by graphically selecting and dragging media clips in the graphical UI. Also, a user may edit the composite presentation part by pressing a hotkey in some embodiments. For instance, in some embodiments, when the user presses a hotkey to add a media clip to the grouping, the added clip is inserted at a location based on a playhead in the timeline. If the playhead is not present in the timeline, some embodiments append the added clip to the end of the composite presentation part.

Figure 26:
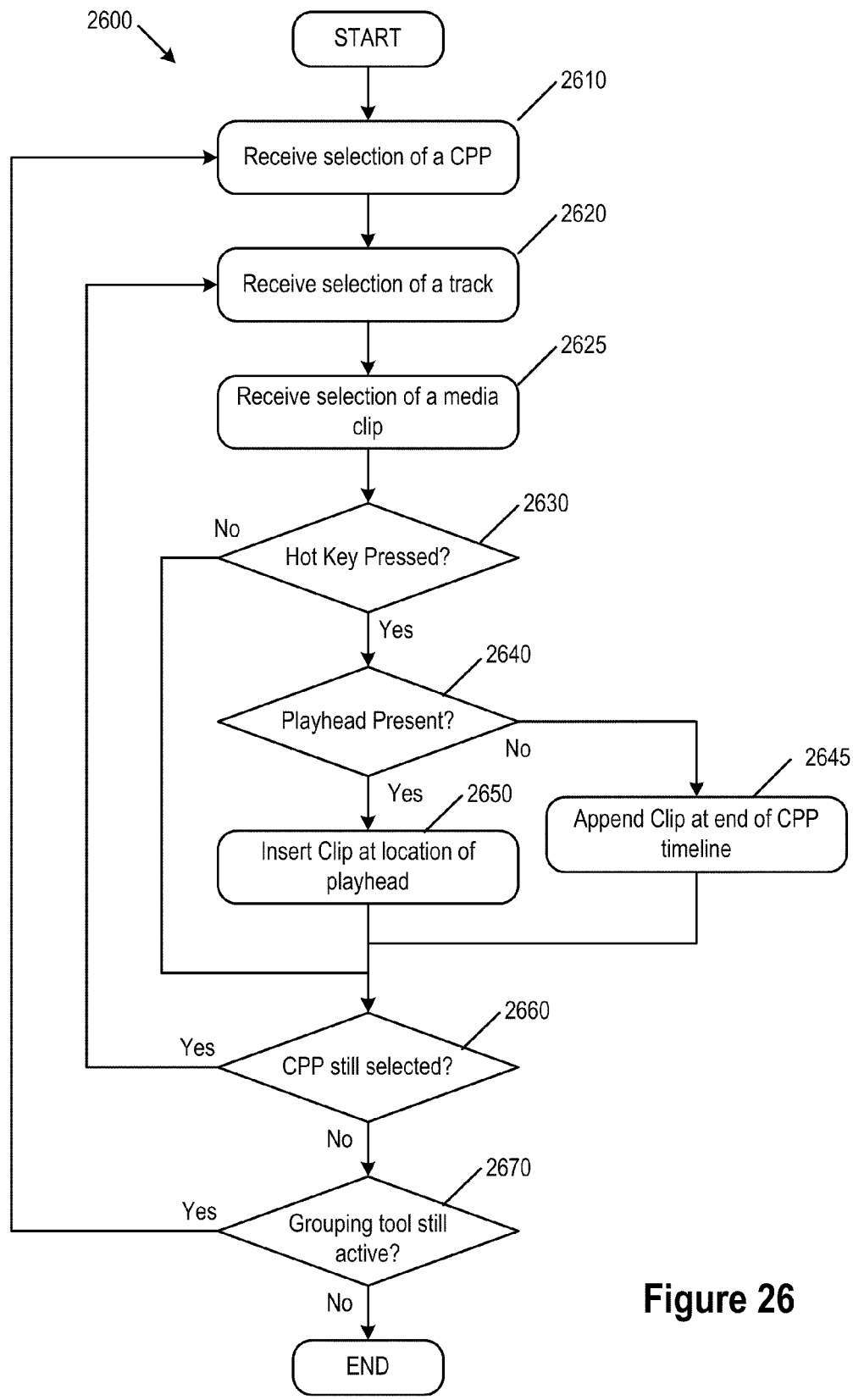
FIG. 26 illustrates an example of a process performed by some embodiments for adding a clip to a composite presentation part using a hotkey.
Figure 27:
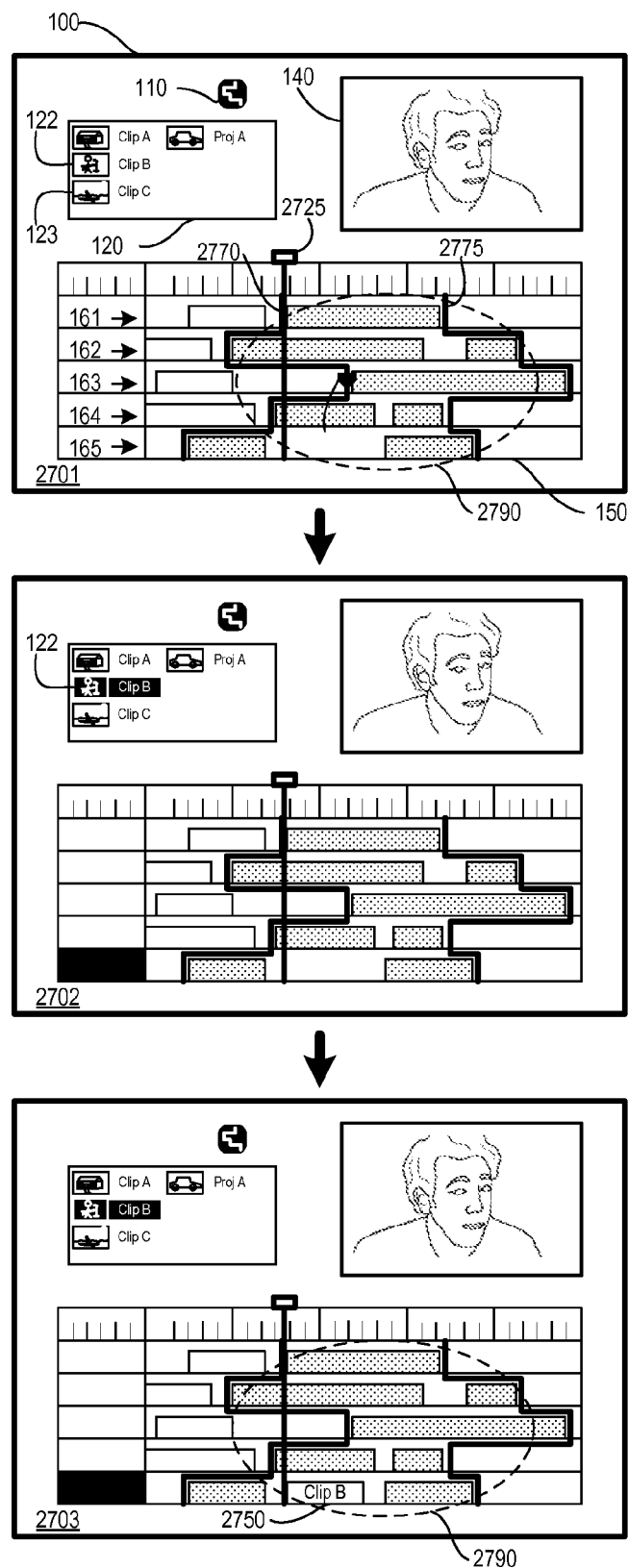
FIG. 27 illustrates an example of using a hotkey to add a clip when a playhead is present.
Figure 28:
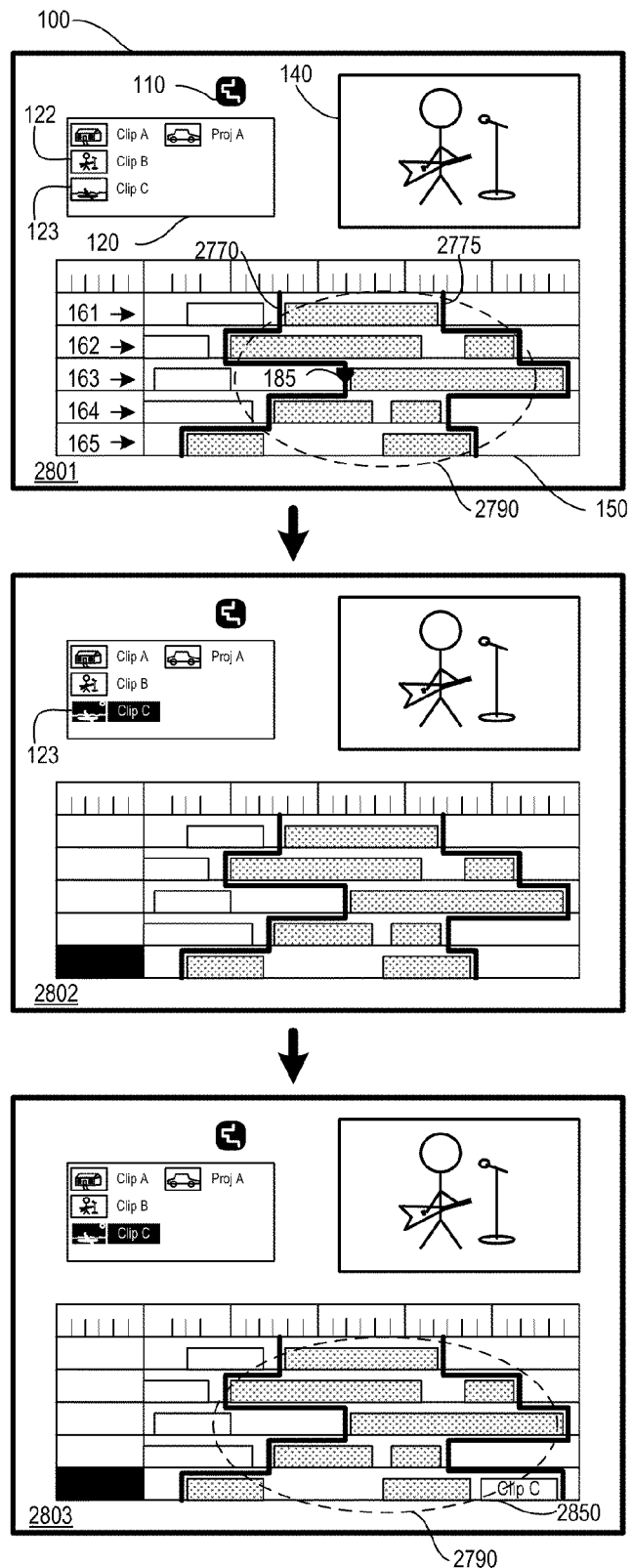
FIG. 28 illustrates an example of using a hotkey to add a clip when no playhead is present.

FIG. 26 conceptually illustrates a process 2600 of some embodiments for adding a clip to a composite presentation part using a hotkey. The process 2600 will be described by reference to FIGS. 27-28. FIG. 27 illustrates an example of using a hotkey to add a clip to a composite presentation part when a playhead is present in the composite display area. This example is illustrated for the GUI 100 of FIG. 1 in three different stages, 2701-2703. FIG. 28 illustrates an example of using a hotkey to add a clip to a composite presentation part when no playhead is present in the composite display area. This example is illustrated for the GUI 100 in three different stages, 2801-2803.

FIG. 27 also illustrates a playhead 2725 for highlighting the instance in time in the composite presentation that is being represented in the composite display area. Highlighting this instance in time is useful for a variety of reasons. For instance, when viewing a preview of the composite presentation in the preview display area 140, the playhead 2725 scrolls across the timeline 160 to identify the location in the composite presentation in the composite display area 150 that is currently displayed in the preview display area 140. Furthermore, as described below, the playhead location can also act as an insertion point when adding clips or effects to the project.

Returning to FIG. 26, the process 2600 begins when a user activates the grouping tool. In the example of FIG. 27 at stage 2701, the grouping tool is activated by the selection of the grouping activation item 110 (e.g., by moving the cursor 115 over the grouping activation item 110 and performing a click operation). The activation of the grouping tool makes composite presentation parts (e.g. 2790) visible for editing in the composite display area 150. In some embodiments, the activation of the grouping tool also changes the appearance of the cursor 110 so it appears as the moveable drawing element 185 inside the composite display area 150.

Next, the process receives (at 2610) a selection of a composite presentation part (CPP) from the user. In some embodiments, a user selects a CPP in the composite display area by using the moveable drawing element 185 (e.g., by moving 185 to the border 2770 of the composite presentation part 2790). The process next receives (at 2620) a selection of a track in which the added clip will be placed. In the example illustrated, track 165 is highlighted, indicating that it has been selected. Some embodiments receive the selection of a track from a cursor controller (e.g., a mouse, touchpad, trackball, etc.), from a touchscreen (e.g., a user touching a UI item on a touchscreen), or from a keyboard input. Some embodiments select a track by inheriting a previous selection of a track. Still some embodiments select a track by following other conventions well known in the art.

The process next receives (at 2625) a selection of a media clip from the user for insertion into the CPP. In some embodiments, a user may select a clip from a media library, or another clip in the composite display area. In the example of FIG. 27 at stage 2702, a thumbnail 122 labeled "Clip B" in the media library area 120 is highlighted to indicate that a media clip represented by the thumbnail 122 was selected. And in the example of FIG. 28 at stage 2802, a thumbnail 123 labeled "Clip C" in the media library area 120 was highlighted to indicate that a media clip represented by the thumbnail 123 was selected.

Returning to FIG. 26, process 2600 next determines (at 2630) whether a hotkey has been pressed. If not, the process proceeds to 2660. If a hotkey has been pressed, the process determines (at 2640) whether the playhead is currently present within the selected composite presentation part at the selected track.

If the playhead is within the selected composite presentation part at the selected track, the process 2600 inserts (at 2650) the selected clip into the selected composite presentation part at the location of the playhead at the selected track before proceeding to 2660. FIG. 27 at the stage 2703 illustrates the insertion of the selected media clip at the location of the playhead. As illustrated, at track 165, the playhead 2725 is within the two borders of composite presentation part 2790. Some embodiments insert the selected clip represented by thumbnail 122 (Clip B) at the selected track (track 165) at the location of the playhead 2725 after the user presses the hotkey. In some embodiments, Clip B then becomes part of composite presentation part 2790 as clip 2750 in the composite display area 150.

If the playhead is not within the selected composite presentation part at the selected track, the process 2600 appends (at 2645) the selected clip at the border or boundary of the composite presentation part at the selected track before proceeding to 2660. FIG. 28 at the stage 2803 illustrates the insertion of the selected media clip when no playhead is present in the composite display area 150. Without a playhead in the composite display area 150, some embodiments append the selected clip represented by thumbnail 123 (Clip C) at one of the two borders of the composite presentation part 2790. Specifically, some of these embodiments append the selected clip at the later of the two borders (i.e., 2775) at the selected track (track 165). In some embodiments, Clip C then becomes part of composite presentation part 2790 as clip 2850 in the composite display area 150.

Instead of inserting the selected clip at the location of the playhead 2725 or appending the clip at the end of the composite presentation part 2790, some embodiments insert the selected clip at an earlier defined in-point or out-point in the timeline. If the in-point or out-point falls within the composite presentation part 2790, then the inserted clip becomes part of that composite presentation part 2790 at the location of the in-point or out-point. In some embodiments, the process 2600 looks for in-point or out-point as the location to insert a selected clip before considering inserting the selected clip at the location of the playhead 2725 or the end of composite presentation part 2790.

Returning to FIG. 26. At 2660, the process 2600 determines whether the composite presentation part is still selected. If so, the process 2600 returns to 2620 to receive another selection of a track to place the selected clip. If not, the process proceeds to 2670. The process 2600 determines (at 2670) whether the grouping tool is still active. If so, the process returns to 2610. If no, the process 2600 ends.

V. Software Architecture

Figure 29:
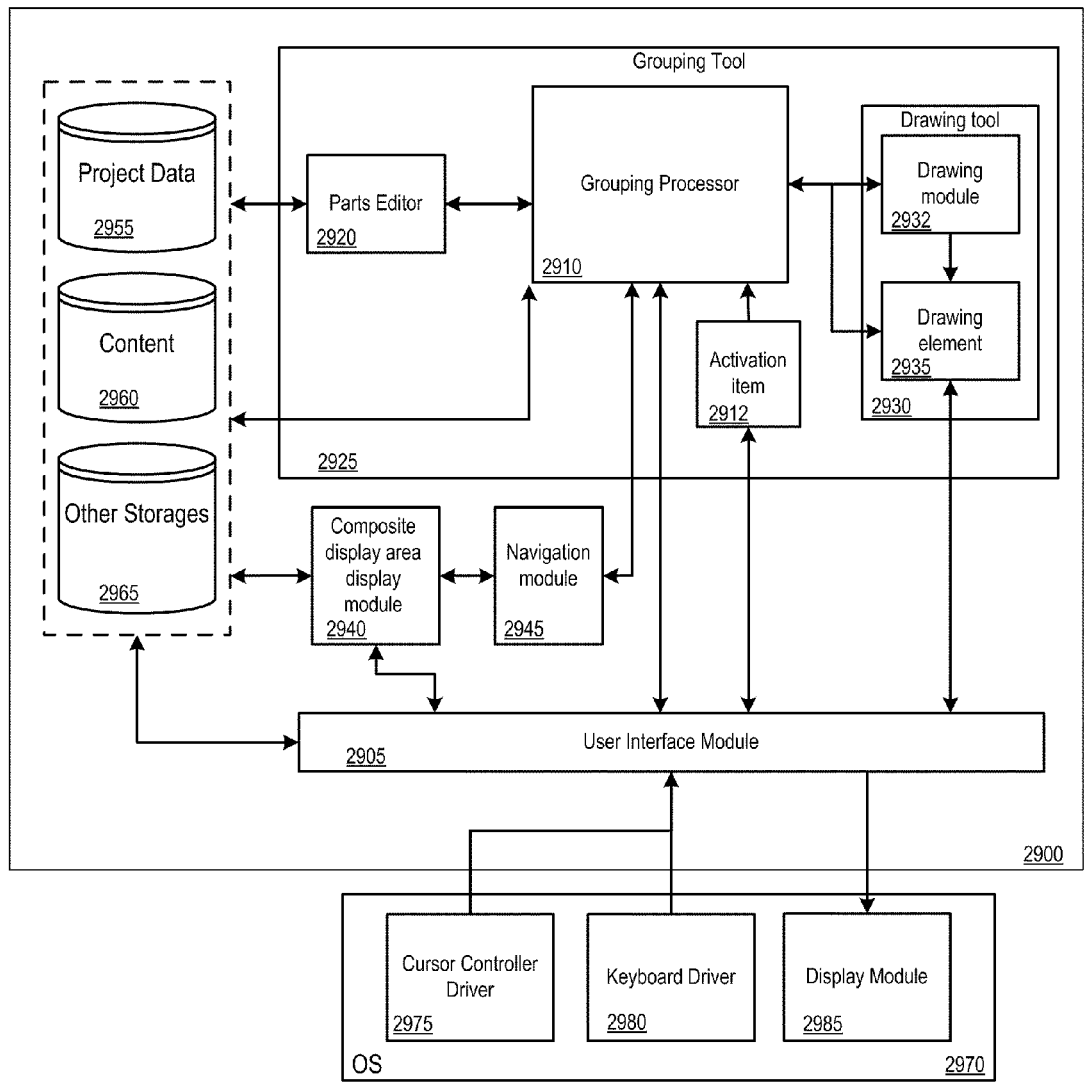
FIG. 29 illustrates an example of a software architecture of a media-editing application.

In some embodiments, the processes described above are implemented as software running on a particular machine, such as a computer or a handheld device, or stored in a computer readable medium. FIG. 29 conceptually illustrates the software architecture of a media-editing application 2900 of some embodiments. In some embodiments, the media-editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

Media-editing application 2900 includes a user interface (UI) interaction module 2905, a composite display area display module 2940 and a grouping tool 2925. The media-editing application also includes project data storage 2955, content storage 2960, and other storages 2965. In some embodiments, the project data storage 2955 stores data about a composite media presentation, such as in and out points for media clips, information about transitions between media clips, etc. The project data storage 2955 also stores data about composite presentation parts in some embodiments, such as the boundary data, associations between media clips and composite presentation parts, associations between composite presentation parts and navigation markers, and other information related to composite presentation parts. Content storage 2960 includes the media clips that are used by the media-editing application to create a composite presentation. In some embodiments, storages 2955, 2960 and 2965 are all in one physical storage. In other embodiments, the storages are implemented in two or more different physical storages.

FIG. 29 also illustrates an operating system 2970 that includes a cursor controller driver 2975, a keyboard driver 2980, and a display module 2985. In some embodiments, as illustrated, the cursor controller driver 2975, keyboard driver 2980, and display module 2985 are part of the operating system 2970 even when the media-editing application 2900 is an application separate from the operating system.

A user interacts with the user interface via input devices (not shown). The input devices, such as cursor controllers (mouse, tablet, touchpad, etc.) and keyboards, send signals to the cursor controller driver 2955 and keyboard driver 2960, which translate those signals into user input data that is provided to the UI interaction module 2905.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The UI interaction module 2905 interprets the user input data and passes it to various modules, including the composite display area display module 2940 and the grouping tool 2925. In some embodiments, the input data directly affects the project data or other data stored in the storages 2955, 2960 and 2965. For instance, when a user modifies a property of a composite presentation part (e.g., when applying a particular effect to a composite presentation part), this is directly modified in the project data 2955 in some embodiments.

The UI interaction module 2905 also manages the display of the UI, and outputs display information to the display module 2985. This display information may be based on information from the storages (e.g., 2960), the various modules (e.g., grouping processor 2910), or directly from input data (e.g., when a user moves an item in the UI that does not affect the presentation) in some embodiments.

The grouping tool 2925 includes a grouping processor 2910, a drawing tool 2930, a parts editor 2920, and an activation item 2912. The activation item 2912 receives from the UI interaction module that allows the media editing application to activate its grouping tool 2925. In some embodiments, the activation item 2912 is implemented as one or more UI items that a user can select to activate the grouping tool 2925. In some of these embodiments, the activation item 2912 also serves as a feedback indicator to the user that the grouping tool 2925 is active.

The drawing tool 2930 includes a drawing module 2932 and a drawing element 2935. The drawing tool 2930 receives instruction from the grouping processor 2910, and the drawing module 2932 interacts with the user though the drawing element 2935. In some embodiments, the drawing element 2935 is displayed as the moveable drawing element in the UI. In some of these embodiments, the user uses the drawing element 2935 to draw a boundary to define a composite presentation part, and the drawing module 2932 captures the boundary as boundary data and returns it to the grouping processor 2910 for creation of a composite presentation part. In some embodiments, the drawing tool 2930 also enables user selection of a composite presentation part for move, edit, or other operations on the composite presentation part.

The grouping processor 2910 receives information from the UI interaction module 2905 and activation item 2912. The grouping processor also controls the modules drawing tool 2930 and the parts editor 2920. Upon activation of the grouping tool 2925, the grouping processor 2910 directs the drawing tool 2930 to draw a boundary and receives from the drawing tool 2930 a set of boundary data. The grouping processor 2910 then uses the boundary data to retrieve the necessary information (e.g., media clips) from storage 2955-2965 in order to create and store a composite presentation part data structure.

In addition to creating new composite presentation parts, the grouping processor 2910 of some embodiments also facilitates move, edit or other operations on composite presentation parts. In some of these embodiments, the grouping processor 2910 causes the UI interface module to display composite presentation parts on the composite display area, and then receives a selection of a composite presentation part from the drawing element 2935.

The parts editor 2920 receives information from the grouping processor 2910 about making edits to a composite presentation part. The parts editor 2920 performs a variety of editing functions in some embodiments according to these instructions, such as standard edits unrelated to composite presentation parts, border or boundary adjustments, applying effects to entire composite presentation part, etc. To perform some of these functions, the parts editor 2920 retrieves and updates composite presentation part data located in storages 2955-2965. The parts editor 2920 also redefines any associations between clips and composite presentation parts as required.

The parts editor 2920 also receives information from the grouping processor 2910 about moving one composite presentation part from one location to another in the timeline. In some embodiments, the parts editor 2920 receives the selection of a composite presentation part and the destination of the moving operation from the grouping processor before commencing the move operation. The parts editor 2920 retrieves from storages 2955-2965 information on clips and composite presentation parts in the timeline that are affected by the move operation and makes necessary updates to complete the move operation. Some embodiments of the parts move also perform other operations on composite presentation parts such as copy and replace.

The composite display area display module 2940 manages the display of the composite display area of the GUI of the editing application based on input received through the UI interaction module 2905. The composite display area display module 2940 also coordinates the display of the timeline in the composite display area with the navigation module 2945.

Navigation module 2945 handles the navigation of the timeline in the composite display area. For instance, when a user uses a scroll bar to scroll through the timeline, this is managed by the navigation module. In some embodiments, the navigation module also receives input through a navigation tool to jump from one navigable location to another. When this information is received, the navigation module 2945 calculates the animation needed to move the timeline to the particular navigable location and passes the display information to the composite display area display module 2940. When the grouping tool 2925 creates a new composite presentation part, it notifies the navigation module 2945 that a new composite presentation part has been created, and that the navigation tool needs to include a new navigation marker. In some embodiments, the navigation module 2945 also coordinates with the grouping tool 2925 to perform the moving operation of composite presentation parts by moving navigation markers.

While many of the features have been described as being performed by one module (e.g., the grouping processor 2910 or parts editor 2920), one of ordinary skill would recognize that the functions might be split up into multiple modules, and the performance of one feature might even require multiple modules.

VI. Process for Defining a Media-Editing Application

Figure 30:
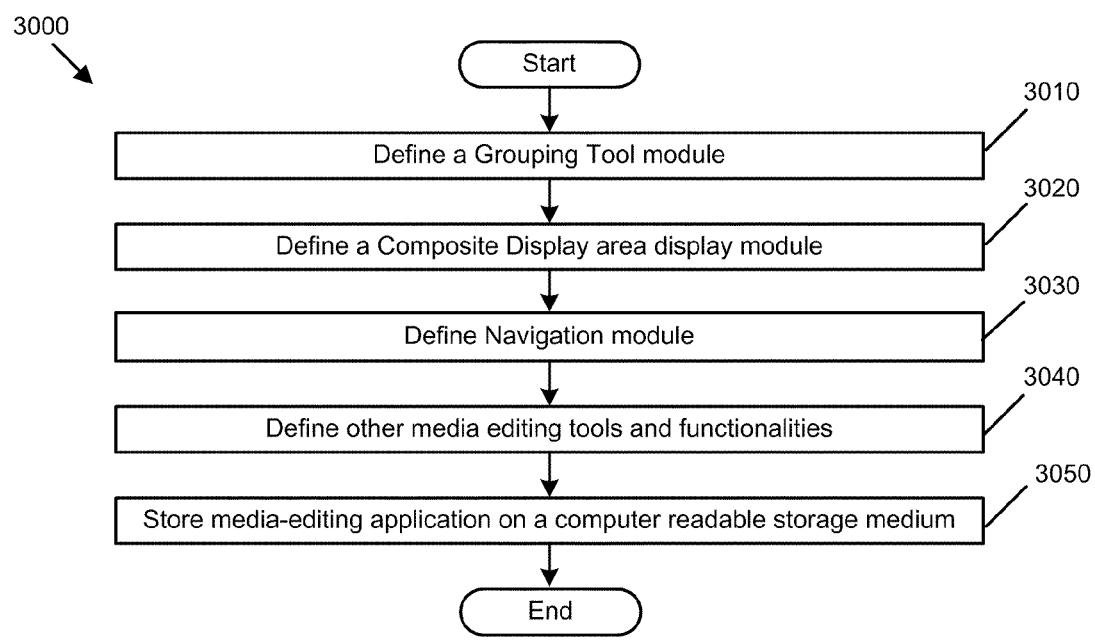
FIG. 30 illustrates an example of a process performed by some embodiments for manufacturing a computer readable medium that stores a media-editing application.

FIG. 30 conceptually illustrates a process 3000 of some embodiments for manufacturing a computer readable medium that stores a media-editing application such as the application 2900 described above. In some embodiments, the computer readable medium is a distributable CD-ROM. As shown, process 3000 begins by defining (at 3010) a grouping tool module. For instance, the grouping tool module 2925 of FIG. 29 is an example a defined grouping tool module.

The process next defines (at 3020) a composite display area display module. For instance, the composite display area display module 2940 of FIG. 29 is an example of a defined composite display area display module.

The process next defines (at 3030) a navigation module. For instance, the navigation tool module 2945 of FIG. 29 is an example of a defined navigation tool module.

The process then defines (at 3040) other media editing tools and functionalities. Examples of such editing tools may include zoom, color enhancement, blemish removal, audio mixing, trim tools, etc. In addition, various other media editing functionalities may be defined. Such functionalities may include library functions, format conversion functions, etc. The process defines these additional tools in order to create a media editing application that has many additional features to the features described above.

Figure 31:
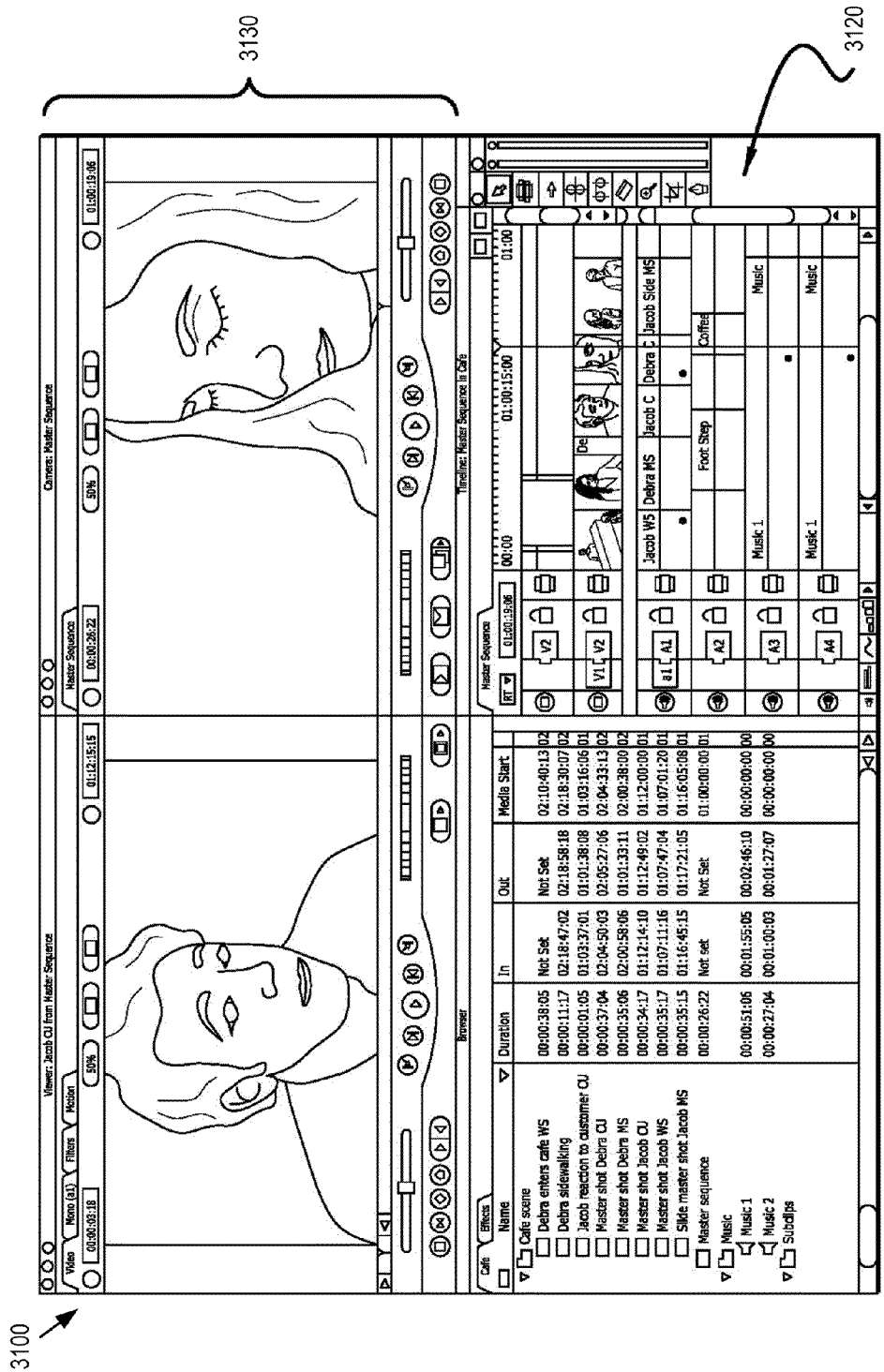
FIG. 31 illustrates a detailed view of a media editing application with additional features.

A more detailed view of a media editing application with these additional features is illustrated in FIG. 31. Specifically, FIG. 31 shows a media editing application with these additional tools. FIG. 31 illustrates a list of video and/or audio clips 3110, video editing tools 3120, and video displays 3130. The list of clips 3110 includes video clips along with data (e.g., time code information) about the video clips. In some embodiments, the list of video clips is the list of video clips in a particular sequence of video clips, and the data specifies in and out points, durations, etc. for the video clips.

The video editing tools 3120 include tools that allow a user to graphically set in and out points for video clips (in other words, where in the final product a specific clip or part of a clip will be shown). The video editing tools 3120 can be used to modify the temporal sequence of the video frame and to synchronize audio tracks with video tracks (e.g., in order to add music over a video clip). In some embodiments, video editing tools 3120 also give users the ability to edit in effects or perform other video editing functions. In some embodiments, the video editing tools include trim tools for performing edits such as slide edits, ripple edits, slip edits, roll edits, etc.

The video displays 3130 allow a user to watch multiple video clips at once, thereby enabling easier selection of in and out points for the video clips. The screen shot 3100 illustrates a few of many different editing tools that a video editing application of some embodiments may have to edit digital video.

In some cases, some or all of the video clips that are displayed in the list of clips 3110, played in displays 3130, and edited by a user with video editing tools 3120, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

Returning to FIG. 30, process 3000 next stores (at 3050) the defined media-editing application on a computer readable storage medium. As mentioned above, in some embodiments the computer readable storage medium is a distributable CD-ROM. In some embodiments, the medium is one or more of a solid-state device, a hard disk, a CD-ROM, or other non-volatile computer readable storage medium.

One of ordinary skill in the art will recognize that the various elements defined by process 3000 are not exhaustive of the modules, rules, processes, and UI items that could be defined and stored on a computer readable storage medium for a media editing application incorporating some embodiments of the invention. In addition, the process 3000 is a conceptual process, and the actual implementations may vary. For example, different embodiments may define the various elements in a different order, may define several elements in one operation, may decompose the definition of a single element into multiple operations, etc. In addition, the process 3000 may be implemented as several sub-processes or combined with other operations within a macro-process.

VII. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. "Computer" is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" includes firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 32:
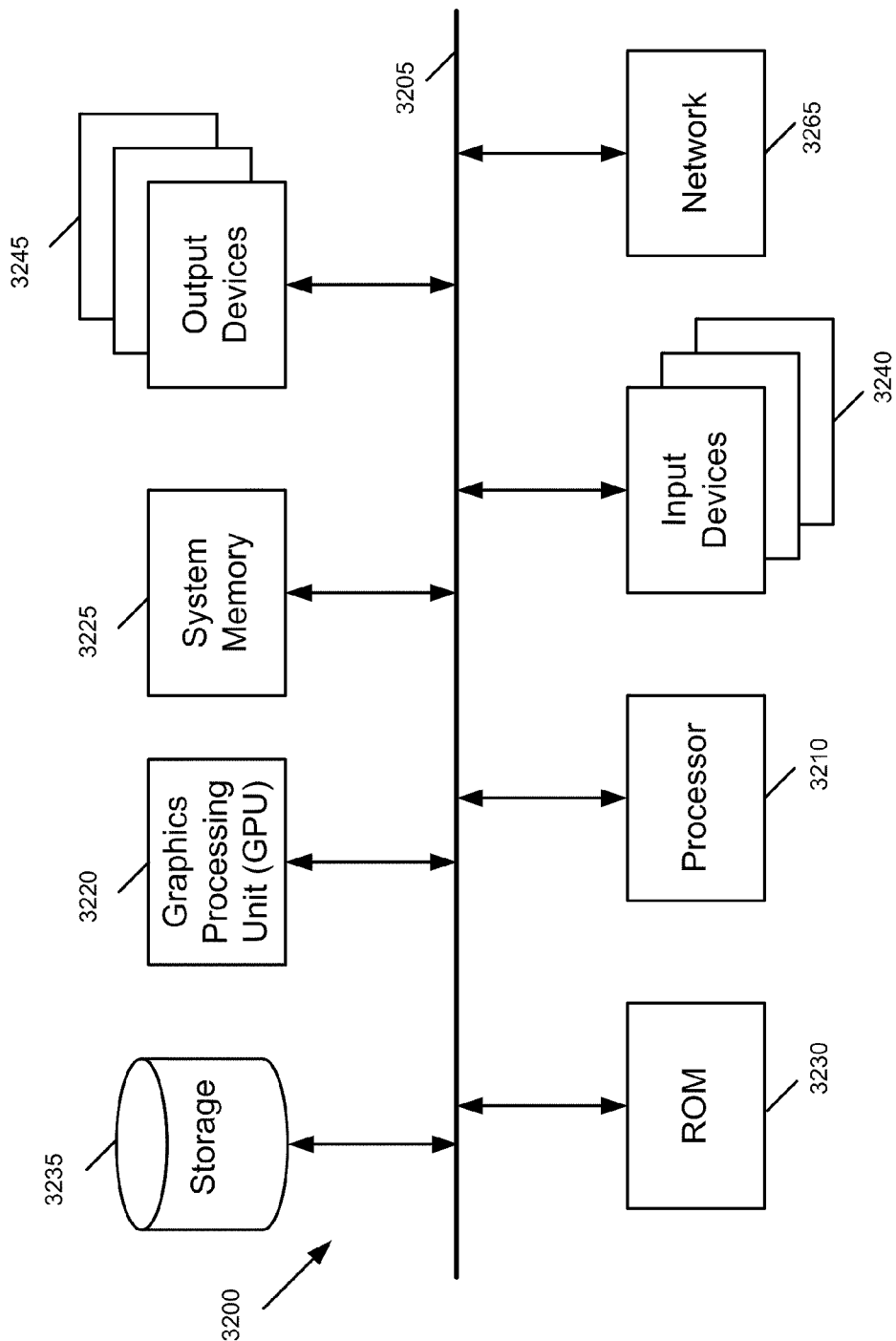
FIG. 32 illustrates a computer system with which some embodiments of the invention are implemented.

FIG. 32 illustrates a computer system with which some embodiments of the invention are implemented. Such a computer system includes various types of computer readable media and interfaces for various other types of computer readable media. Computer system 3200 includes a bus 3205, at least one processing unit (e.g., a processor) 3210, a graphics processing unit (GPU) 3220, a system memory 3225, a read-only memory 3230, a permanent storage device 3235, input devices 3240, and output devices 3245.

The bus 3205 collectively represents all system, peripheral, and chipset buses that communicatively connect the numerous internal devices of the computer system 3200. For instance, the bus 3205 communicatively connects the processor 3210 with the read-only memory 3230, the GPU 3220, the system memory 3225, and the permanent storage device 3235.

From these various memory units, the processor 3210 retrieves instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 3220. The GPU 3220 can offload various computations or complement the image processing provided by the processor 3210. In some embodiments, such functionality can be provided using CoreImage's kernel shading language.

The read-only-memory (ROM) 3230 stores static data and instructions that are needed by the processor 3210 and other modules of the computer system. The permanent storage device 3235, on the other hand, is a read-and-write memory device. This device is a non-volatile memory unit that stores instructions and data even when the computer system 3200 is off. Some embodiments of the invention use a mass storage device (such as a magnetic or optical disk and its corresponding disk drive) as the permanent storage device 3235.

Other embodiments use a removable storage device (such as a floppy disk, flash drive, or ZIP® disk, and its corresponding disk drive) as the permanent storage device. Like the permanent storage device 3235, the system memory 3225 is a read-and-write memory device. However, unlike storage device 3235, the system memory is a volatile read-and-write memory such as a random access memory. The system memory stores some of the instructions and data that the processor needs at runtime. In some embodiments, the invention's processes are stored in the system memory 3225, the permanent storage device 3235, and/or the read-only memory 3230. For example, the various memory units include instructions for processing multimedia items in accordance with some embodiments. From these various memory units, the processor 3210 retrieves instructions to execute and data to process in order to execute the processes of some embodiments.

The bus 3205 also connects to the input and output devices 3240 and 3245. The input devices enable the user to communicate information and commands to the computer system. The input devices 3240 include alphanumeric keyboards and pointing devices (also called "cursor control devices"). The output devices 3245 display images generated by the computer system. The output devices include printers and display devices, such as cathode ray tubes (CRT) or liquid crystal displays (LCD).

Finally, as shown in FIG. 32, bus 3205 also couples the computer 3200 to a network 3265 through a network adapter (not shown). In this manner, the computer can be a part of a network of computers (such as a local area network ("LAN"), a wide area network ("WAN"), an intranet, or a network of networks such as the internet. Any or all components of computer system 3200 may be used in conjunction with the invention.

Some embodiments include electronic components, such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by a device such as an electronics device, a microprocessor, a processor, a multi-processor (e.g., a chip with several processing units on it) and includes sets of instructions for performing various operations. The computer program excludes any wireless signals, wired download signals, and/or any other ephemeral signals Examples of hardware devices configured to store and execute sets of instructions include, but are not limited to, application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms "display" or "displaying" mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For example, in several embodiments described above, the drawing tool is used to draw a boundary about a set of clips in the composite display area in order to group the clips. The drawing tool of other embodiments however might draw a boundary about several clips for reasons other than grouping the clips.

Furthermore, many of the media editing application GUIs illustrated in the Figures show only a composite display area and a story outline. One of ordinary skill in the art will understand that the features illustrated in these figures may be incorporated into a more complete media editing GUI such as illustrated in FIG. 31. Further still, while many embodiments were described above by reference to a timeline, media editing applications may use other types of representations of composite presentations. For instance, some media editing applications (such as Shake® sold by Apple Inc.) use a tree-based graph approach to illustrate the compositing of a multimedia project. In such editing applications, each node may represent media and/or image processing operations while the links between nodes sometimes represent a sequence of operations. In these embodiments, the grouping tool can be used to define a grouping of nodes so the user can manipulate or operate the nodes in the grouping as an integral unit.

In addition, a number of the Figures (including FIGS. 2, 4, 6, 7, 20, 26 and 30) conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A computer readable medium storing a media-editing application for creating multimedia presentations, the application comprising a graphical user interface (GUI), the GUI comprising:
    a composite display area for graphically displaying rows of media clips that are part of a composite presentation; and
    a drawing tool for drawing a boundary between a first set of media clips in a plurality of different rows in the composite display area and a second set of media clips in the plurality of different rows in order to define two separate continuous portions of the composite presentation, wherein when said drawing tool moves from a first clip on a first row to a second row, the drawing tool identifies an edge of a second media clip in the second row that is closest to a current position of the drawing tool and snaps a segment of the boundary to the identified edge of the second media clip in order to place the second media clip completely in one of the two separate portions of the composite presentation.

2. The computer readable medium of claim 1, wherein said drawing tool is part of a grouping tool for creating a grouping of media clips.

3. The computer readable medium of claim 2, wherein said drawing tool comprises a moveable drawing user interface (UI) element for moving between the plurality of media clips to draw the boundary.

4. The computer readable medium of claim 3, wherein the moveable drawing UI element is for moving across the rows of media clips in order to create the grouping of media clips.

5. The computer readable medium of claim 2, wherein the GUI further comprises a plurality of elements that are selectable through a position indicator, wherein when the grouping tool is activated, the drawing tool changes the position indicator representation in the composite display area to a moveable drawing element.

6. The computer readable medium of claim 3, wherein the grouping tool is activated by a grouping activation item, wherein the moveable drawing element is moveable in the composite display area when the grouping tool is activated.

7. The computer readable medium of claim 1, wherein the composite display area comprises a plurality of tracks that span a timeline, wherein the first and second rows are tracks in the composite display area.

8. The computer readable medium of claim 1, wherein the drawing tool is further for adjusting the drawn boundary.

9. The computer readable medium of claim 8, wherein adjusting the boundary comprises identifying the boundary and displaying the boundary as a boundary with at least one segment that is user-adjustable.

10. The computer readable medium of claim 1, wherein the drawing tool is for automatically drawing a second boundary in order to divide one of the two portions of the composite presentation into two new separate continuous portions after receiving a user's selection of a location in the composite display area, wherein automatically drawing the second boundary comprises drawing the second boundary from a first location to a second location of the composite display area without further user input, wherein the first location is a location received from the user, wherein the first location is on one side of the plurality of media clips and the second location is on another side of the plurality of media clips.

11. A computer readable medium storing a computer program for execution by one or more processing units, the computer program comprising sets of instructions for:
    displaying rows of media clips that are part of a composite presentation in a composite display area;
    drawing, based on user input, a boundary between a first set of media clips in a plurality of different rows in the composite display area and a second set of media clips in the plurality of different rows in order to define two separate continuous portions of the composite presentation;
    as the user input moves from a first clip in a first row to a second row, identifying an edge of a second media clip in the second row that is closest to a current position of the user input; and snapping a boundary segment to the identified edge of the second media clip in order to place the second media clip completely in one of the two separate portions of the composite presentation.

12. The computer readable medium of claim 11, wherein said composite display area comprises a plurality of tracks for holding media clips.

13. The computer readable medium of claim 12, wherein the boundary comprises one or more non-linear borders, wherein the borders comprise a plurality of segments, wherein the segments correspond to sides of media clips in the tracks.

14. The computer readable medium of claim 11, wherein the computer program further comprises a set of instructions for associating a plurality of media clips that are within the boundary with a grouping of media clips.

15. The computer readable medium of claim 14, wherein the computer program further comprises a set of instructions for excluding at least one media clip that is within the boundary from the grouping of media clips.

16. The computer readable medium of claim 14, wherein the computer program further comprises a set of instructions for moving the media clips in the grouping together in the composite display area and excluding a media clip with a location in the composite display area that has to be maintained independently from the grouped clips.

17. The computer readable medium of claim 14, wherein the grouping of media clips comprises a logical boundary for abutting the grouping of media clips with another grouping of media clips in a timeline.

18. The computer readable medium of claim 17, wherein the computer program further comprises a set of instructions for placing in a subtrack a media clip associated with the grouping of media clips that extends beyond the logical boundary.

19. The computer readable medium of claim 14, wherein the computer program further comprises a set of instructions for allowing a user to use a hot key to add a media clip to the grouping of media clips by appending the media clip to the grouping based on an end of the grouping.

20. The computer readable medium of claim 11, wherein the first and second media clips are positioned in the composite display area such that the identified edge of the second media clip is not aligned with any edges of the first media clip.

21. A method of defining a media-editing application for creating multimedia presentations, the method comprising:
    defining a composite display area for displaying a representation of a composite presentation that comprises media clips;
    defining a grouping tool for (i) drawing a boundary about a plurality of media clips in the composite display area, (ii) identifying the plurality of media clips within the boundary as an associated group of media clips, and (iii) creating a representation for the associated group of media clips for inclusion in a set of representations of groups of media clips that is distinct from the representation of the composite presentation in the composite display area; and
    defining an editing tool for editing the composite presentation by receiving a movement of a particular representation of the set of representations in order to cause a corresponding movement within the composite display area of the group of media clips associated with the moved representation, wherein receiving a movement within the composite display area of the group of media clips associated with the particular representation causes a corresponding movement of the particular representation.

22. The method of claim 21 further comprising defining a navigation tool comprising a plurality of selectable navigation markers associated with a plurality of navigable locations in the composite presentation, wherein a particular selectable navigation marker is the representation for the associated group of media clips.

23. The method of claim 22, wherein said navigation marker is generated when the representation of the associated group of media clips is created.

24. The method of claim 23, wherein said navigation marker comprises an image in a media clip associated with the representation of the media clips, wherein the image is a representative image for the group of media clips associated with said navigation marker.

25. The method of claim 23, wherein the selection of said navigation marker further causes the media editing application to identify the associated group of media clips in the composite display area.

26. A computer readable medium storing a computer program for editing a multimedia composite presentation, the computer program being executed by one or more processing units, the computer program comprising sets of instructions for:
    drawing a boundary about a plurality of media clips in a composite display area that displays a representation of a composite presentation;
    identifying the plurality of media clips within the boundary as an associated group of media clips;
    displaying a representation of the associated group of media clips that is distinct from the representation of the composite media presentation in the composite display area, the representation of the associated group of media clips displayed along with a set of representations of different groups of media clips;
    in response to receiving a movement of the representation of the associated media clips from a first location between a first pair of representations of groups of media clips to a second location between a second, different pair of representations of groups of media clips, automatically moving the associated group of media clips to a corresponding location in the composite display area; and
    in response to receiving a movement of the associated group of media clips from a first location in the composite display area between a first pair of groups of media clips to a second location in the composite display area between a second, different pair of groups of media clips, automatically moving the representation of the associated media clips to a corresponding location in the set of representations of groups of media clips.

27. The computer readable medium of claim 26, wherein the composite display area is for displaying the composite presentation.

28. The computer readable medium of claim 26, wherein the representation is for navigating the composite presentation in the composite display area.

29. The computer readable medium of claim 26, wherein the representation is for use in duplicating the associated group of media clips.

* * * * *